United States Patent [19]
Mochizuki et al.

[11] Patent Number: 5,898,251
[45] Date of Patent: *Apr. 27, 1999

[54] METHOD OF MAKING ARMATURE WINDING OF DOUBLE-LAYER CONCENTRIC-WOUND OR LAP-WINDING TYPE FOR DYNAMOELECTRIC MACHINE

[75] Inventors: Motoyasu Mochizuki, Aichi-ken; Tsutomu Kawamura, Yokkaichi, both of Japan

[73] Assignee: Kabushiki Kaisha Toshiba, Kanagawa-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/690,879

[22] Filed: Jul. 26, 1996

[30] Foreign Application Priority Data

Aug. 18, 1995 [JP] Japan ................................. 7-210529

[51] Int. Cl.$^6$ .......................... H02K 15/085; H02K 3/12
[52] U.S. Cl. ................................ 310/179; 310/42; 29/596
[58] Field of Search .................... 310/179, 180, 310/184, 198, 206, 207, 208, 42; 242/432; 29/596

[56] References Cited

U.S. PATENT DOCUMENTS

| | | | |
|---|---|---|---|
| 3,324,322 | 6/1967 | Johns | 310/198 |
| 3,622,823 | 11/1971 | Broadway et al. | 310/254 |
| 3,979,618 | 9/1976 | Auinger | 310/198 |
| 4,403,160 | 9/1983 | Hibino | 310/184 |
| 4,492,890 | 1/1985 | MacDonald | 310/184 |
| 4,750,258 | 6/1988 | Anderson | 29/596 |
| 5,018,676 | 5/1991 | Gulbrandson | 310/198 |
| 5,231,324 | 7/1993 | Kawamura et al. | 310/198 |
| 5,376,852 | 12/1994 | Kawamura et al. | 310/198 |
| 5,657,530 | 8/1997 | Kawamura et al. | 29/596 |

FOREIGN PATENT DOCUMENTS

| | | | |
|---|---|---|---|
| 51-28125 | 8/1976 | Japan | H02K 15/08 |
| 60-36698 | 8/1985 | Japan | H02K 3/28 |
| 6-261479 | 9/1994 | Japan | H02K 3/28 |
| 7-154949 | 6/1995 | Japan | H02K 15/04 |

OTHER PUBLICATIONS

"Study on the Theory of Abnormal Phenomena in Induction Motors (Part 2)," by Chukichi Okawa, in "Shibaura Review," vol. 8, 1934, pp. 279–294.

Primary Examiner—Clayton LaBalle
Attorney, Agent, or Firm—Limbach & Limbach LLP

[57] ABSTRACT

In a double-layer concentric-wound armature winding for a dynamoelectric machine, the number of slots per phase per pole is set at q. The armature winding comprising a winding which corresponds to one pole and which includes a plurality of coils having different coil pitches from one another. The coils include at least one coil having the number of turns different from those of the other coils. The number q is set at or above 3. The number of coils in one winding is set at (q-n) where n=1, 2, . . . and q-2. The coils are distributed in the slots so that a double-layer, concentric-wound winding resulting in a sinusoidal distribution of magnetomotive force is formed. In another arrangement, the number of pole windings per phase is half of the number of poles in a double-layer concentric-wound winding or a lap winding. The number of coils in one of the pole windings is set at (2x(q-n)).

7 Claims, 72 Drawing Sheets

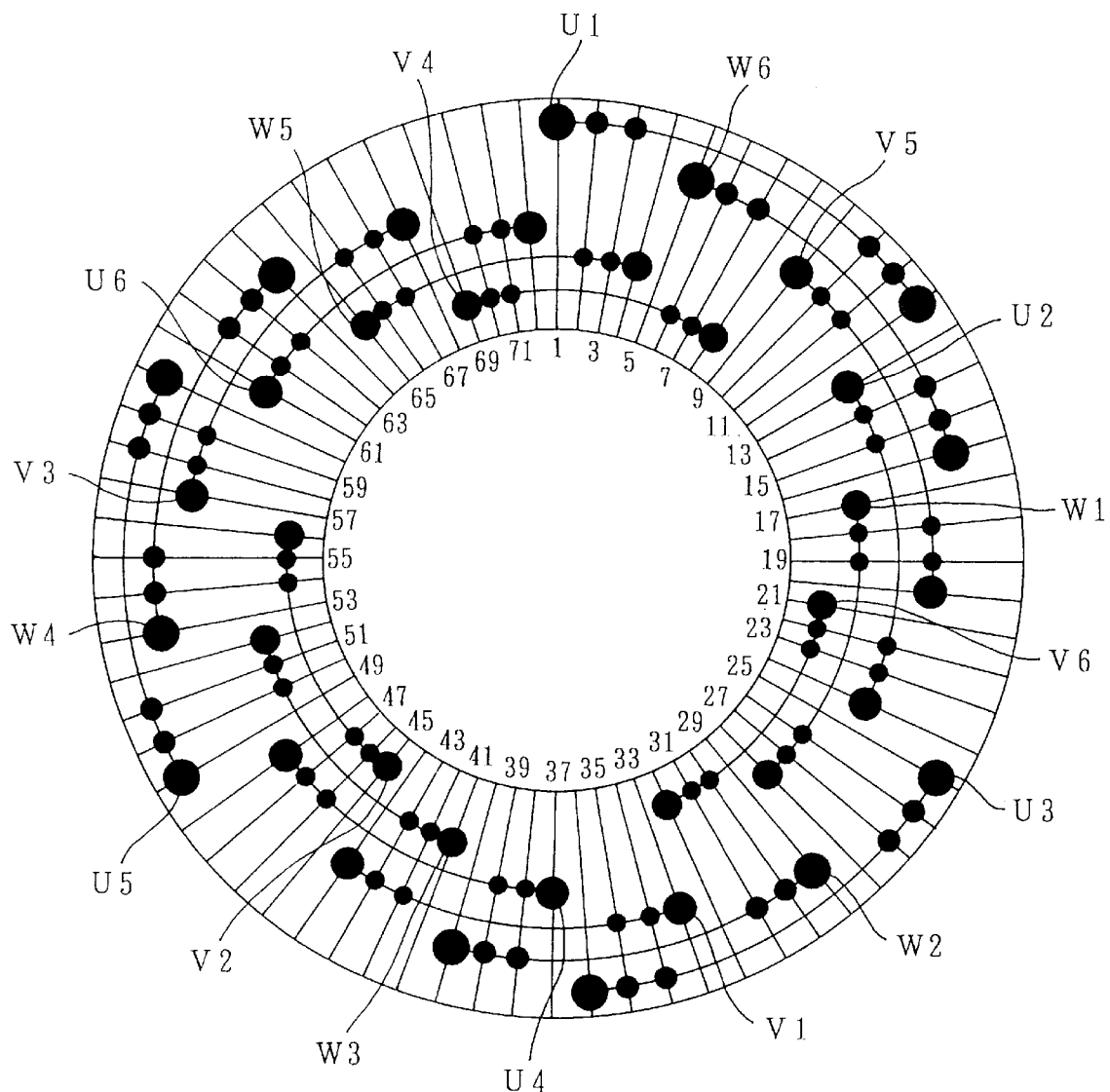
F I G. 22

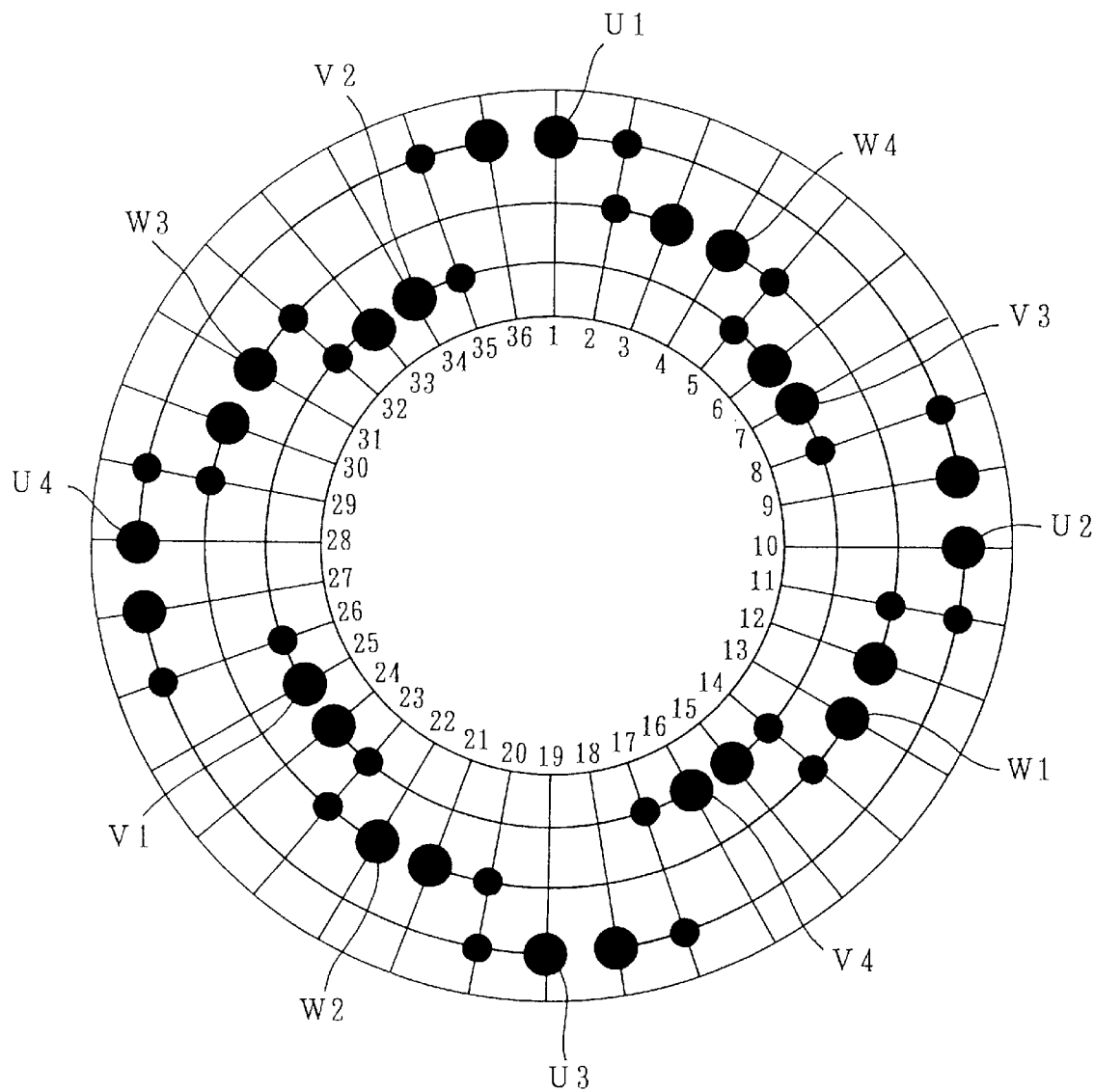
F I G. 2 5

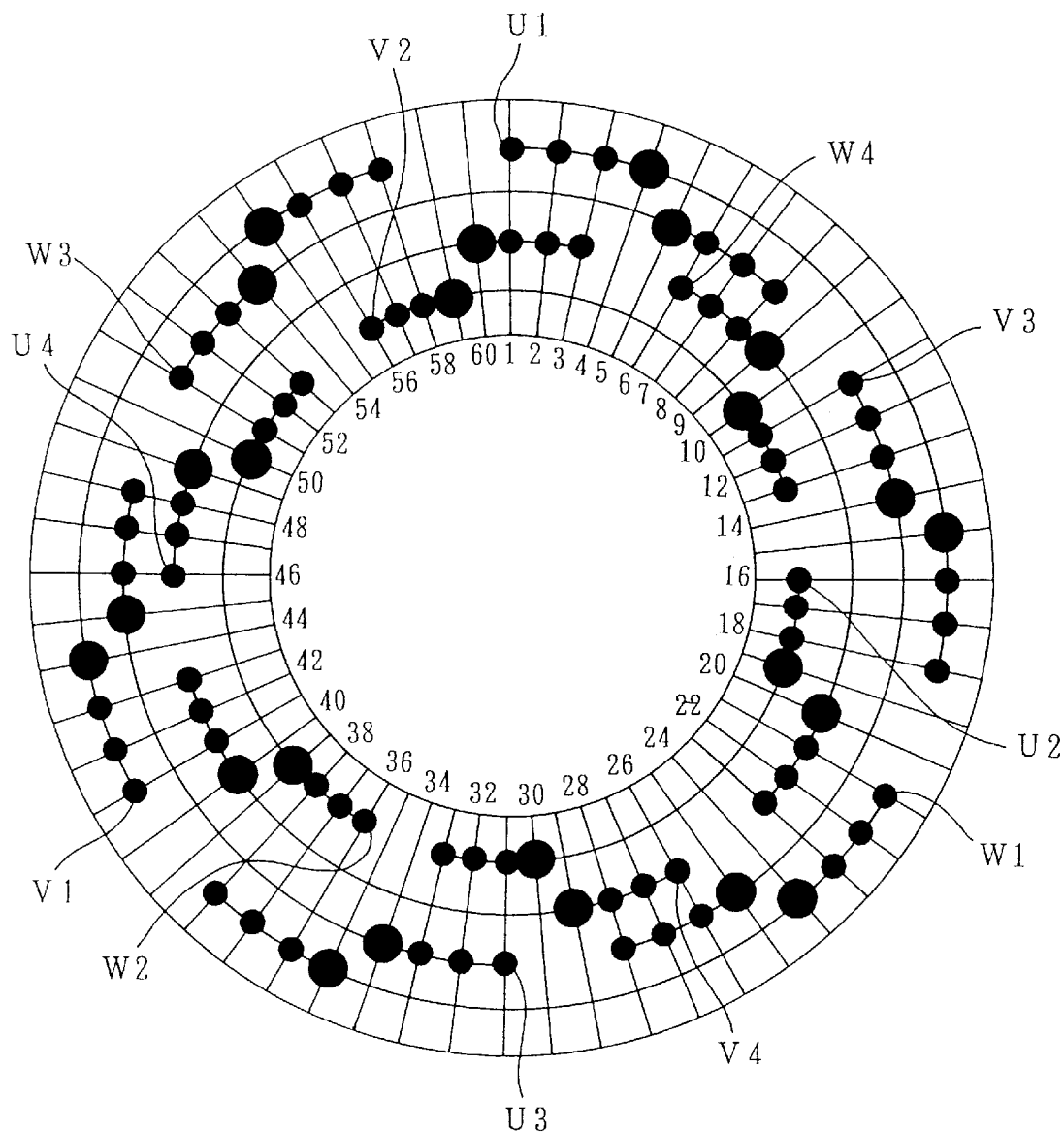
F I G. 3 8

F I G. 6 6 PRIOR ART

METHOD OF MAKING ARMATURE WINDING OF DOUBLE-LAYER CONCENTRIC-WOUND OR LAP-WINDING TYPE FOR DYNAMOELECTRIC MACHINE

BACKGROUND OF THE INVENTION

1. Field of the Invention

This invention relates to an armature winding for a dynamoelectric machine having a double-layer concentric-wound coil arrangement or a lap winding arrangement and a method of making such an armature winding.

2. Description of the prior art

FIG. 62 is a development diagram of a conventional arrangement of a concentric-wound type armature winding of AC machinery, particularly, three-phase induction motors. The shown armature winding is of a three-phase, four-pole, 48-slot type. FIG. 63 shows an arrangement of coils of the armature winding disposed in slots. Each dotted line in FIG. 62 shows a coil side which is inserted into the coil to overlap with the upper side (open side) thereof. Each solid arc in FIG. 63 shows an coil end of the coil and each black dot shows the coil side. Numerals 1 to 48 designate slot numbers, which will be hereinafter presented as #1 to #48. Reference symbols U1, U2, U3 and U4 designate pole windings of a phase U, reference symbols V1, V2, V3 and V4 pole windings of a phase V, and reference symbols W1, W2, W3 and W4 pole windings of a phase W.

Only one coil is inserted in each of slots #1 and #12 in the first pole winding U1 of the phase U so that concentric-wound coils are composed, whereas a coil is inserted in each of slot pairs of #2 and #11, and #3 and #10 together with another coil of another phase (coils of windings V4 and W1 respectively) so that concentric-wound coils are composed. Usually, the coils inserted in the slot pair of #2 and #11 and in the slot pair of #3 and #10 have the same number of turns, which number is a half of that of the coil inserted in the slot pair of #1 and #12. All the other concentric-wound coils also have the above-mentioned double-half turns relation in the number of turns.

Publication No. 51-28125 (1976) of a Japanese examined patent application discloses an arrangement of the armature winding as shown in FIG. 64. Publication No. 60-36698 (1985) of a Japanese examined patent application discloses an arrangement of the armature winding as shown in FIG. 65. Neither publication describes the number of turns of each coil in detail, but, usually, the number of turns of the coil when the same is inserted in the slot together with a coil of another phase is a half of that when only the coil is inserted in the slot. Thus, all the coils generally have the double-half turns relation.

The magnetomotive force waveform of an armature winding is nonsinusoidal when the coils in the respective slots have the double-half turns relation. The nonsinusoidal magnetomotive force waveform results in a large number of harmonics, which disadvantageously cause a reduction in the efficiency and power factor of the motor or an increase in the noise due to electromagnetic vibration.

For the purpose of overcoming the above-described disadvantage, the prior art has provided an arrangement of sinusoidal winding wherein the number of turns of the coil is changed from slot to slot so that the magnetomotive force distribution approximates a sinusoidal wave. For example, publication No. 6-261479 (1994) of a Japanese unexamined patent application discloses an arrangement of armature winding composed into a sinusoidal, double-layer, concentric-wound winding. Referring to FIG. 67, the disclosed arrangement will be described. FIG. 67 is a development diagram of an armature winding of a three-phase, four-pole, 48-slot type with two parallel electrical paths being formed between external terminals U and X. When q is the number of slots in each pole in each phase, q=48/(3×4)=4. Each pole winding in each phase comprises four continuous coils arranged concentrically so that each pole winding is composed into a double-layer concentric-wound winding. The four coils are connected to one another so that a pole winding is formed. Thus, as a whole, the armature winding comprises twelve concentric-wound coils which are pole windings U1, U2, U3 and U4 of phase U, pole windings V1, v2, V3 and V4 of phase V, and pole windings W1, W2, W3 and W4 of phase W. The coils are inserted in the slots #5 to #16, and the coil pitches of the pole windings are 11, 9, 7, and 5 respectively. For example, a first pole winding U1 of phase U is composed of a coil inserted in the slots #5 and #16 at the pitch of 11, a coil inserted in the slots #6 and #15 at the pitch of 9, a coil inserted in the slots #7 and #14 at the pitch of 7, and a coil inserted in the slots #8 and #13 at the pitch of 5, all the coils being sequentially laid one upon another. Regarding each of the other poles of phase U and each of the other phases, four coils are interconnected at the coil pitches of 11, 9, 7 and 5 in the same manner as described above.

FIG. 68 illustrates the number of turns of the coil in each slot. It is noted that FIG. 68 shows only the arrangement of the coils inserted in the respective slots but shows nothing as to which coils serve as the upper or lower coils. The number of turns of each slot-inserted coil in the shown arrangement is the same as in the prior art, but the number of coils in each phase is twice as large as that in the prior art. For example, as shown in FIG. 68, the first pole winding U1 of the phase U is distributed in slots #5 to #8 and in slots #13 to #16, and the number of turns is changed sequentially from 28 in slot #5 to 21 in slot #6, 13 in slot #7 and 5 in slot #8 and from 5 in slot #13 to 13 in slot #14, 21 in slot #15 and 28 in slot #16, whereby the winding U1 is composed into a concentric-wound winding. Further, the second pole winding U2 of the phase U is distributed in slots #17 to #20 and in slots #25 to #28, and the number of turns is changed sequentially from 28 in slot #17 to 21 in slot #18, 13 in slot #19 and 5 in slot #20 and from 5 in slot #25 to 13 in slot #26, 21 in slot #27 and 28 in slot #28, whereby the winding U2 is composed into a concentric-wound winding. Thus, the numbers of turns of the coils are changed sequentially from 5 in slot #1 to 13 in slot #2, 21 in slot #3, 28 in slot #4, 28 in slot #5, 21 in slot #6, 13 in slot #7 and 5 in slot #8 so that the magnetomotive force can be rendered approximately sinusoidal.

Since the above-described arrangement is composed into the double-layer, concentric-wound type, the total numbers of turns of upper and lower coils inserted in slots #1 to #4 in FIG. 68, for example, are 33, 33, 34 and 34. Thus, the total number of turns of coils inserted in each slot is approximately uniform, which shows that the sectional area of each slot is effectively utilized.

The number of turns of each coil inserted in each slot is determined so that the magnetomotive force produced by the winding is rendered approximately sinusoidal and so that the high frequency winding factor approximates zero. For example, this is described in detail in "Study on the theory of abnormal phenomena in induction motors," by Chukichi Okawa in "Shibaura Review" Volume 8, 1934. FIG. 69 illustrates an arrangement of upper and lower coils and the number of turns of each coil in the armature winding as shown in FIG. 68.

FIGS. 70A and 70B show distribution of the magnetomotive force in the case of the sinusoidal winding and in the case of a nonsinusoidal winding respectively. FIG. 71 shows winding factors of the sinusoidal winding shown in FIG. 70A and those of the nonsinusoidal winding shown in FIG. 70B. As obvious from these figures, the sinusoidal winding can render the magnetomotive force approximately sinusoidal and reduce the high frequency winding factor to a large extent.

FIG. 72 illustrates the arrangement of upper and lower coils inserted in each slot and the number of turns of each coil with respect to the winding arrangement shown in FIG. 68. First, all the pole windings U1 to U4 of phase U are inserted into the slots to serve as lower coils. All the pole windings V1 to V4 of phase V are then inserted into the slots to serve as lower coils. Finally, all the pole windings W1 to W4 of phase W are inserted into the slots to serve as upper coils, so that the double-layer, concentric-wound winding is provided. Since all the windings of each phase can be simultaneously inserted into the slots, the inserting work can be simplified and the windings can be inserted into the slots by a coil inserting machine. Consequently, the above-described winding arrangement can achieve the same effect of sinusoidal winding as in a lap winding, and insulators can be mechanically inserted into the slots. Thus, in the above-described arrangement, the numbers of turns of the coils inserted in each slot is changed so that the magnetomotive force produced by the winding is rendered approximately sinusoidal, whereby the motor characteristics can be improved.

In the conventional concentric-wound windings as shown in FIGS. 62 and 66, however, all the coils inserted in each slot have the double-half turns relation in the number of turns. Accordingly, since the magnetomotive force cannot be rendered sinusoidal, a large number of harmonics result in reduction in the efficiency and power factor of the motor or an increase in the noise due to electromagnetic vibration.

The double-layer concentric-wound winding employing the sinusoidal winding as shown in FIG. 67 overcomes the above-described drawbacks. However, the coils belonging to different phases are inserted in all the slots #1 to #48 although the differences in the number of coil turns among the slots are small, as is obvious from FIG. 72. Accordingly, the insulators need to be inserted into all the slots so that the coils belonging to the different phases are insulated from each other, which results in increase in the number of steps in the assembly of the winding.

Furthermore, in some slots, the number of turns of the upper coil quite differs from that of the lower coil in the armature winding shown in FIG. 67. These slots include slots #1, #4, #5, #8, #9, #12, #13, #16, #17, #20, #21, #24, #25, #28, 29, #32, #33, #36, #37, #40, #41, #44, #45 and #48. In each of these slots, one coil is wound five turns, whereas the other coil is wound 28 turns. Accordingly, since the dimensions of the insulator inserted into each slot need to be varied, a large number of different types of insulators need to be provided. Furthermore, the coil and the insulator are sometimes settled improperly in the slot when the number of turns of the coil first inserted into the slot is smaller. Consequently, the subsequent manual or mechanical inserting of the coil is rendered difficult or the insulator having inserted in the slot is displaced, whereupon the quality of products is lowered. Additionally, since the pole windings have different dimensions respectively, coil formers the number of which is equal to that of the pole windings are disadvantageously required.

SUMMARY OF THE INVENTION

Therefore, an object of the present invention is to provide a method of making an armature winding of dynamoelectric machines having a double-layer concentric-wound winding or a lap winding arrangement, wherein a magnetomotive force produced by windings constituting one of poles has a high approximation to a sinusodial wave, the number of coils constituting each pole can be reduced, the number of types and the number of insulators inserted into the slots can be reduced, and the coils can be mechanically inserted into the slots readily.

The present invention provides a method of making an armature winding for a three phase four pole dynamoelectric machine, comprising the steps of setting a number q of slots per phase per pole at or above four and setting a number of coils of one winding corresponding to one pole at or above two and to be smaller than the number q, setting a number of turns and a coil pitch of each of the coils at different values from each other and setting a minimum coil pitch at or above q and at or below 2q, arranging the coils into an integral-slot winding having a concentric-wound winding distribution wherein the number of turns of each coil is increased or decreased sequentially from an outermost coil to an innermost coil, winding the coil with a maximum number of turns in the concentric-wound winding into a single-layer winding and each of the other coils into a double-layer winding, simultaneously inserting into the slots a first set of windings including three windings corresponding to first poles of three phases and three windings corresponding to fourth poles of the three phases, and simultaneously inserting into the slots a second set of windings including three windings corresponding to third poles of the three phases and three windings corresponding to second poles of the three phases, the steps being sequentially executed.

According to the above-described method, the number of coils of each pole winding is smaller than the number of slots per pole, whereupon the number of coil formers can be reduced. The number of slots into which coils of different phases are inserted can be reduced. The difference between the numbers of turns of two coils inserted into one slot can be reduced. The coils can be mechanically inserted into the slots readily.

The number of turns of each coil may be set at a value different among the slots per phase per pole so that a magnetomotive force produced by the winding is rendered approximately sinusoidal.

The invention also provides a method of making an armature winding for a three phase four pole dynamoelectric machine, comprising the steps of setting a number q of slots per phase per pole at or above four and setting a number of coils of one winding corresponding to one pole at or above two and to be smaller than the number q, setting a number of turns and a coil pitch of each of the coils at different values from each other and setting a minimum coil pitch at or above q and at or below 2q, arranging the coils into an integral-slot winding having a concentric-wound winding distribution wherein the number of turns of each coil is increased or decreased sequentially from an outermost coil to an innermost coil, winding the coil with a maximum number of turns in the concentric-wound winding into a single-layer winding and each of the other coils into a double-layer winding, simultaneously inserting into the slots a first set of windings including three windings corresponding to first poles of three phases and three windings corresponding to third poles of the three phases, and simultaneously inserting into the slots a second set of windings including three windings corresponding to fourth poles of the three phases and three windings corresponding to second poles of the three phases, the steps being sequentially executed.

The invention further provides a method of making an armature winding for a three phase six pole dynamoelectric machine, comprising the steps of setting a number q of slots per phase per pole at or above four and setting a number of coils of one winding corresponding to one pole at or above two and to be smaller than the number q, setting a number of turns and a coil pitch of each of the coils at different values from each other and setting a minimum coil pitch at or above q and at or below 2q, arranging the coils into an integral-slot winding having a concentric-wound winding distribution wherein the number of turns of each coil is increased or decreased sequentially from an outermost coil to an innermost coil, winding the coil with a maximum number of turns in the concentric-wound winding into a single-layer winding and each of the other coils into a double-layer winding, simultaneously inserting into slots a first set of windings including three windings corresponding to a first phase of three phases and having a same polarity and three windings corresponding to a third phase of the three phases and having a polarity opposed to the polarity of the windings corresponding to the first phase, simultaneously inserting into the slots a second set of windings including three windings corresponding to a second phase of the three phases and having a same polarity and three windings corresponding to the first phase of the three phases and having a polarity opposed to the polarity of the windings corresponding to the second phase, and simultaneously inserting into slots a third set of windings including three windings corresponding to the third phase of the three phases and three windings corresponding to the second phase of the three phases, the steps being sequentially executed.

The invention further provides a method of making an armature winding for a three phase dynamoelectric machine, comprising the steps of setting a number q of slots per phase per pole at or above four, setting a number of coils of one winding at 2×(q−1) which is at or above two, and setting coil pitches of the respective coils at different values from one another, setting a minimum coil pitch in the plurality of coils corresponding to the one winding at or above q and at or below 2q, setting a number of turns of each of the coils corresponding to the one winding so that the number is minimum at an outermost slot and an innermost slot and so that the number is maximum at a central slot and arranging the coils into a concentric distribution, setting outermost coils of two windings belonging to the same phase in the concentric winding distribution so that the outermost coils are apart from each other by a pitch equal to the minimum coil pitch, winding the coil with a maximum number of turns in the concentric-wound winding distribution into a single-layer winding and each of the other coils into a double-layer winding, and simultaneously inserting into slots a first set of windings corresponding to all pole windings of a first phase, simultaneously inserting into slots a second set of windings corresponding to all pole windings of a second phase, and simultaneously inserting into slots a third set of windings corresponding to all pole windings of a third phase, the steps being sequentially executed.

BRIEF DESCRIPTION OF THE DRAWINGS

Other objects, features and advantages of the present invention will become clear upon reviewing the following description of made by a method preferred embodiments thereof, made with reference to the accompanying drawings, in which:

FIG. 22 illustrates a coil arrangement of the armature winding of the fifth embodiment as another example;

FIG. 25 illustrates a coil arrangement of the armature winding of the sixth embodiment;

FIG. 38 illustrates a coil arrangement of the armature winding of the ninth embodiment;

DETAILED DESCRIPTION OF THE PREFERRED EMBODIMENTS

Figure 1:
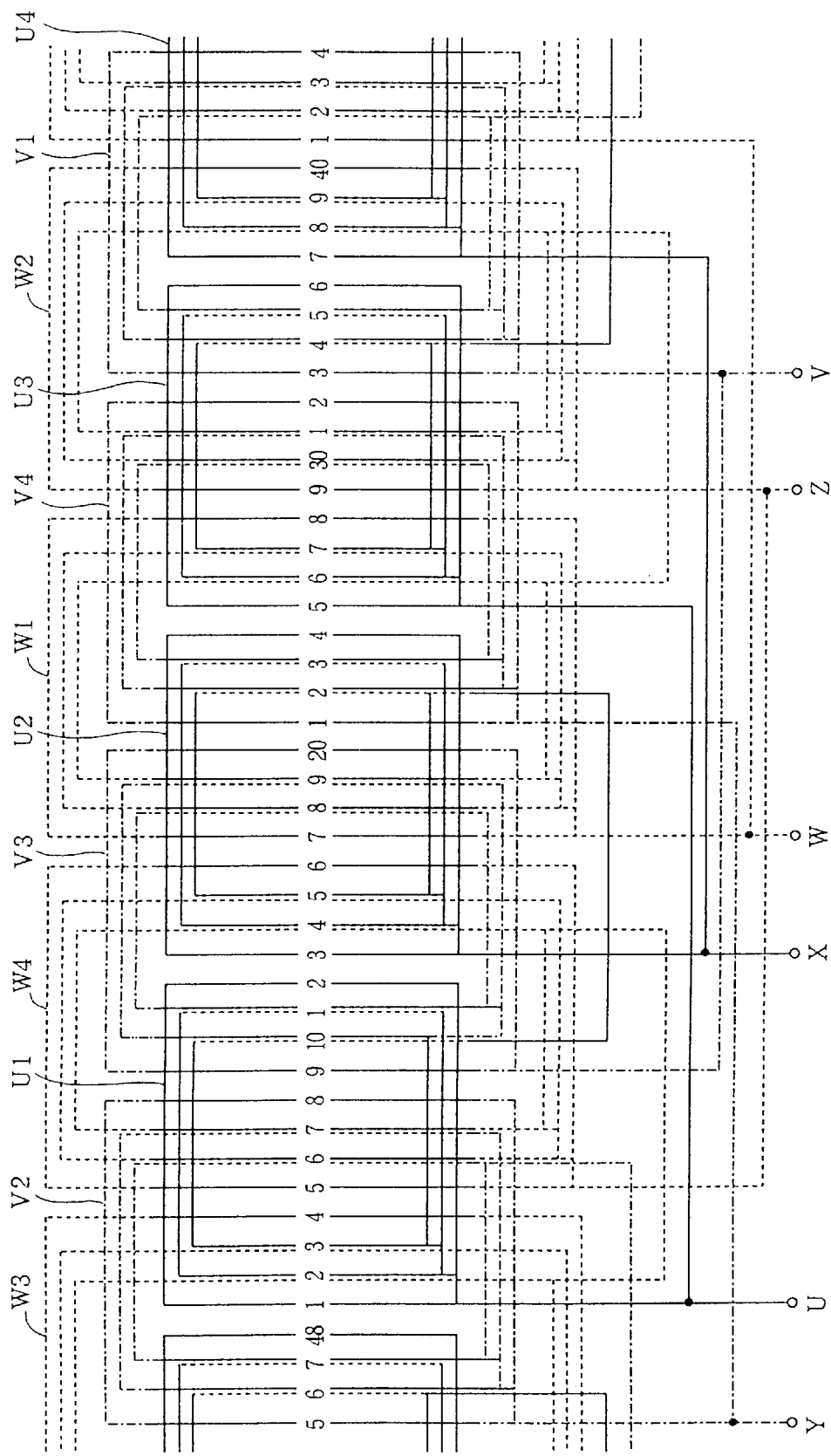
FIG. 1 is a development diagram of an armature winding of a first embodiment in accordance with the present invention.

A first embodiment of the present invention will be described with reference to FIGS. 1 to 8. In the figures, reference numerals 1 to 48 designate slot numbers. Reference symbols U1 to U4 designate pole windings of phase U, V1 to V4 pole windings of phase V, and W1 to W4 pole windings of phase W.

In the embodiment, the invention is applied to a three-phase, four-pole, 48-slot armature winding. Two parallel electrical paths are formed between armature winding terminals U and X by pole windings. The number q of slots per phase per pole is obtained as 48/(3×4)=4. Each pole winding of each phase consists of three (=q−1 concentrically distributed, continuous coils. Thus, the armature winding is composed into a double-layer, concentric-wound winding and comprises 12 concentric-wound coils including pole windings U1, U2 and U3 of phase U, pole windings V1, V2 and V3 of phase V, and pole windings W1, W2 and W3 of phase W.

Coil pitches of the coils composing each pole winding are set at 11, 9 and 7 respectively. For example, the first pole winding U1 of phase U is composed of a coil inserted in slots #1 and #12 at coil pitch of 11, a coil inserted in slots #2 and #11 at coil pitch of 9, and a coil inserted in slots #3 and #10 at coil pitch of 7, these coils being successively connected to one another. In each of the other windings of phase U and each winding of the other phases, three coils with respective coil pitches 11, 9 and 7 are successively connected to one another in the same manner as described above.

Figure 2:
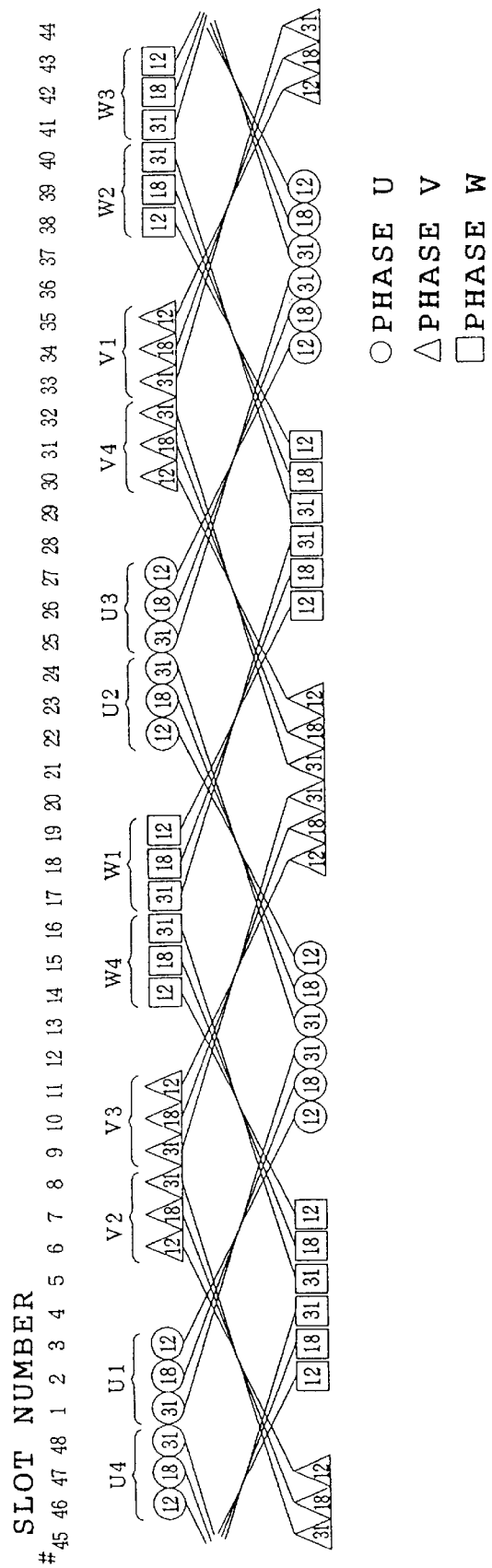
FIG. 2 shows the numbers of turns of coils inserted in slots.

FIG. 2 shows the numbers of turns of the coils inserted in the respective slots. It is noted that FIG. 2 shows only the arrangement of the coils inserted in the respective slots but shows nothing as to which of the coils serves as an upper or a lower coil in the slot. The numbers of turns of coils inserted in the slots in the embodiment differ from those in the prior art. For example, in phase U, the first pole winding U1 is distributed in the slots #1 to #3 and in the slots #10 to #12, and the number of turns is changed sequentially from 31 in slot #1 to 18 in slot #2 and 12 in slot #3 and from 12 in slot #10 to 18 in slot #11 and 31 in slot #12, whereby the winding U1 is composed into a concentric-wound winding.

Figure 70A:
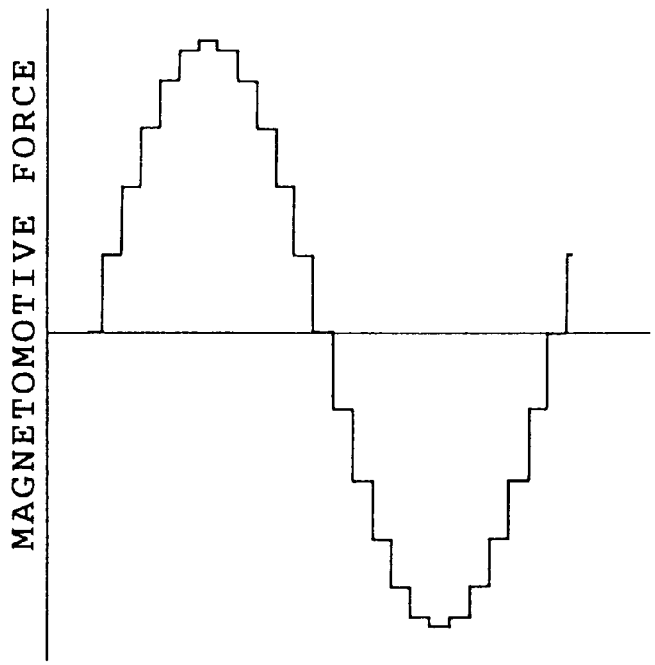
FIGS. 70A and 70B are graphs of distributions of winding magnetomotive force in the fifth conventional arrangement shown in FIG. 67.

Furthermore, the second pole winding U2 is distributed in slots #13 to #15 and slots #22 to #24, and the number of turns is changed sequentially from 31 in slot #13 to 18 in slot #14 and 12 in slot #15 and from 12 in slot #22 to 18 in slot #23 and 31 in slot #24, whereby the winding U2 is composed into a concentric-wound winding. On the other hand, the number of turns of coils of the pole winding U4 is changed from 12 to 18 and 31 and the number of turns of coils of the pole winding U1 is changed from 31 to 18 and 12 in slots #46, #47, #48, #1, #2 and #3. The degree of change in the number of turns differs from that in the prior art as shown in FIG. 70A. However, since the number of turns is changed stepwise in the embodiment, the magnetomotive force distribution can be rendered approximately sinusoidal as in the prior art.

Figure 3A:
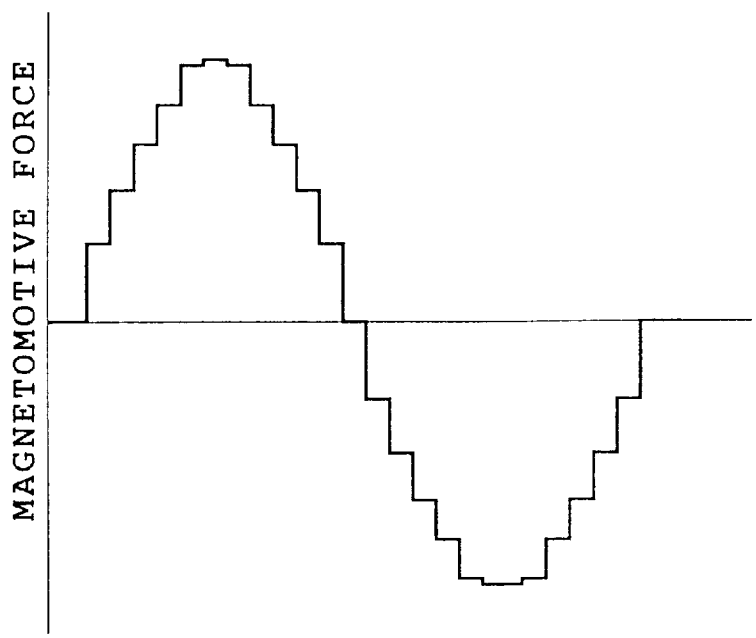
FIGS. 3A and 3B are graphs of distributions of winding magnetomotive force.
Figure 3B:
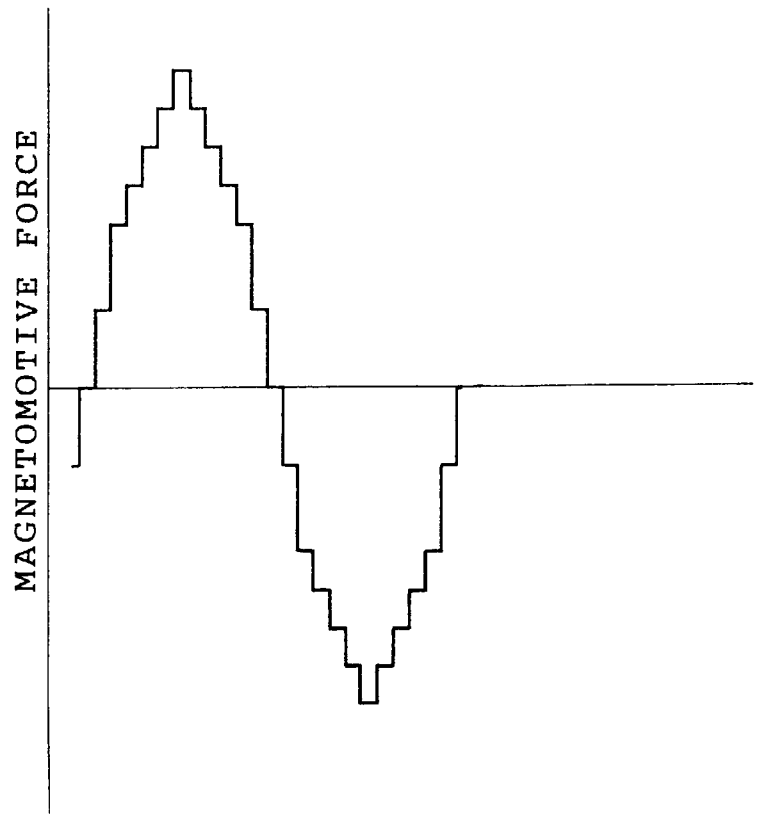
Figure 4:
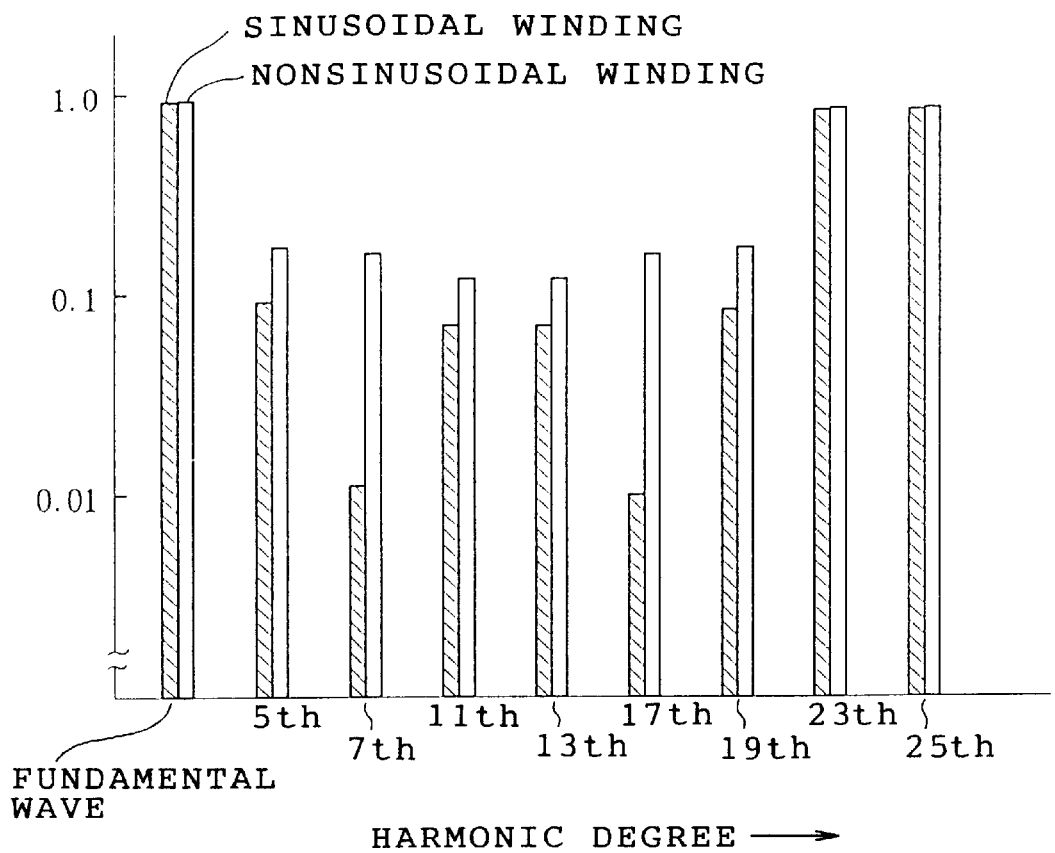
FIG. 4 is a graph comparatively showing winding factors in sinusoidal and nonsinusoidal windings.

FIGS. 3A and 3B show distributions of winding magnetomotive force in the sinusoidal winding of the embodiment and in a conventional nonsinusoidal winding respectively. FIG. 4 comparatively shows winding factors in these two windings. As obvious from FIGS. 3A, 3B and 4, the magnetomotive force distribution can approximate to the sinusoidal wave and the high frequency winding factor can be reduced to a large extent by the use of the sinusoidal winding of the embodiment.

Since the above-described arrangement is composed into the double-layer, concentric-wound type, the total number of turns of upper and lower coils inserted in slots #2 to #7, for example, is 30, 30, 31 and 31. Thus, the total number of turns of upper and lower coils inserted in each slot is approximately uniform, which shows that the sectional area of each slot is effectively used.

Figure 5:
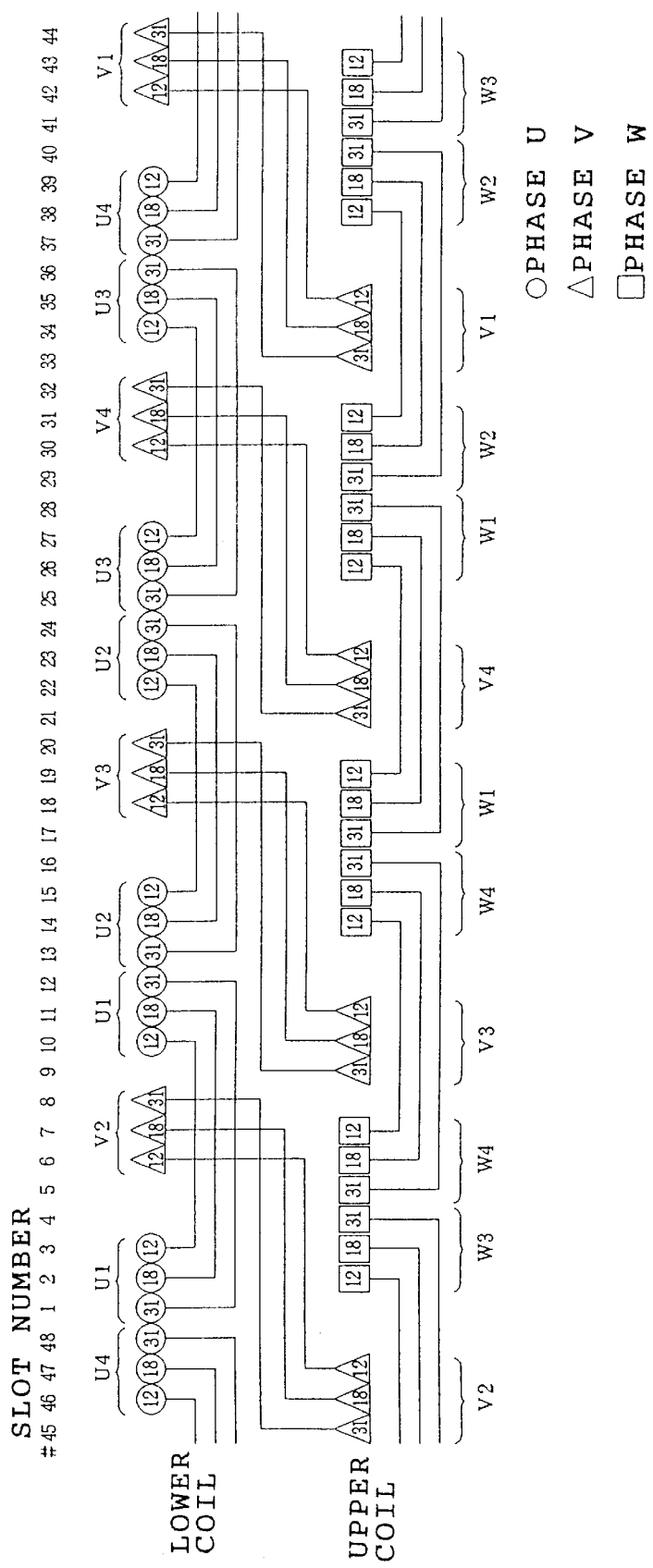
FIG. 5 illustrates an arrangement of upper and lower coils and the number of turns of each coil in the armature winding of the first embodiment.
Figure 6:
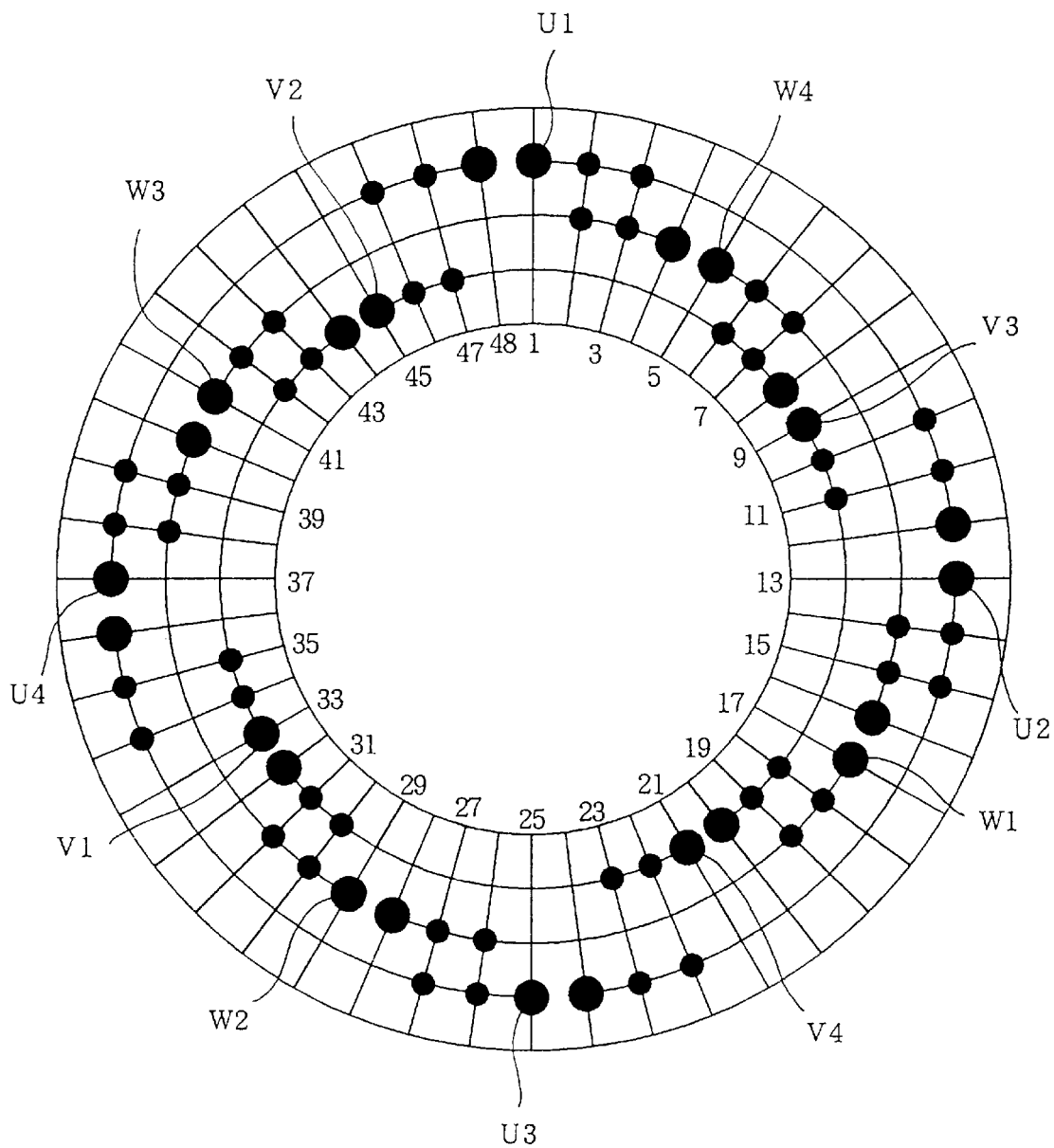
FIG. 6 illustrates an arrangement of coils of the armature winding of the first embodiment.

FIG. 5 illustrates arrangement of upper and lower coils and the number of turns of the coils in the winding arrangement shown in FIG. 1. FIG. 6 illustrates an arrangement of the coils shown in FIG. 5. Each solid arc designates a coil end and each black dot designates a coil side in FIG. 6. Each small black dot shows the case where only one coil is inserted in the slot, whereas each large black dot shows the case where two coils are inserted in the slot. Further, each large black dot shows that the number of turns of coil thereof is larger than that of each small lack dot.

In the insertion of coils, all the pole windings U1 to U4 of phase U are first inserted into the slots. All the pole windings V1 to V4 of phase V are then inserted into the slots. All the pole windings W1 to W4 of phase W are finally inserted into the slots. All the pole windings per phase can be simultaneously inserted into the slots when the pole windings are inserted into the slots in this order so that the double-layer, concentric-wound winding is composed. Consequently, the insertion of coils can be simplified and accordingly, the coils can be mechanically inserted into the slots.

Figure 7:
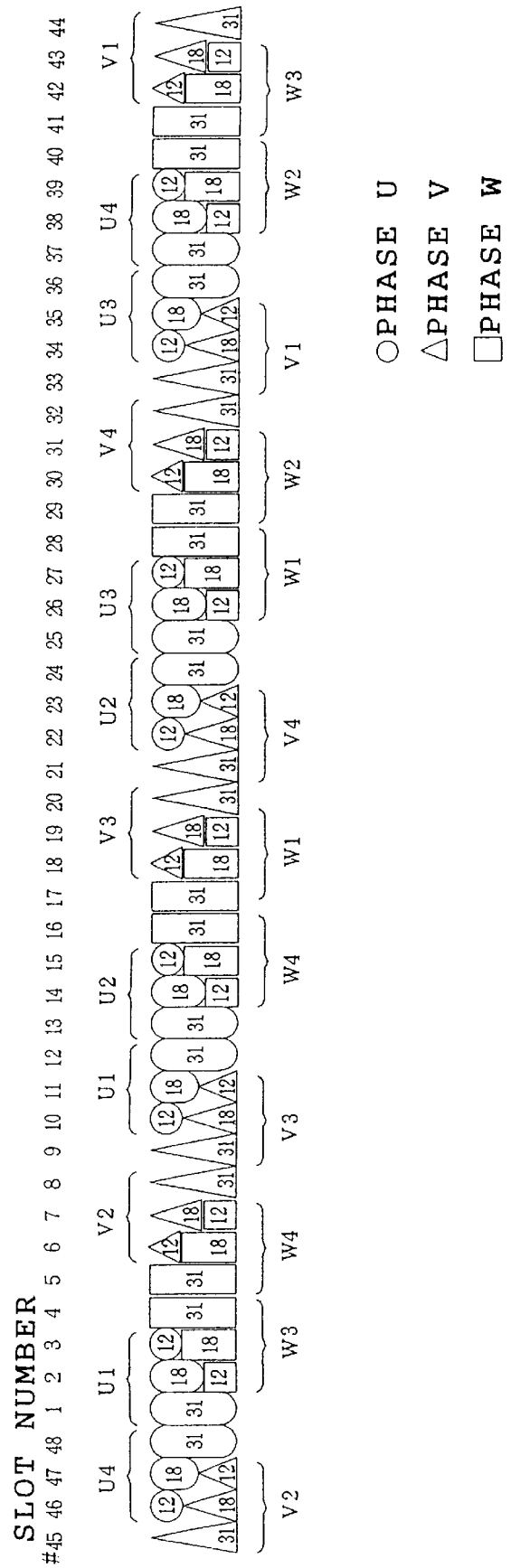
FIG. 7 illustrates the numbers of turns of coils inserted in the slots.

FIG. 7 shows the number of turns of the coil or coils in each slot in the embodiment. In the conventional sinusoidal winding composed into the double-layer, concentric-wound winding, the coils the number of which is identical with that of the slots per phase per pole, that is, four coils, are employed in each pole in each phase. Consequently, the upper and the lower coils in all the slots belong to the phases different from each other. In such a case, insulators need to be inserted into the slots to separate each coil from the other. In the above-described embodiment, however, the coils of different phases are inserted into a half of all the slots, that is, 24 slots which are slots #46, #47, #2, #3, #6, #7, #10, #11, #14, #15, #18, #19, #22, #23, #26, #27, #30, #31, #34, #35, #38, #39, #42, and #43.

Although the insulators are required for these slots, no insulators are required for the other 24 slots #45, #48, #1, #4, #5, #8, #9, #12, #13, #16, #17, #20, #21, #24, #25, #28, #29, #32, #33, #36, #37, #40, #41, and #44. Consequently, the number of steps in the assembly of armature winding can be reduced to a large extent. In the embodiment, furthermore, the number of coils per phase per pole is three, which number is smaller by one than that in the conventional arrangement. Consequently, the number of coil formers can be reduced.

Furthermore, the thickness of coil ends of the previously inserted coils of one phase and those of the subsequently inserted coils of another phase crossing each other is about one half of that in a single-layer concentric-wound winding. Accordingly, since the coil ends can be shaped with a smaller force, the damage applied to the coils can be reduced and the coils of the subsequent phase can be readily inserted.

The difference between the numbers of turns of two coils in each slot is small, that is, the difference of the sectional area between the coils is small. Accordingly, the coil inserting work for the second layer can be prevented from being worsened in the efficiency and the insulators can be prevented from being moved in the slots. According to the above-described arrangement of the embodiment, the coil insertion can be mechanized by a coil inserting machine as disclosed in publication No. 7-154949 of a Japanese unexamined patent application.

Figure 8:
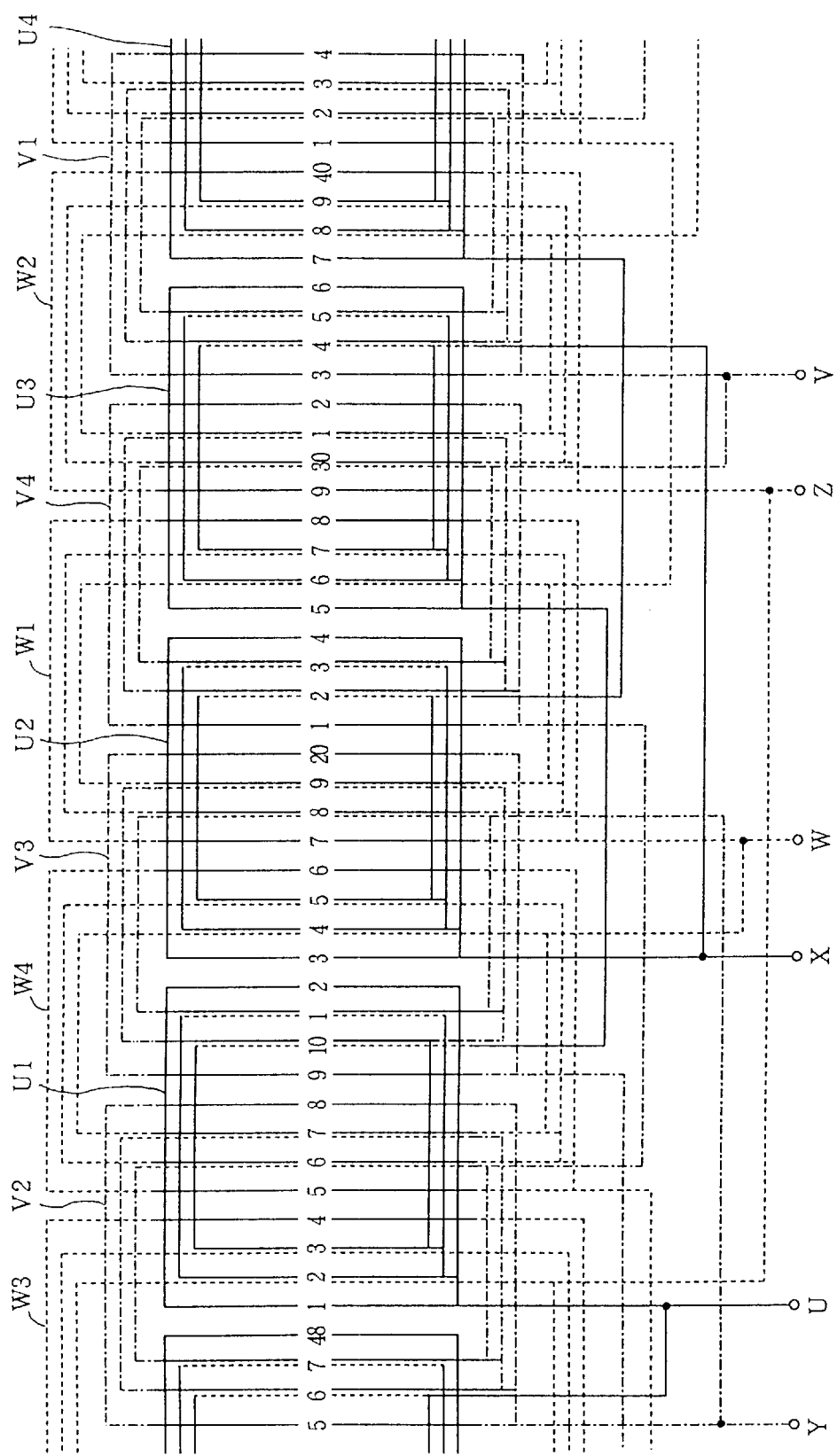
FIG. 8 is a development diagram of the armature winding of a modified form of the first embodiment.

In the winding arrangement as shown in FIG. 1, two parallel pole winding sets each including two series connected windings are between terminals U and X and accordingly, two parallel electrical paths are provided between the terminals. In FIG. 1, a parallel electrical path is composed of each of pairs of the windings U1 and U2, the windings U3 and U4, the windings V1 and V2, the windings V3 and V4, the winding W1 and W2, and the windings W3 and W4. Referring to FIGS. 8 showing a modified form of the first embodiment, a parallel electrical path may be composed of each of pairs of the windings U1 and U3, the windings U2 and U4, the windings V1 and V3, the windings V2 and V4, the windings W1 and W3, and the windings W2 and W4. The other arrangement is the same as shown in FIG. 1.

Figure 67:
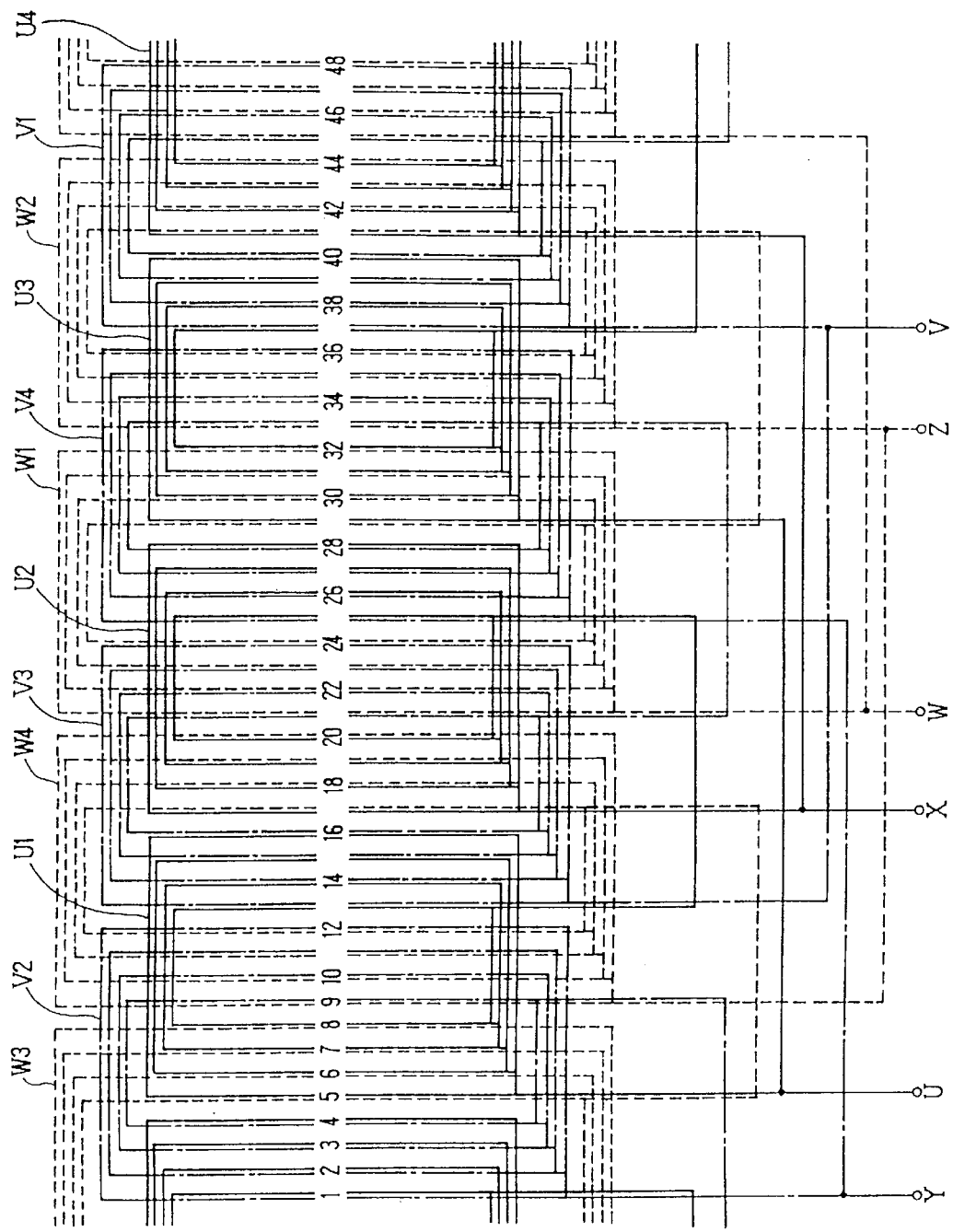
FIG. 67 is a development diagram of a fifth conventional armature winding composed into a sinusoidal winding type.
Figure 68:
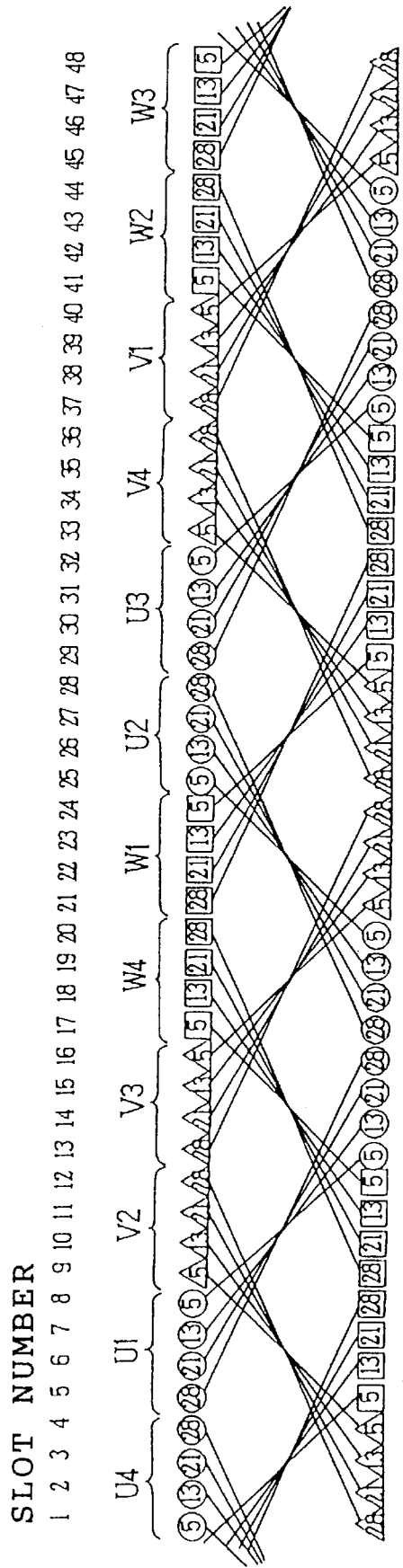
FIG. 68 illustrates the number of turns of coils inserted in slots in the fifth conventional armature winding shown in FIG. 67.
Figure 69:
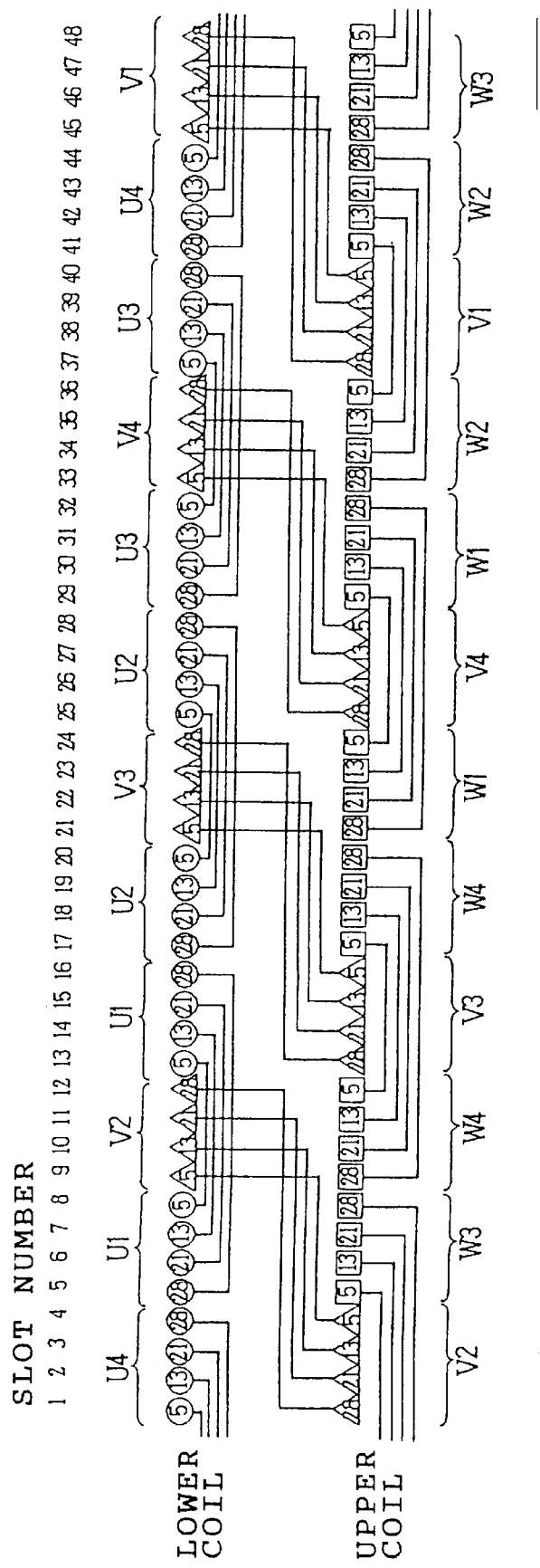
FIG. 69 illustrates a coil arrangement of the fifth conventional armature winding shown in FIG. 67.

The winding factor with respect to the fundamental wave is 0.933 in the number of turns of each coil in the embodiment, whereas it is 0.908 in the sinusoidal winding shown in FIGS. 67 and 70A. Thus, the winding factor is improved about 2.8%, which results in an improvement in the motor characteristics.

FIG. 2 exemplifies the number of turns of coils in each slot. For example, regarding the slots into which the windings of phase U are inserted, the number of turns is changed from N3 (=12) to N2 (=18), N1 (=31), N1, N2, and N3 sequentially in the slots #46 to #3 where N3≦N2<N1. That is, the number of turns is changed from N1 of the outermost of the concentric coils to N2, N3 and so on sequentially inwardly.

Furthermore, the armature winding of the first embodiment is composed into the double-layer, concentric-wound type. As obvious from slots #46 to #3 in FIG. 1, the total number of turns of the coils inserted into the respective slots is N3+N2, N2+N3, N1, N1, N2+N3, and N3+N2. The number of turns is uniformed substantially in all the slots when N1 is set to be shown as N1=(0.7 to 1.3)×(N2+N3). This proves that the sectional area of each slot is effectively used.

Figure 9:
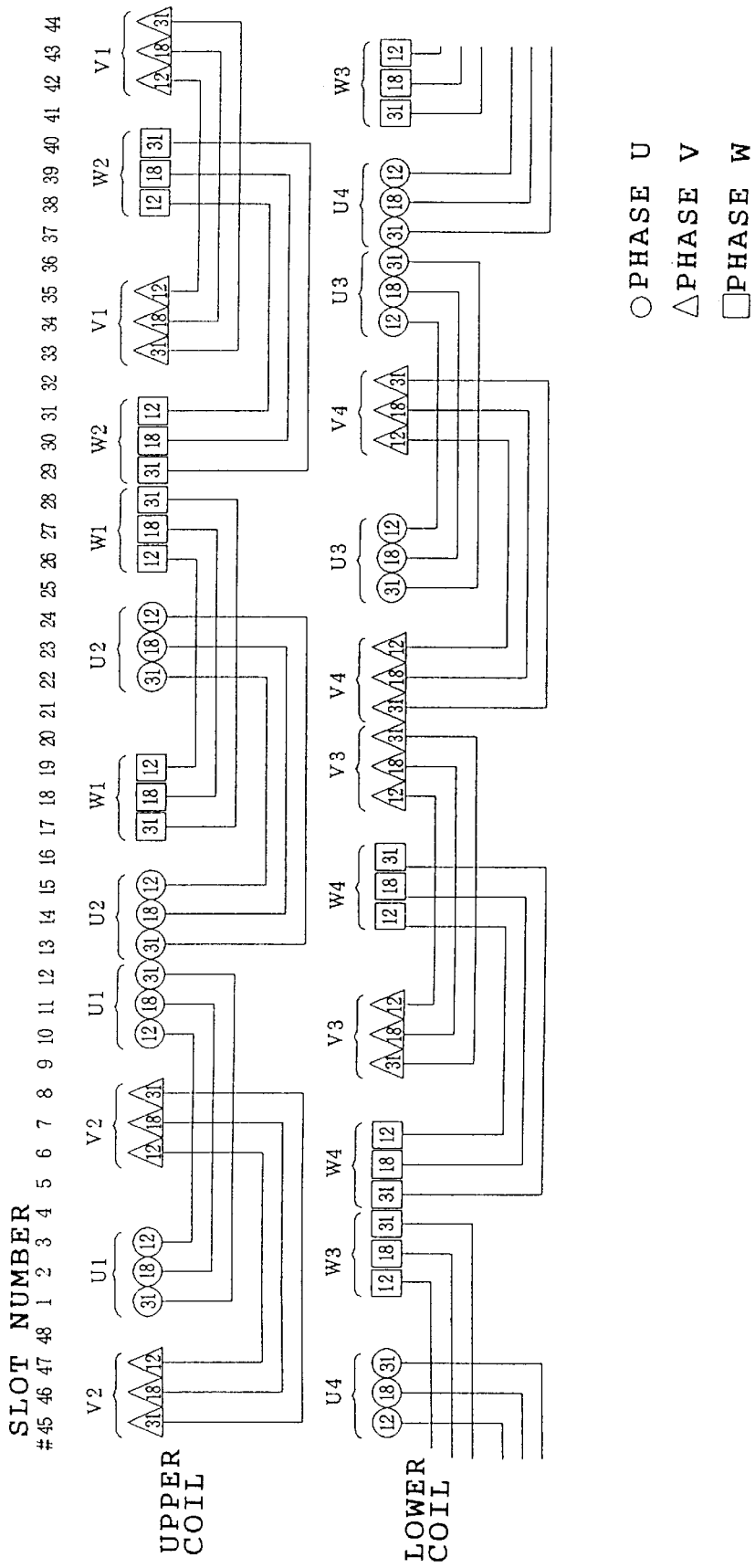
FIG. 9 illustrates an arrangement of made by a method upper and lower coils and the number of turns of each coil in the armature winding of a second embodiment in accordance with the present invention.
Figure 10:
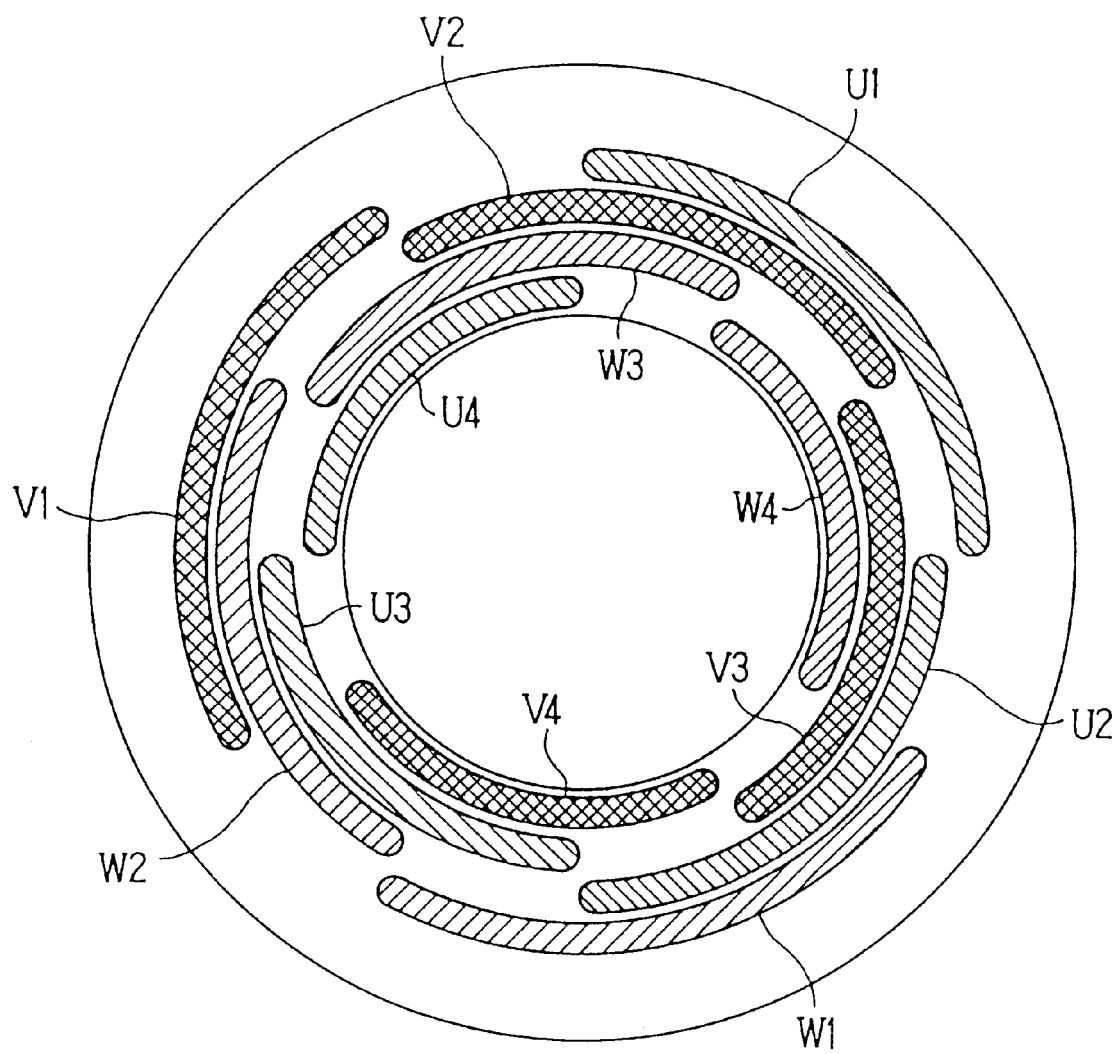
FIG. 10 illustrates a coil arrangement of the armature winding of the second embodiment as an example as viewed from the end winding side.
Figure 11:
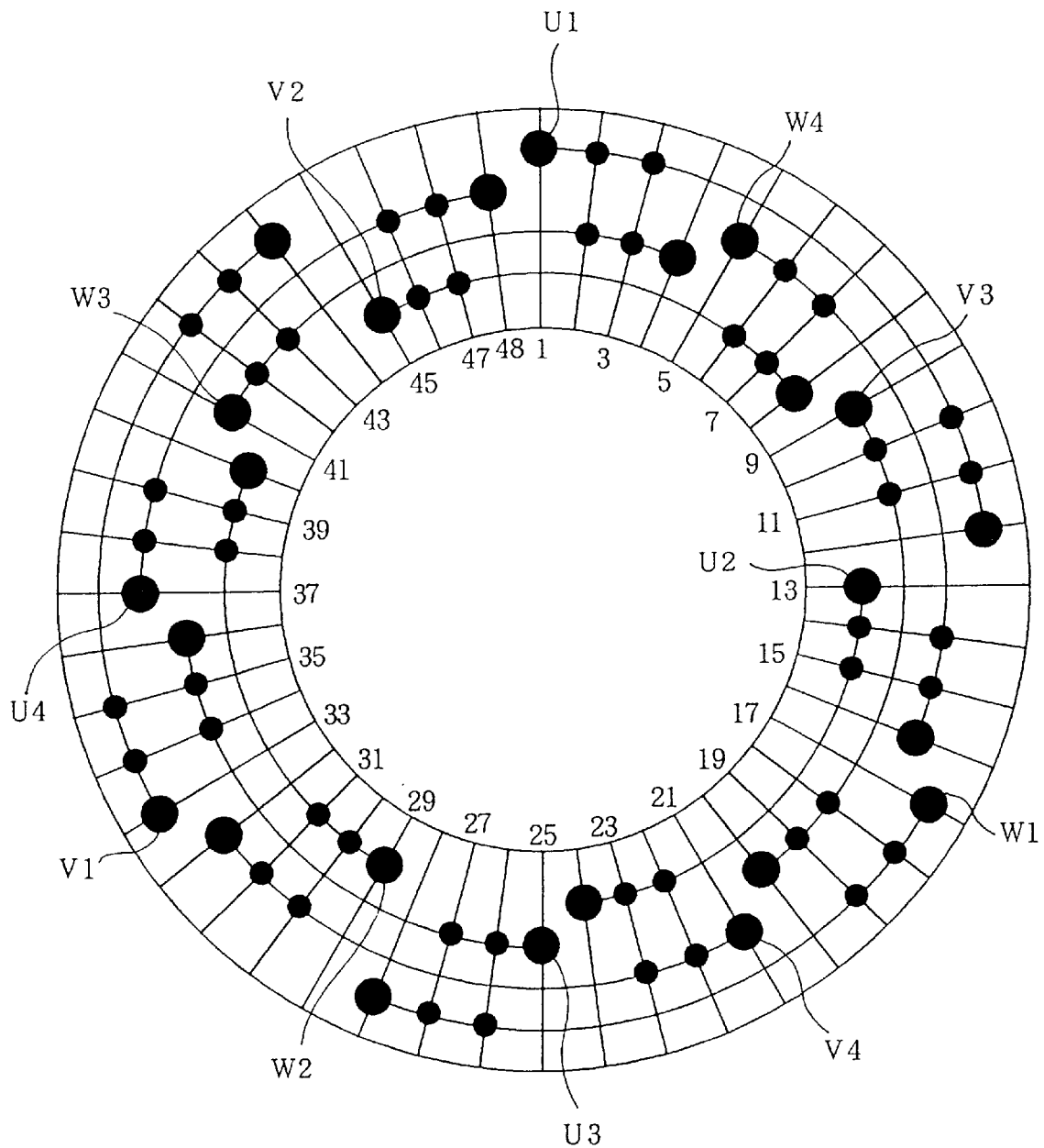
FIG. 11 illustrates an arrangement of coils of the armature winding as another example.

FIGS. 9 to 11 illustrate a second embodiment of the present invention. The second embodiment shows the double-layer, concentric-wound winding arrangement similar to that of the first embodiment. However, three pole windings corresponding to the same polarity of the respective phases are dispersively arranged in respective divided regions obtained by dividing a whole slot region of the armature core into three equally divided regions. For example, as shown in FIG. 9, the first pole winding U1 of phase U is dispersively arranged in slots #1 to #3 and #10 to #12. The first pole winding V1 of phase V is dispersively arranged in slots #33 to #35 and #42 to #44. The first pole winding W1 of phase W is dispersively arranged in slots #17 to #19 and #26 to #28.

Second pole windings U2, V2 and W2 of phases U, V and W are dispersively arranged in respective divided regions which are obtained by dividing the whole slot region of the armature core into three equally divided regions and which are shifted spatially or circumferentially from the divided regions for the first pole windings by $\pi/2$ corresponding to an angle of $2\pi/p$ where p is the number of poles. Third pole windings U3, V3 and W3 are dispersively arranged in divided regions which are obtained by dividing the whole slot region of the armature core into three equally divided regions and which are shifted spatially or circumferentially from the divided regions for the second pole windings by $\pi/2$. Fourth pole windings U4, V4 and W4 are dispersively arranged in divided regions which are obtained by dividing the whole slot region of the armature core into three equally divided regions and which are shifted spatially or circumferentially from the divided regions for the third pole windings by $\pi/2$.

The above-described coils are inserted into the slots in the following order. First, the first pole windings U1, V1 and W1 apart from one another by the angle of $2\pi/3$ are simultaneously inserted into the respective first divided regions. Then, the second pole windings U2, V2 and W2 apart from one another by the angle of $2\pi/3$ are simultaneously inserted into the respective second divided regions. The third pole windings U3, V3 and W3 and the fourth pole windings U4, V4 and W4 are inserted into the respective third and fourth divided regions in turn. Consequently, the insertion of all the coils is completed by four times of inserting work, which number is equal to the number of poles.

The procedure of the coil insertion will then be described with reference to FIG. 11. In a first coil insertion, a set of coils corresponding to the first pole windings U1, V1 and W1 and another set of coils corresponding to the fourth pole windings U4, V4 and W4 are set on a coil inserting machine not shown so that these coils are simultaneously into the slots. As obvious from FIG. 11, all the coil sides of the eighteen coils composing the first and the second pole windings are located at the lower sides of the slots. The first pole windings U1, V1 and W1 are apart from one another by an electrical angle of 240 degrees, and the fourth pole windings U4, V4 and W4 are also apart from one another by an electrical angle of 240 degrees. The first and the second poles are apart from each other by an electrical angle of 180 degrees. No two coils are simultaneously inserted into the same slot, whereupon the coils can be prevented from interfering with each other at the time of insertion.

In a second coil insertion, a set of coils corresponding to the second pole windings U2, V2 and W2 and another set of coils corresponding to the fourth pole windings U3, V3 and W3 are simultaneously inserted into the slots. As obvious from FIG. 11, all the coil sides of the eighteen coils composing the third and the fourth pole windings are located at the upper sides of the slots. The second pole windings U2, V2 and W2 are apart from one another by an electrical angle of 240 degrees, and the fourth pole windings U3, V3 and W3 are also apart from one another by an electrical angle of 240 degrees. The third and the fourth poles are apart from each other by an electrical angle of 180 degrees. No two coils are simultaneously inserted into the same slot, whereupon the coils can be prevented from interfering with each other at the time of insertion.

In the second insertion, the coils corresponding to the third and the fourth pole windings are inserted into the upper interior of the slots so as to be laid on the coil sides of the first or second pole coils which have already been inserted in the lower side thereof. Thus, in the second embodiment, all the coils are inserted into all the slots by two inserting works by means of the coil inserting machine, which number is equal to a half of the pole number. Consequently, the number of working steps can be reduced.

In the armature winding composed as described above, two coil sides are inserted in each slot such that a double-layer, concentric-wound armature winding is provided. FIGS. 10 and 11 illustrate the arrangement of the coils. In the illustrated arrangement, the coil ends in each phase are arranged sequentially radially per pole such that the pole windings of the three phases are arranged in the same annular area. Consequently, the winding impedance is balanced among the phases. According to the second embodiment, the coils can be mechanically inserted into the slots to be composed into the double-layer, concentric-wound winding.

Figure 12:
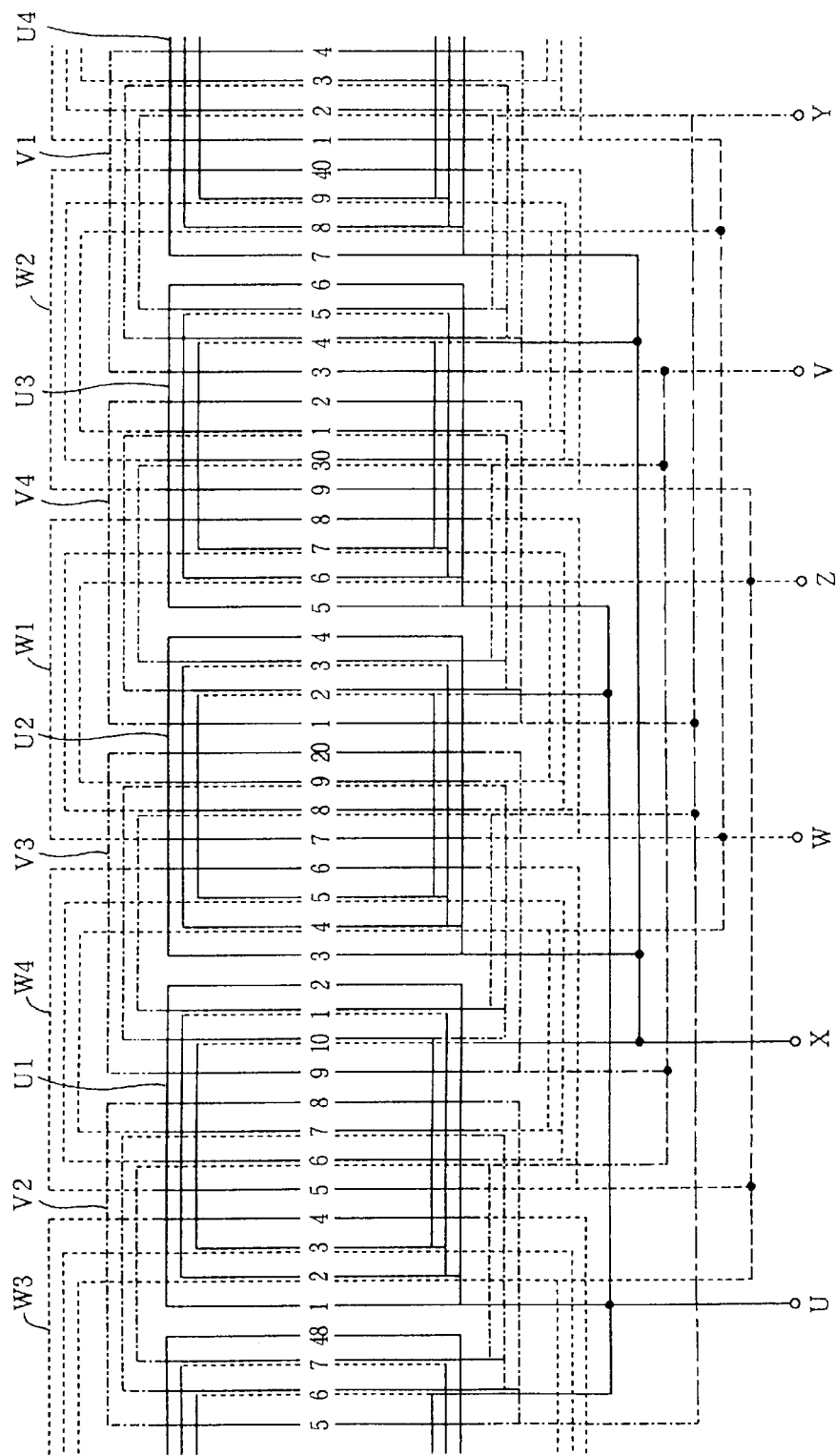
FIG. 12 is a development diagram of made by a method the armature winding of a third embodiment in accordance with the invention.

FIG. 12 illustrates a third embodiment of the invention. The third embodiment shows a four-pole 48-slot armature winding with four parallel electrical paths. Since the three phases comprise four windings, that is, the pole windings U1 to U4, V1 to V4, and W1 to W4 respectively, the four parallel electrical paths can be provided between the terminals U and X. The other arrangement of the armature winding of the third embodiment is the same as shown in FIG. 1.

According to the third embodiment, the number of parallel electrical paths can be set at p where p is the number of poles. Consequently, the freedom in the design of the armature winding can be improved. Of course, the number of parallel electrical paths may be one.

Figure 13:
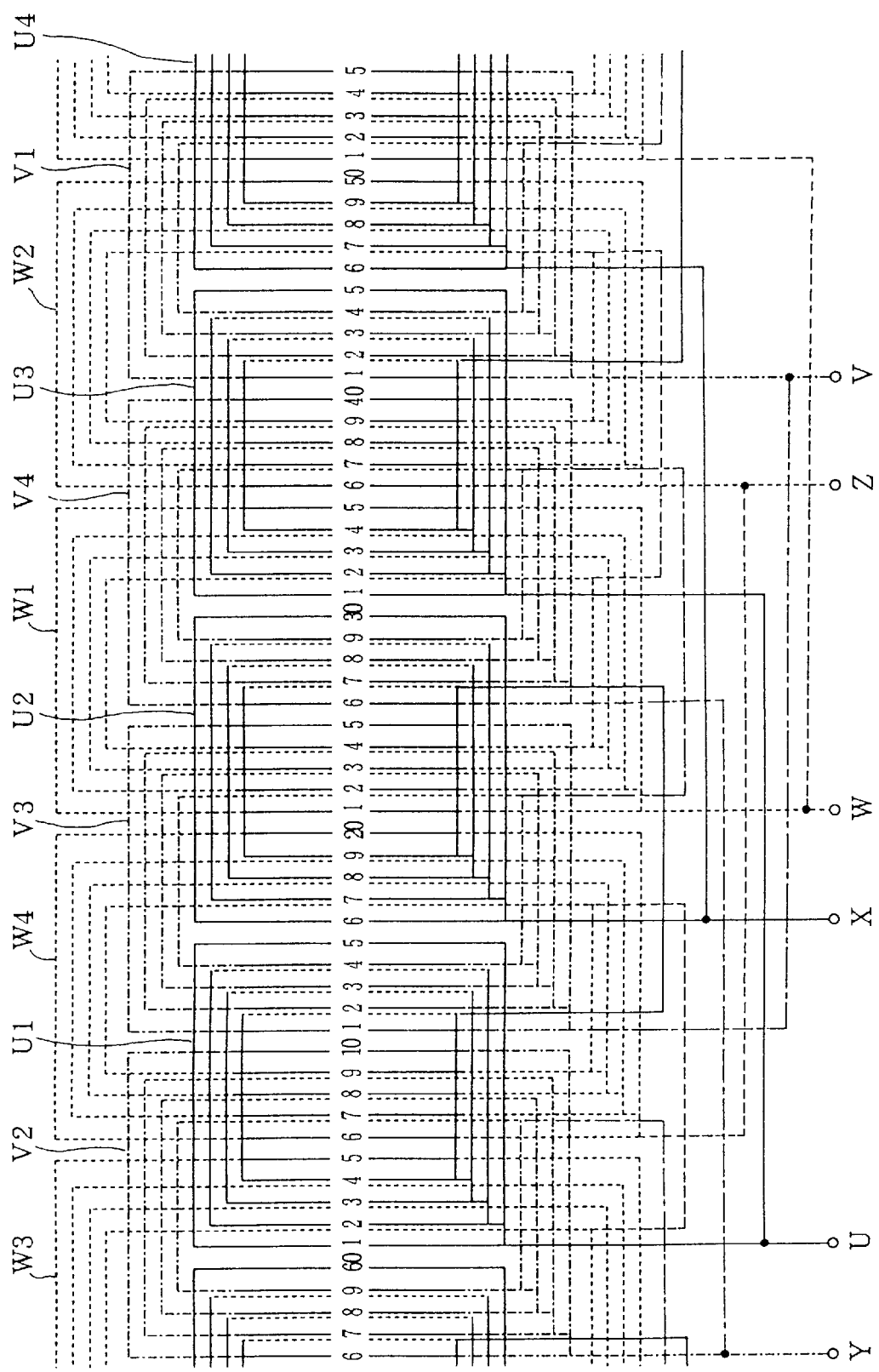
FIG. 13 is a development diagram of the armature winding of made by a method a fourth embodiment in accordance with the invention.

FIG. 13 illustrates a fourth embodiment of the present invention. The fourth embodiment shows a four-pole 60-slot armature winding with two parallel electrical paths. The number q of slots per phase per pole is obtained as 60/(3×4)=5. Each pole winding of each phase consists of four (=q−1), concentrically distributed, continuous coils. Thus, the armature winding is composed into a double-layer, concentric-wound winding comprising 12 concentric-wound coils including pole windings U1, U2, U3 and U4 of phase U, pole windings V1, V2, V3 and V4 of phase V, and pole windings W1, W2, W3 and W4 of phase W.

Figure 15:
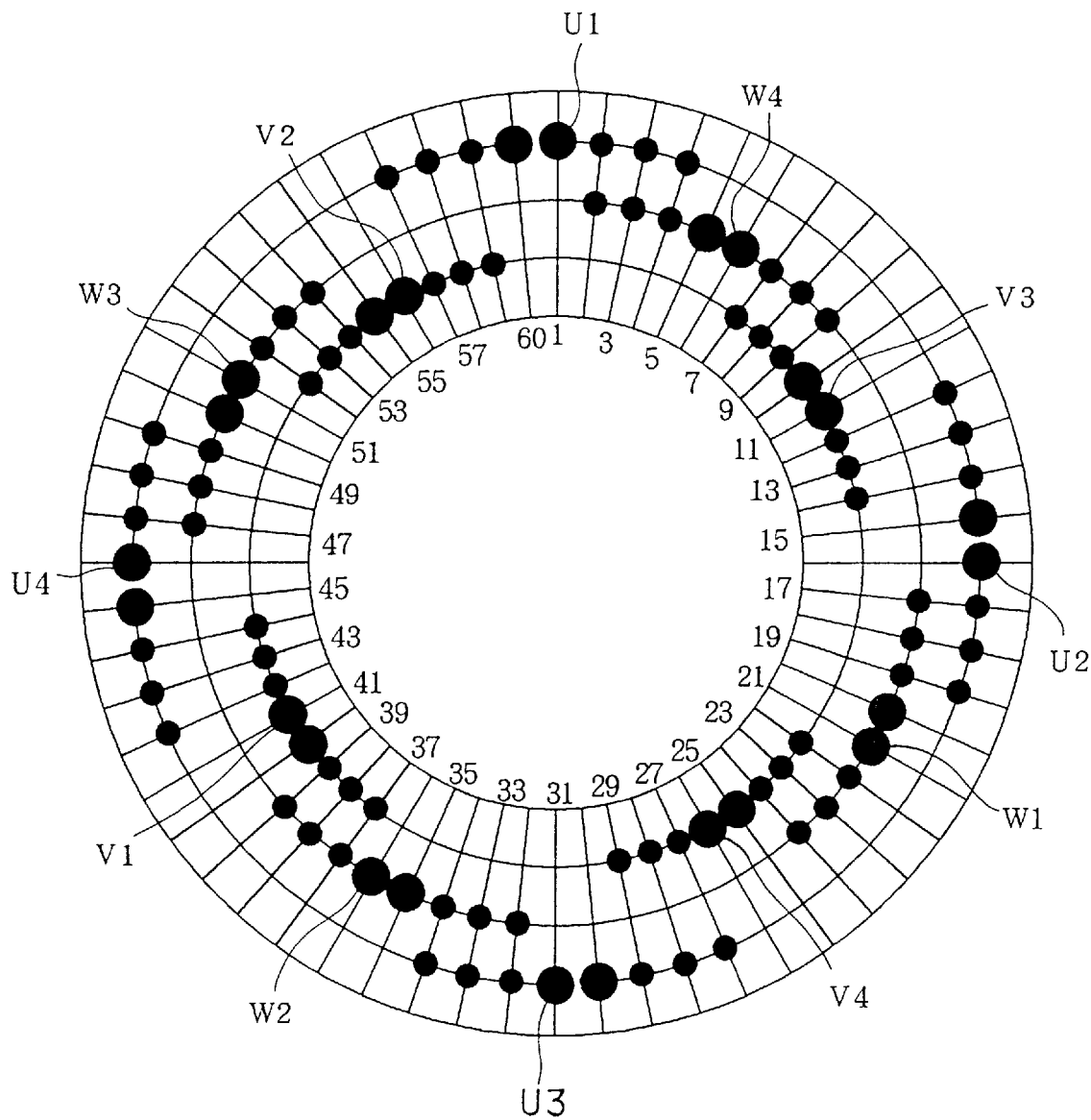
FIG. 15 illustrates a coil arrangement of the armature winding of the fourth embodiment as an example as viewed from the end winding side.

The fourth embodiment shows that a sinusoidal winding can be composed into a double-layer, concentric-wound winding even when the number of slots is changed from 48 to 60. FIG. 15 exemplifies the number of turns of coils in each slot. For example, regarding the slots into which the windings of phase U are inserted, the number of turns is changed from N4 to N3, N2, N1, N1, N2, N3 and N4 sequentially in the slots #57 to #4 where N4≦N3≦N2<N1. That is, the number of turns is changed from N1 of the outermost of the concentric coils to N2, N3 and so on sequentially inwardly.

Furthermore, the armature winding of the fourth embodiment is composed into the double-layer, concentric-wound type. As obvious from slots #57 to #4 in FIG. 15, the total number of turns of the coils inserted into the respective slots is N4+N2, N3+N3, N2+N4, N1, N1, N4+N2, N3+N3 and N2+N4. The number of turns is uniformed substantially in all the slots when N1 is set to be shown as N1=(0.7 to 1.3)×(N2+N4)=(1.4 to 2.6)×N3. This proves that the sectional area of each slot is effectively used.

Figure 14:
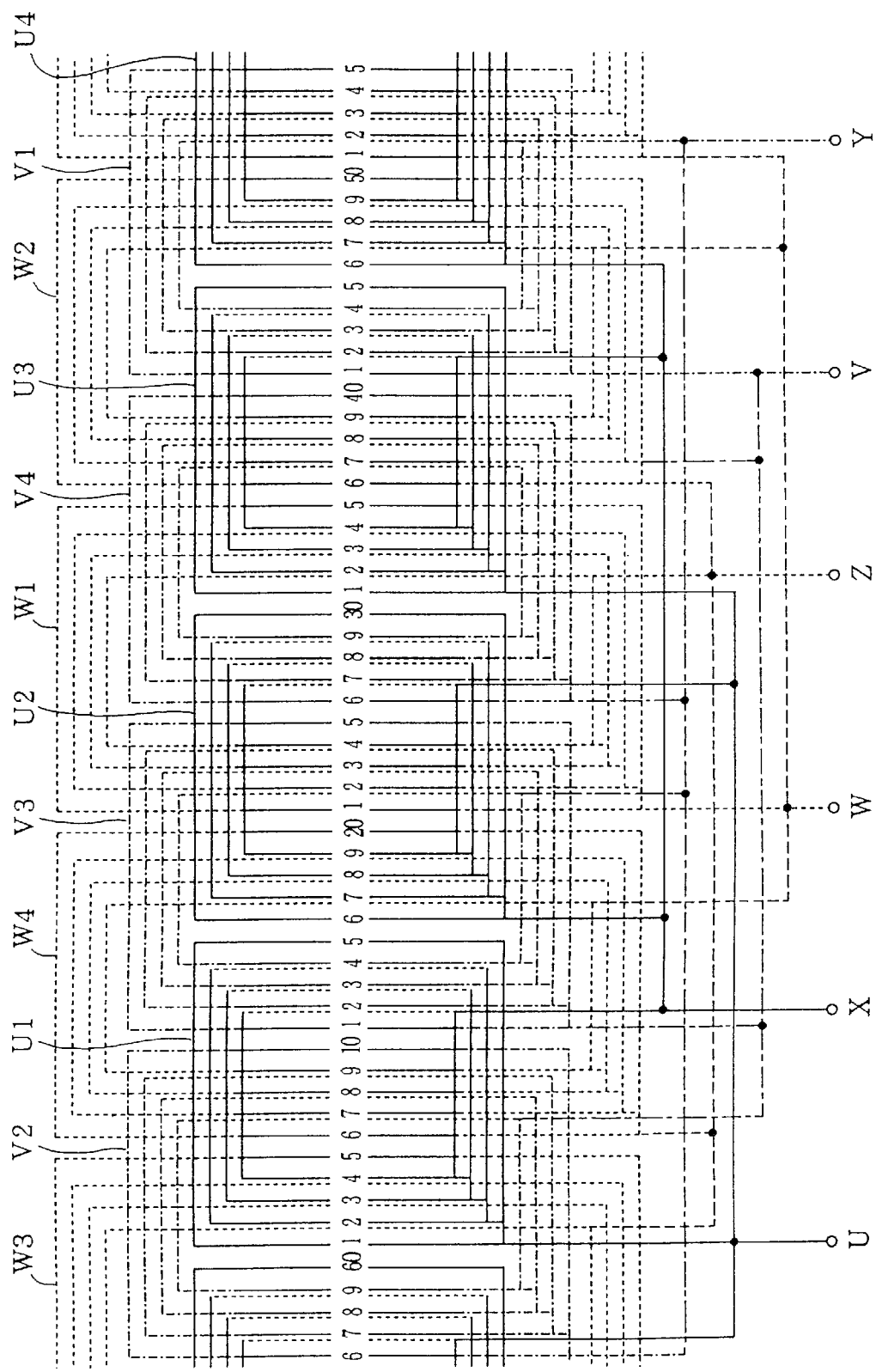
FIG. 14 is a development diagram of the armature winding of a first modified form of the fourth embodiment.
Figure 16:
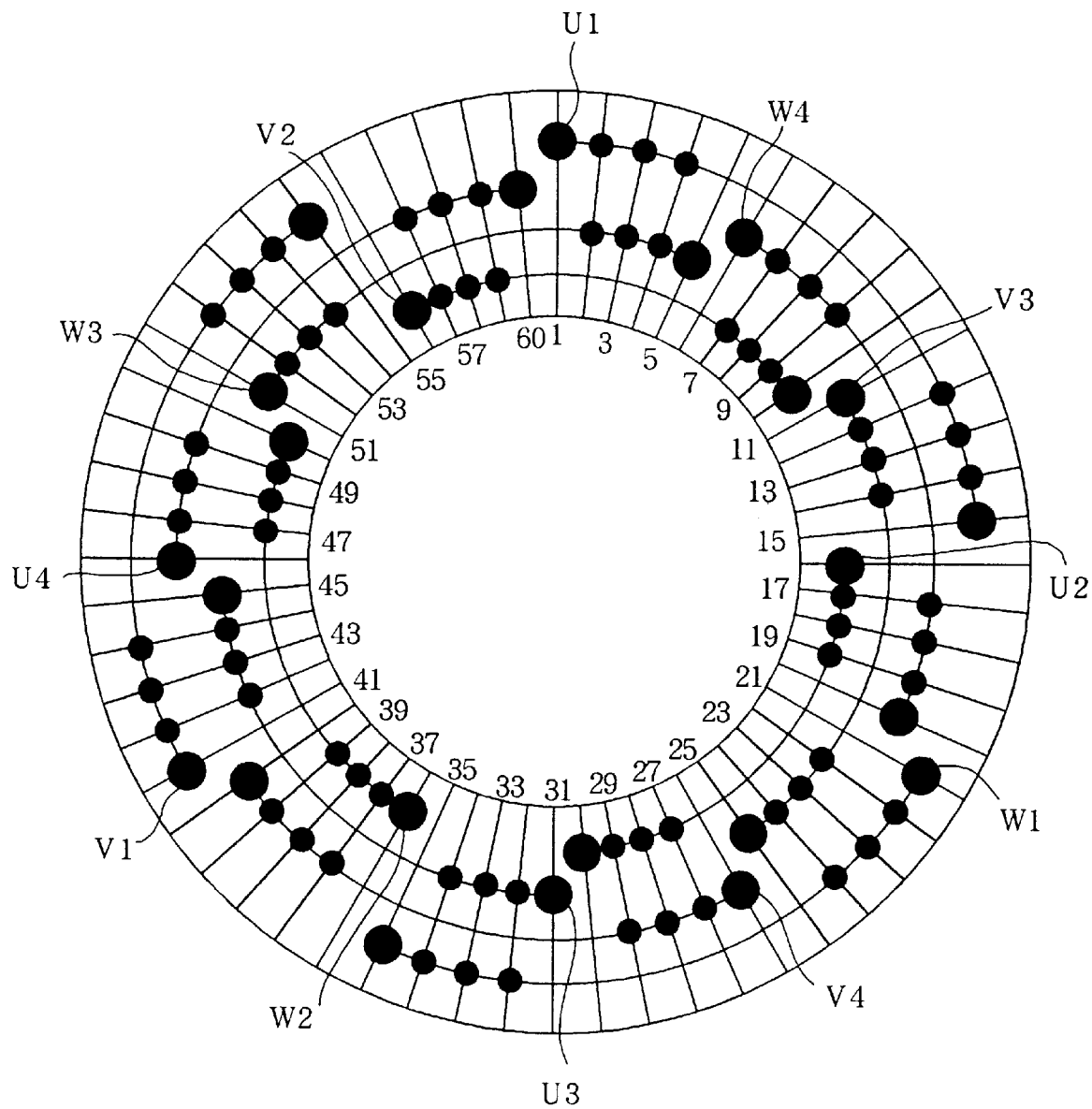
FIG. 16 illustrates a coil arrangement of the armature winding of the fourth embodiment as another example as viewed from the end winding side.

FIG. 14 illustrates a first modified form of the fourth embodiment wherein the number of parallel electrical paths is changed from 2 to 4. For example, in phase U, the pole windings U1 to U4 are connected in parallel with one another between terminals U and X such that four parallel electrical paths are between the terminals. This holds in each of phases V and W. FIGS. 15 and 16 show different examples of coil arrangement of the windings shown in FIGS. 13 and 14 respectively. Coils of all the poles in the same phase are simultaneously inserted into the slots in the arrangement in FIG. 15, whereas the windings of two poles in all the phases are simultaneously inserted into the slots in the arrangement in FIG. 16.

Figure 17:
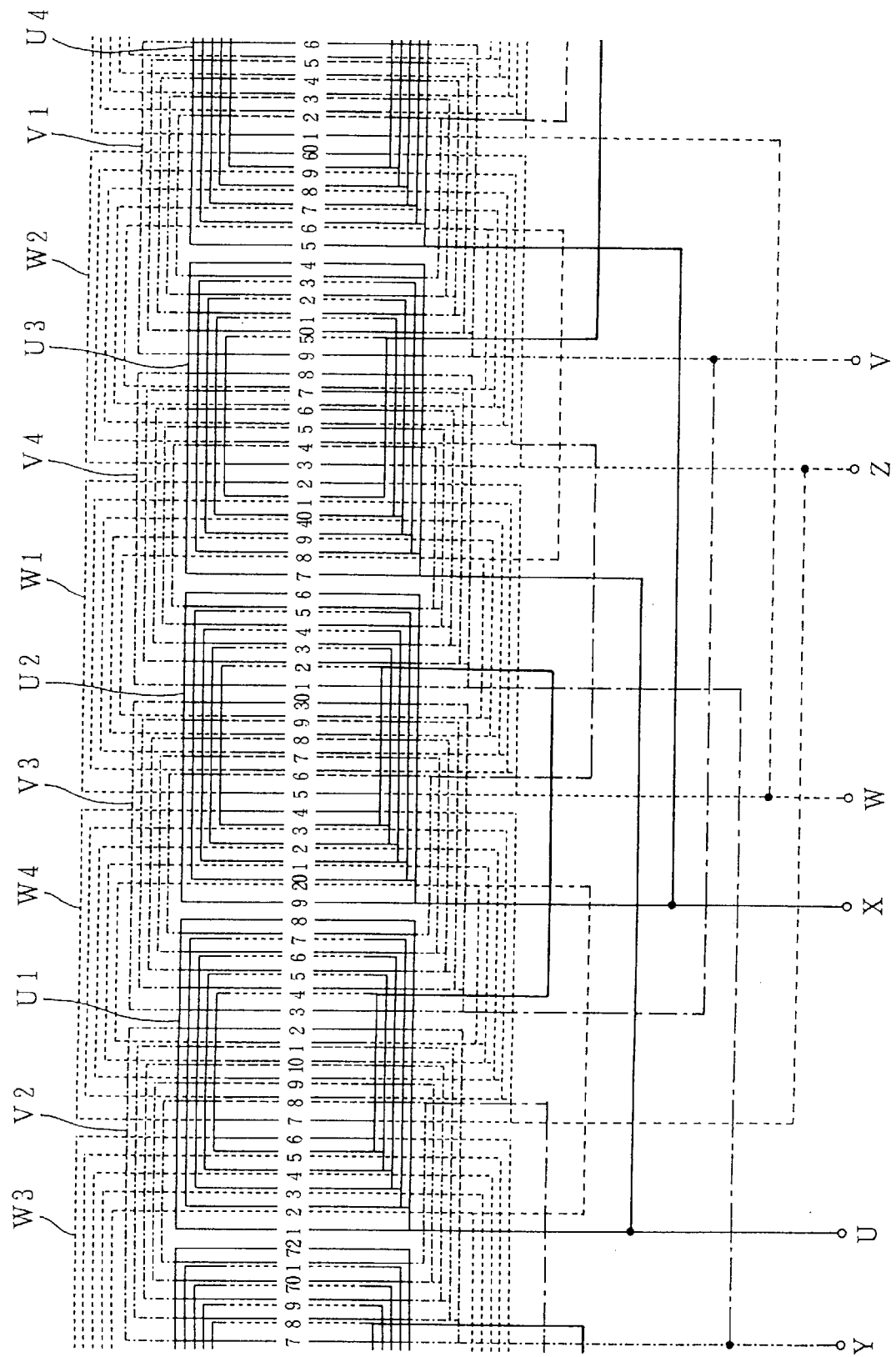
FIG. 17 is a development diagram of the armature winding of a second modified form of the fourth embodiment.

FIG. 17 illustrates a second modified form of the fourth embodiment wherein the armature winding is composed into a four-pole, 72-slot winding with two parallel electrical paths. The number q of slots per phase per pole is obtained as 72/(3×4)=6. Each pole winding of each phase consists of five (=q−1), concentrically distributed, continuous coils. Thus, the armature winding is composed into a double-layer, concentric-wound winding comprising 12 concentric-wound coils including pole windings U1, U2, U3 and U4 of phase U, pole windings V1, V2, V3 and V4 of phase V, and pole windings W1, W2, W3 and W4 of phase W.

The above-described arrangement shows that a sinusoidal winding can be composed into a double-layer, concentric-wound winding even when the number of slots is changed to 72. Regarding slots #68 to #5 in which coils of phase U are inserted, the number of turns is changed from N5 to N4, N3, N2, N1, N1, N2, N3, N4 and N5 sequentially in the slots #68 to #5 where N5≦N4≦N3≦N2<N1. That is, the number of turns is changed from N1 of the outermost of the concentric coils to N2, N3, N4 and N5 sequentially circumferentially.

Furthermore, the armature winding of the second modified form is composed into the double-layer, concentric-wound type. As obvious from slots #68 to #5 in FIG. 17, the total number of turns of the coils inserted into the respective slots is N5+N2, N4+N3, N3+N4, N2+N5, N1, N1, N5+N2, N3+N4, N3+N4 and N2+N5. The number of turns is uniformed substantially in all the slots when N1 is set to be shown as N1=(0.7 to 1.3)×(N2+N5)=(0.7 to 1.3)×(N3+N4). This proves that the sectional area of each slot is effectively used.

Figure 18:
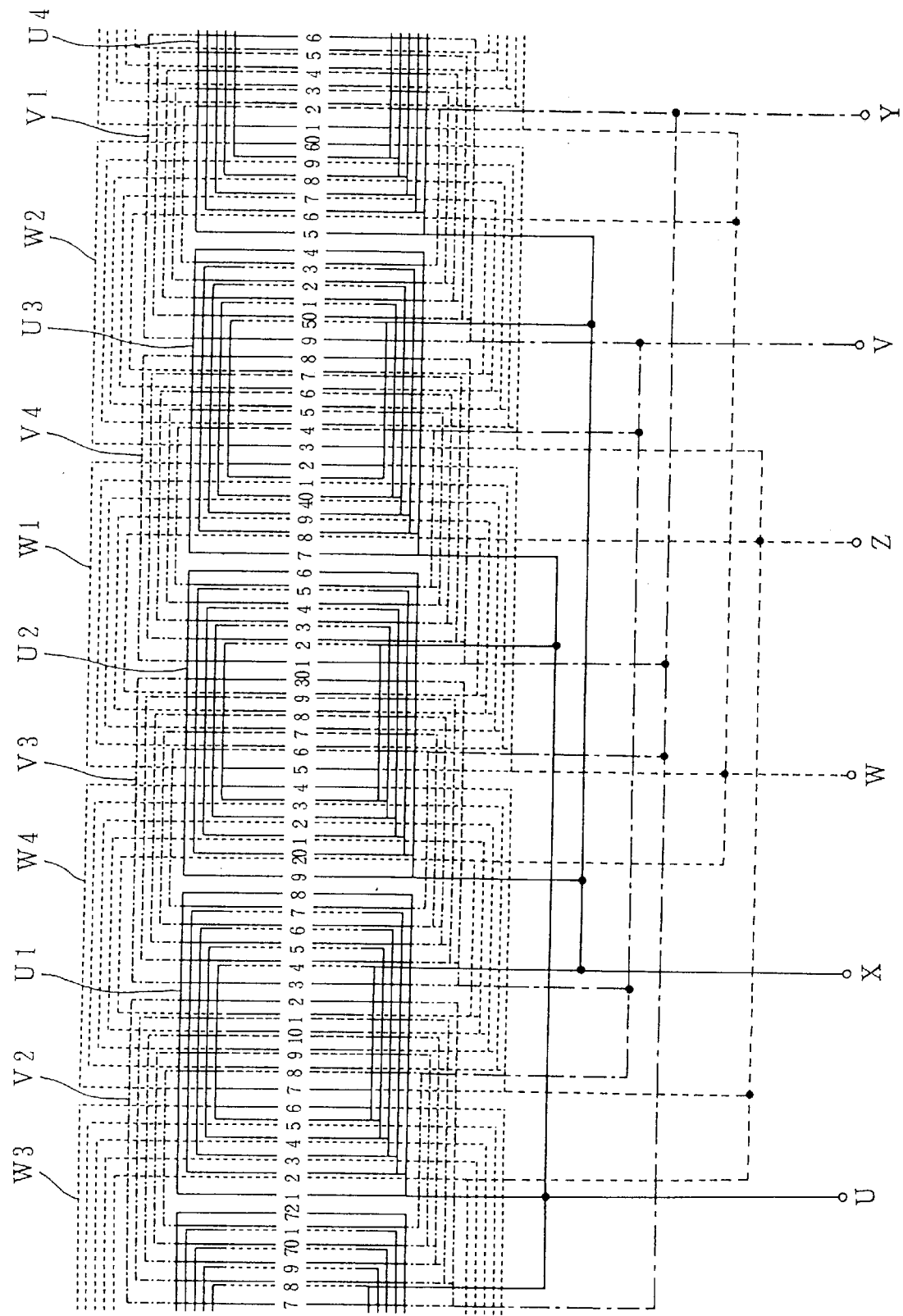
FIG. 18 is a development diagram of the armature winding of a third modified form of the fourth embodiment.

FIG. 18 illustrates a third modified form of the fourth embodiment. The number of parallel electrical paths is changed from 2 to 4 in the third embodiment. For example, in phase U, the pole windings U1 to U4 are connected in parallel with one another between terminals U and X such that four parallel electrical paths are between the terminals. This holds in each of phases V and W. In the fourth embodiment, furthermore, the pole windings U1, U2, V1, V2, W1 and W2 can be simultaneously inserted to the slots. Consequently, all the coils can be inserted into the slots by two times of the coil insertion.

Figure 19:
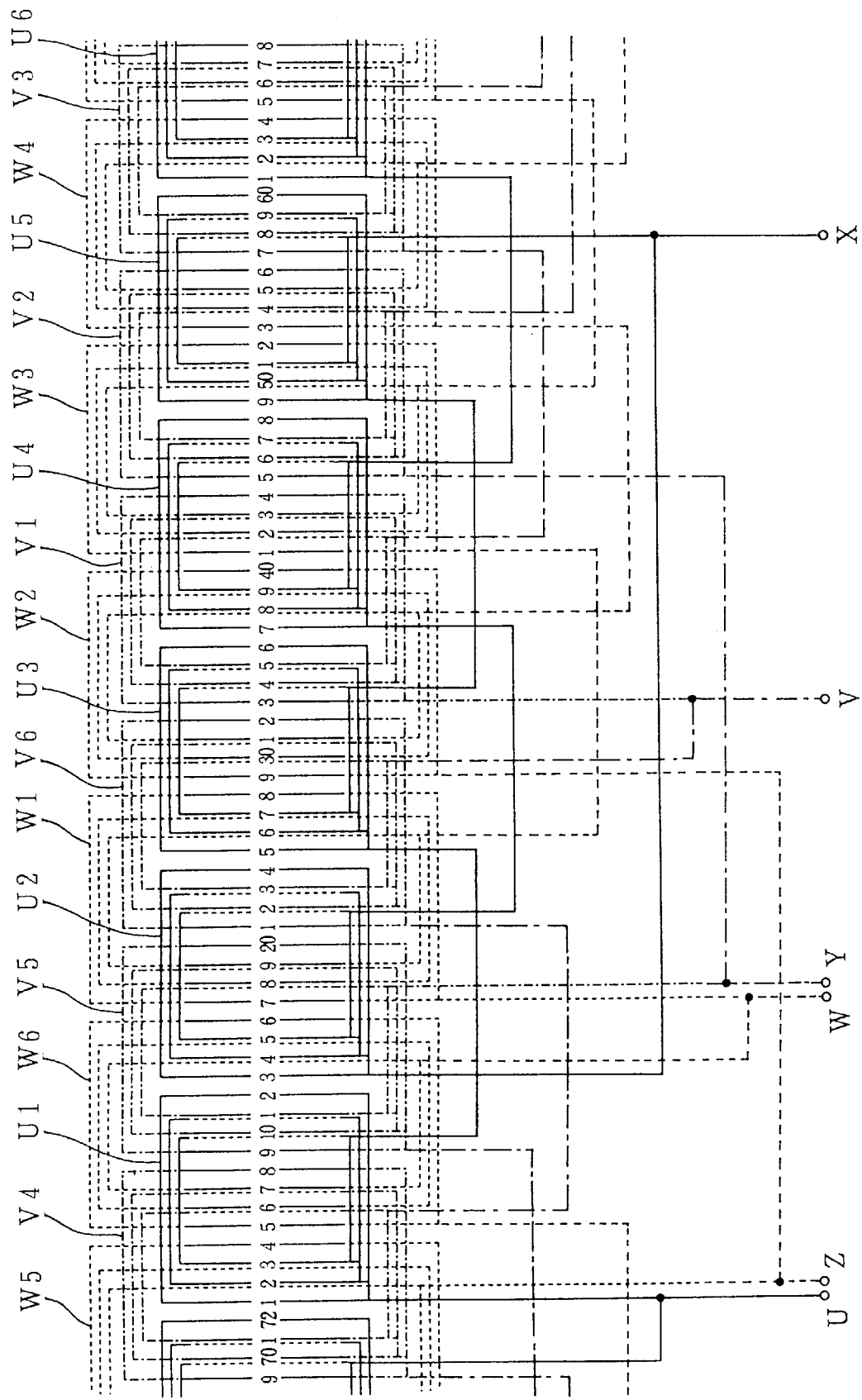
FIG. 19 is a development diagram of the armature winding of made by a method a fifth embodiment in accordance with the present invention.

FIG. 19 illustrates a fifth embodiment of the present invention. The fifth embodiment shows a six-pole 72-slot winding with two parallel electrical paths between terminals U and X. The number q of slots per phase per pole is obtained as 72/(3×6)=4. Each pole winding of each phase consists of three (=q−1), concentrically distributed, continuous coils. Thus, the armature winding is composed into a double-layer, concentric-wound winding comprising 18 concentric-wound coils including pole windings U1, U2, U3, U4, U5 and U6 of phase U, pole windings V1, V2, V3, V4, V5 and V6 of phase V, and pole windings W1, W2, W3, W4, W5 and W6 of phase W.

As obvious from FIG. 19, it can be understood that a sinusoidal winding can be composed into a double-layer, concentric-wound winding even when the number of poles is changed from 4 to 6. Since each phase has six pole windings, the number of parallel electrical paths can be 2 or 6.

For example, in the slots #70 to #3 into which the windings of phase U are inserted, the number of turns of the coils is changed from N3 to N2, N1, N1, N2 and N3 sequentially where N3≦N2<N1. That is, the number of turns is changed from N1 of the outermost of the concentric coils to N2, N3 and so on sequentially inwardly. Furthermore, the armature winding of the fifth embodiment is composed into the double-layer, concentric-wound type. As obvious from slots #70 to #3 in FIG. 19, the total number of turns of the coils inserted into the respective slots is N3+N2, N2+N3, N1, N1, N3+N2 and N2+N3. The number of turns is uniformed substantially in all the slots when N1 is set to be shown as N1=(0.7 to 1.3)×(N2+N3). This proves that the sectional area of each slot is effectively used.

Figure 20:
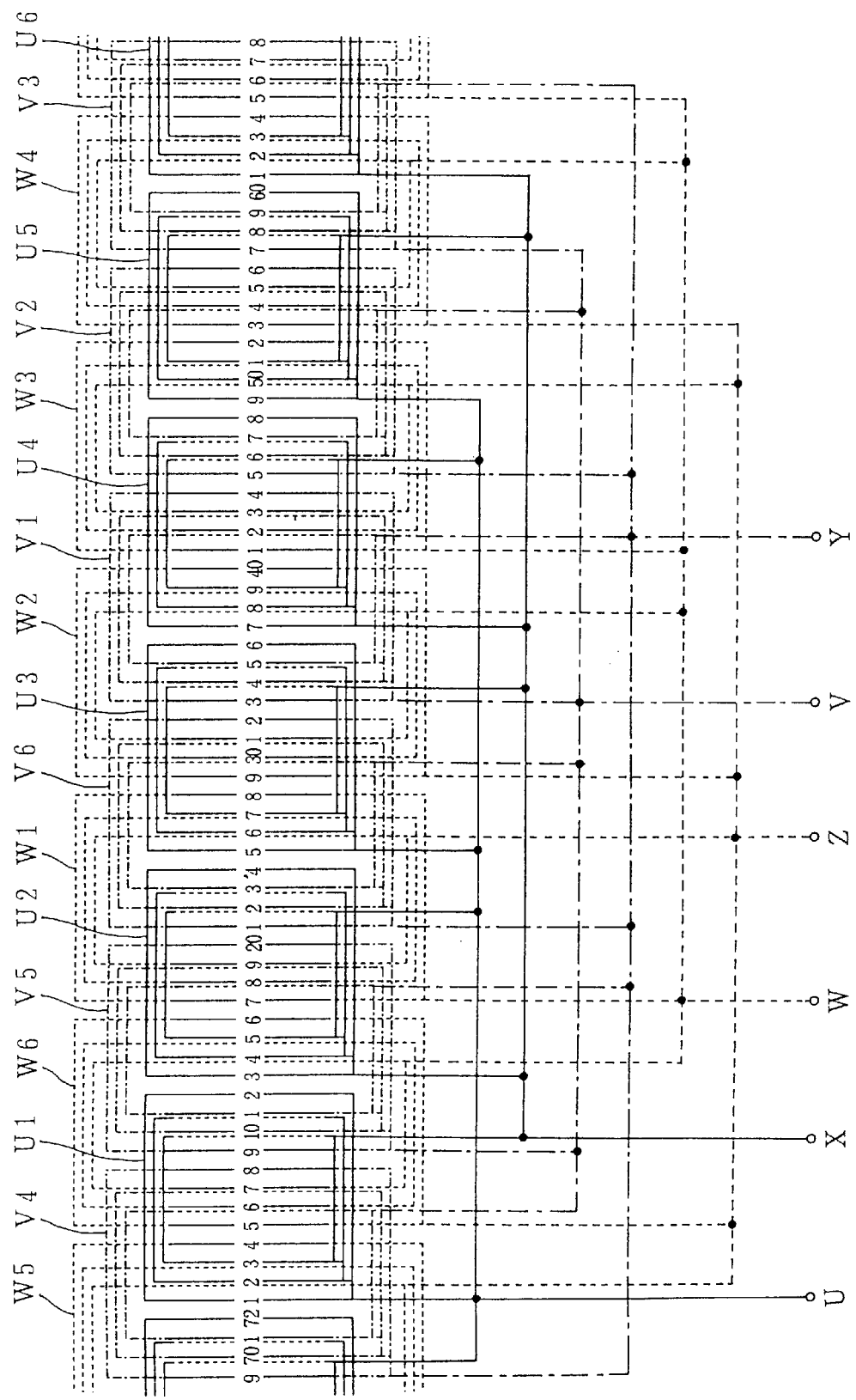
FIG. 20 is a development diagram of the armature winding of a first modified form of the fifth embodiment.

FIG. 20 shows a first modified form of the fifth embodiment. The armature winding is composed into a six-pole 72-slot winding with six parallel electrical paths in this modified form. Thus, since six parallel electrical paths are provided in the six-pole arrangement, the degree of freedom in the design of the armature winding can be improved.

Figure 21:
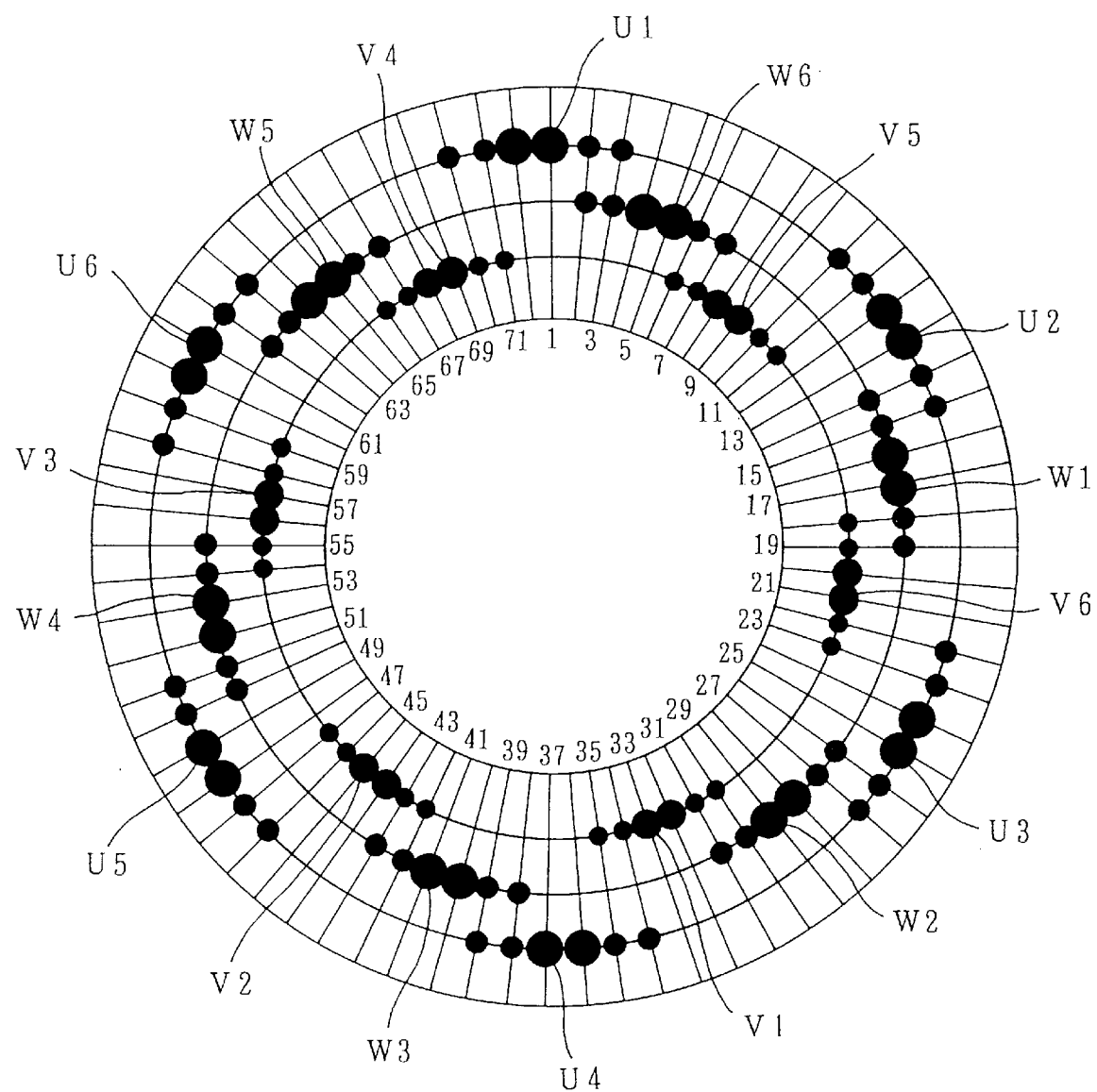
FIG. 21 illustrates a coil arrangement of the armature winding of the fifth embodiment as one example.

FIGS. 21 and 22 show two examples of the coil arrangement in a six-pole 72-slot armature winding applicable to the windings shown in FIGS. 19 and 20. In the arrangement of FIG. 21, the coils are inserted into the slots in the same manner as in the arrangement shown in FIG. 15.

The procedure of the coil insertion in the winding arrangement shown in FIG. 22 will then be described. In a first coil insertion, a set of coils corresponding to a first group of windings U1, U3 and U5 of the first phase and another set of coils corresponding to a first group of windings W6, W2 and W4 of the third phase are set on a coil inserting machine not shown so that these coils are simultaneously into the slots. As obvious from FIG. 22, all the coil sides of the eighteen coils composing these sets are located at the lower sides of the slots. The first phase windings U1, U3 and U5 are apart from one another by an electrical angle of 360 degrees, and the third phase windings W6, W2 and W4 are also apart from one another by an electrical angle of 360 degrees. The first and the third phases are apart from each other by an electrical angle of 60 degrees. No two coils are simultaneously inserted into the same slot, whereupon the coils can be prevented from interfering with each other at the time of insertion.

In a second coil insertion, a set of coils corresponding to a second group of windings V5, V1 and V3 of the second phase and another set of coils corresponding to a second group of windings U2, U4 and U6 of the first phase are simultaneously inserted into the slots. As obvious from FIG. 22, all the coil sides of the eighteen coils composing these windings are inserted into both upper and lower sides of the slots. The first phase windings U2, U4 and U6 are apart from one another by an electrical angle of 360 degrees, and the second phase windings V5, V1 and V3 are also apart from one another by an electrical angle of 360 degrees. The first and the second phases are apart from each other by an electrical angle of 60 degrees. No two coils are simultaneously inserted into the same slot, whereupon the coils can be prevented from interfering with each other at the time of insertion.

In a third coil insertion, a set of coils corresponding to a third group of windings W1, W3 and W5 of the third phase and another set of coils corresponding to a third group of windings V6, V2 and V4 of the second phase are simultaneously inserted into the slots. As obvious from FIG. 22, all the coil sides of the eighteen coils corresponding to these windings are inserted into the upper sides of the slots. The third phase windings W1, W3 and W5 are apart from one another by an electrical angle of 360 degrees, and the second phase windings V6, V2 and V4 are also apart from one another by an electrical angle of 360 degrees. The second and the third phases are apart from each other by an electrical angle of 60 degrees. No two coils are simultaneously inserted into the same slot, whereupon the coils can be prevented from interfering with each other at the time of insertion.

As obvious from FIG. 22, in the second insertion, the coils corresponding to the first and second phase windings are inserted into the upper and lower sides of the slots so as to be laid on the coil sides of the first or third phase coils which have already been inserted in the lower sides thereof. Finally, in the third insertion, the coils corresponding to the second and the third phase windings are inserted into the upper sides of the slots so as to be laid on the coil sides of the first to third phase coils have already been inserted in the lower sides of the slots. Thus, in the above-described modified form, all the coils are inserted into all the slots by three times of the coil insertion, which number of times is equal to a half of the pole number. Consequently, the number of working steps can be reduced.

Figure 23:
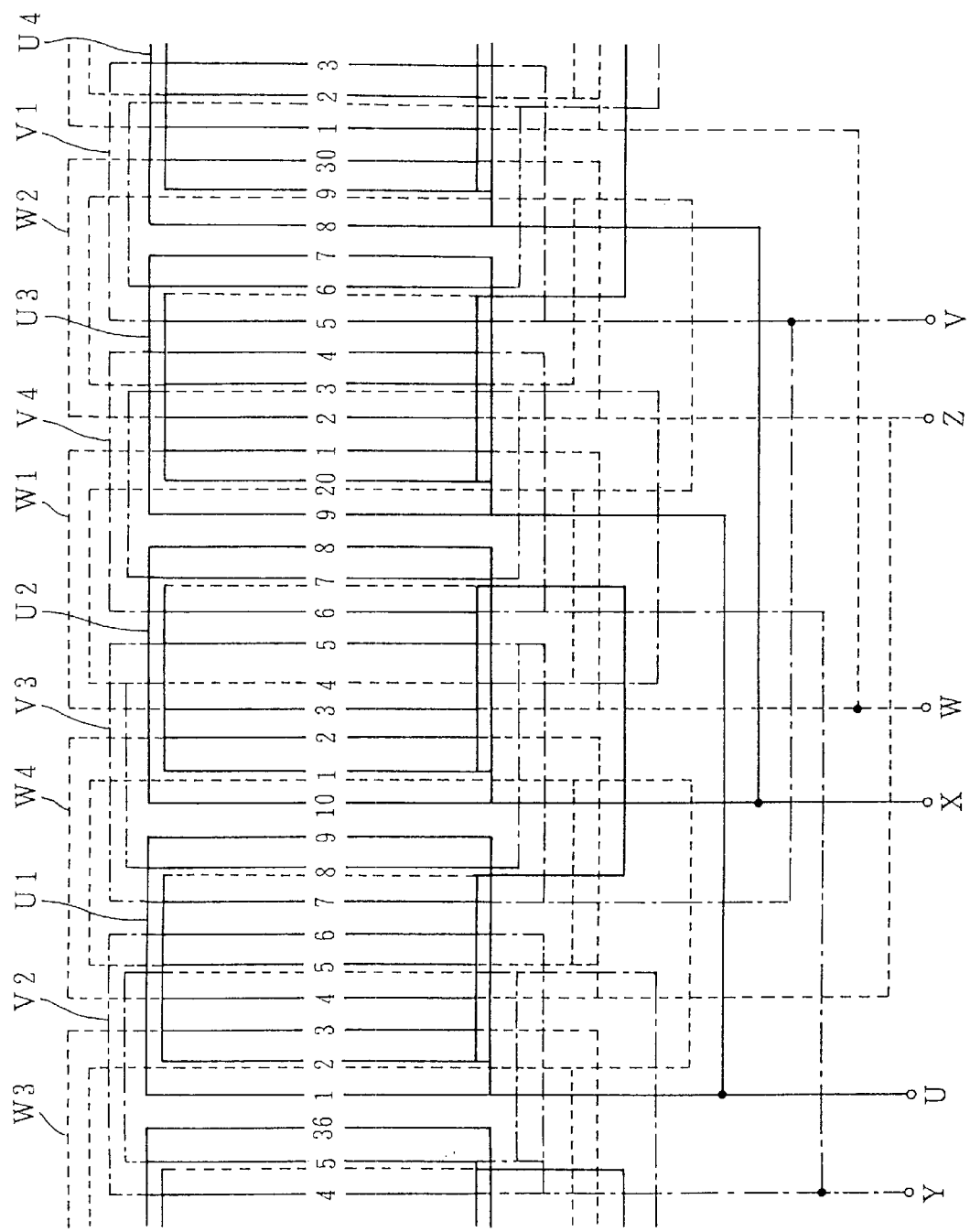
FIG. 23 is a development diagram of the armature winding of made by a method a sixth embodiment in accordance with the present invention.
Figure 24:
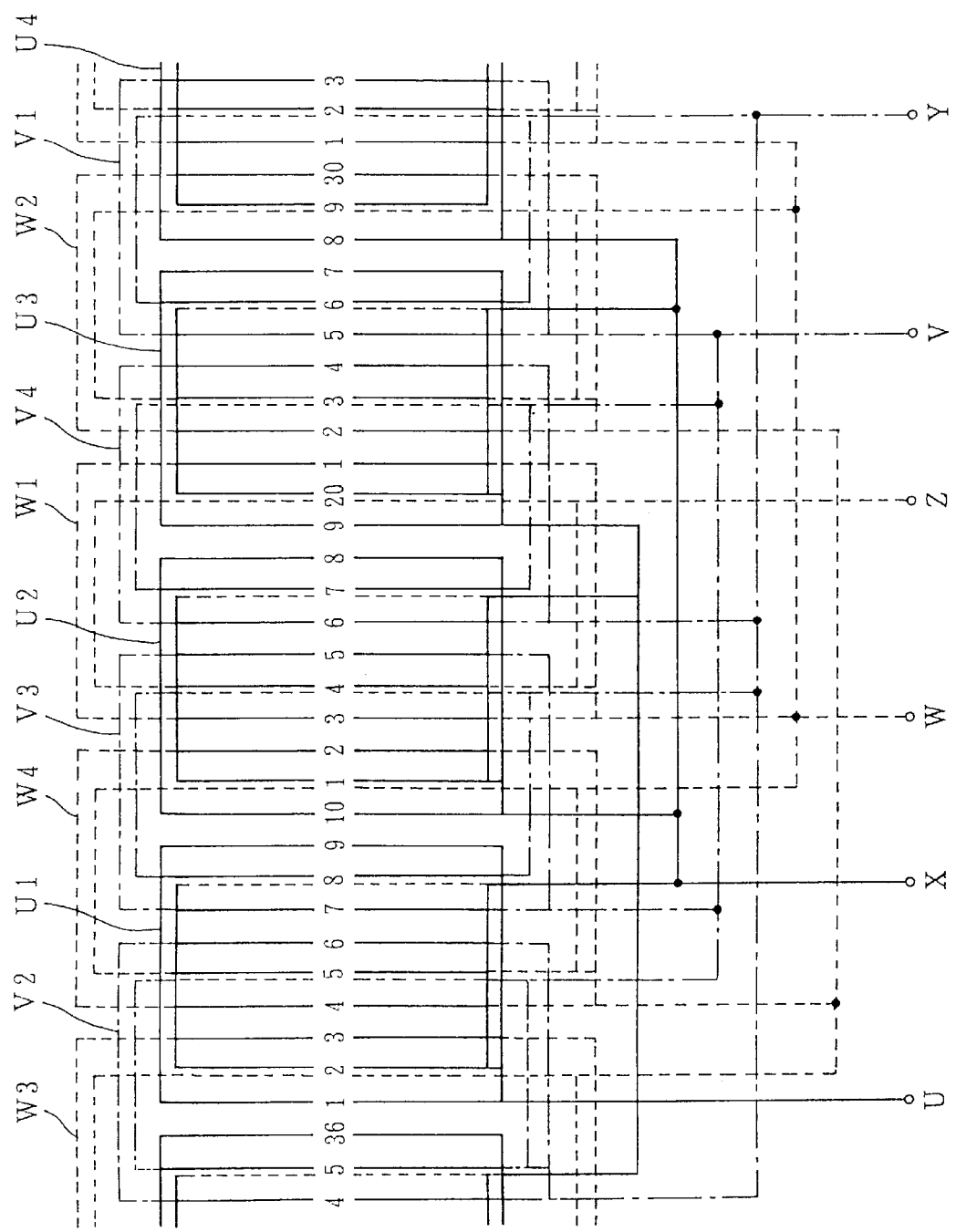
FIG. 24 is a development diagram of the armature winding of a first modified form of the sixth embodiment.
Figure 26:
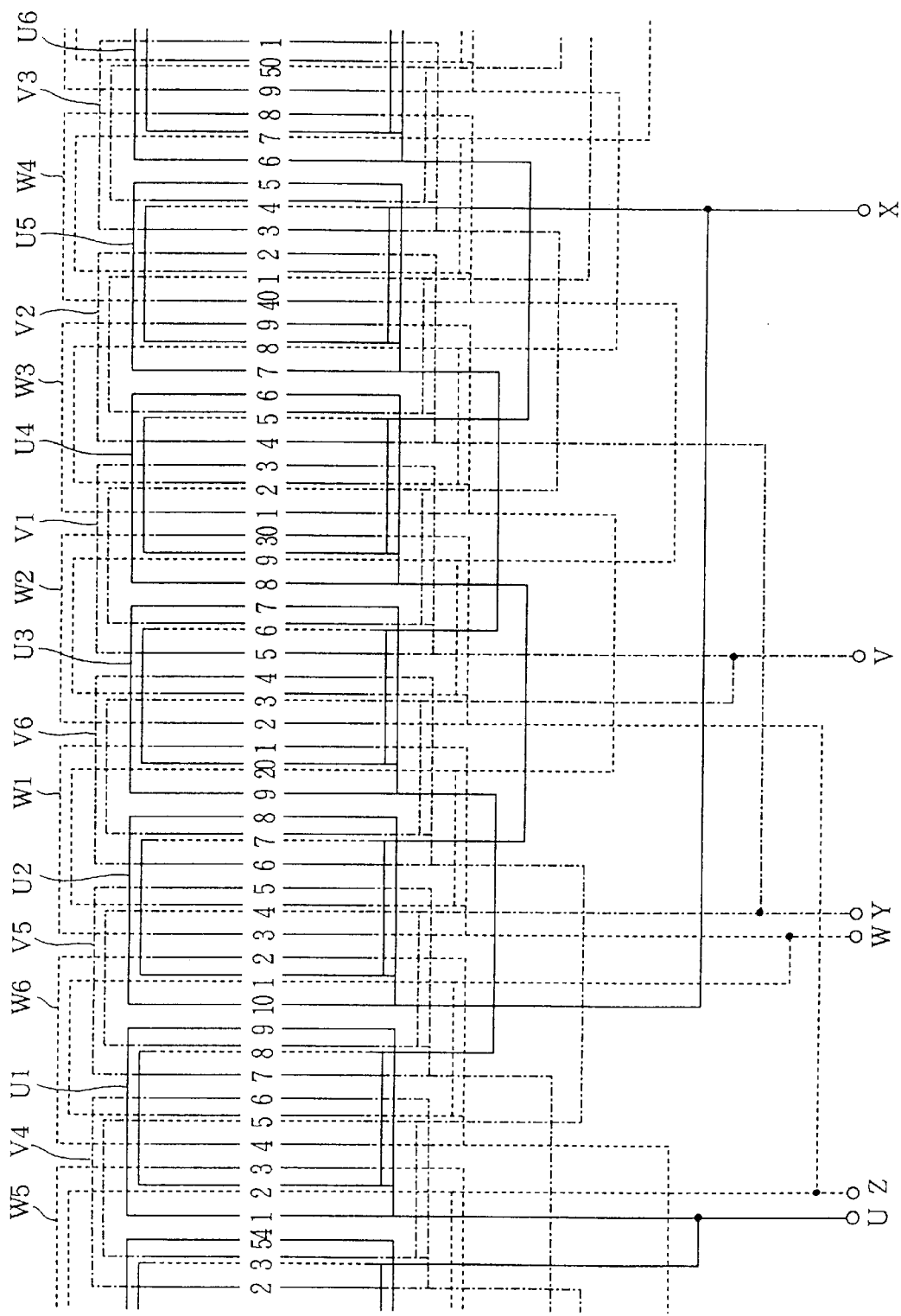
FIG. 26 is a development diagram of the armature winding of a second modified form of the sixth embodiment.
Figure 27:
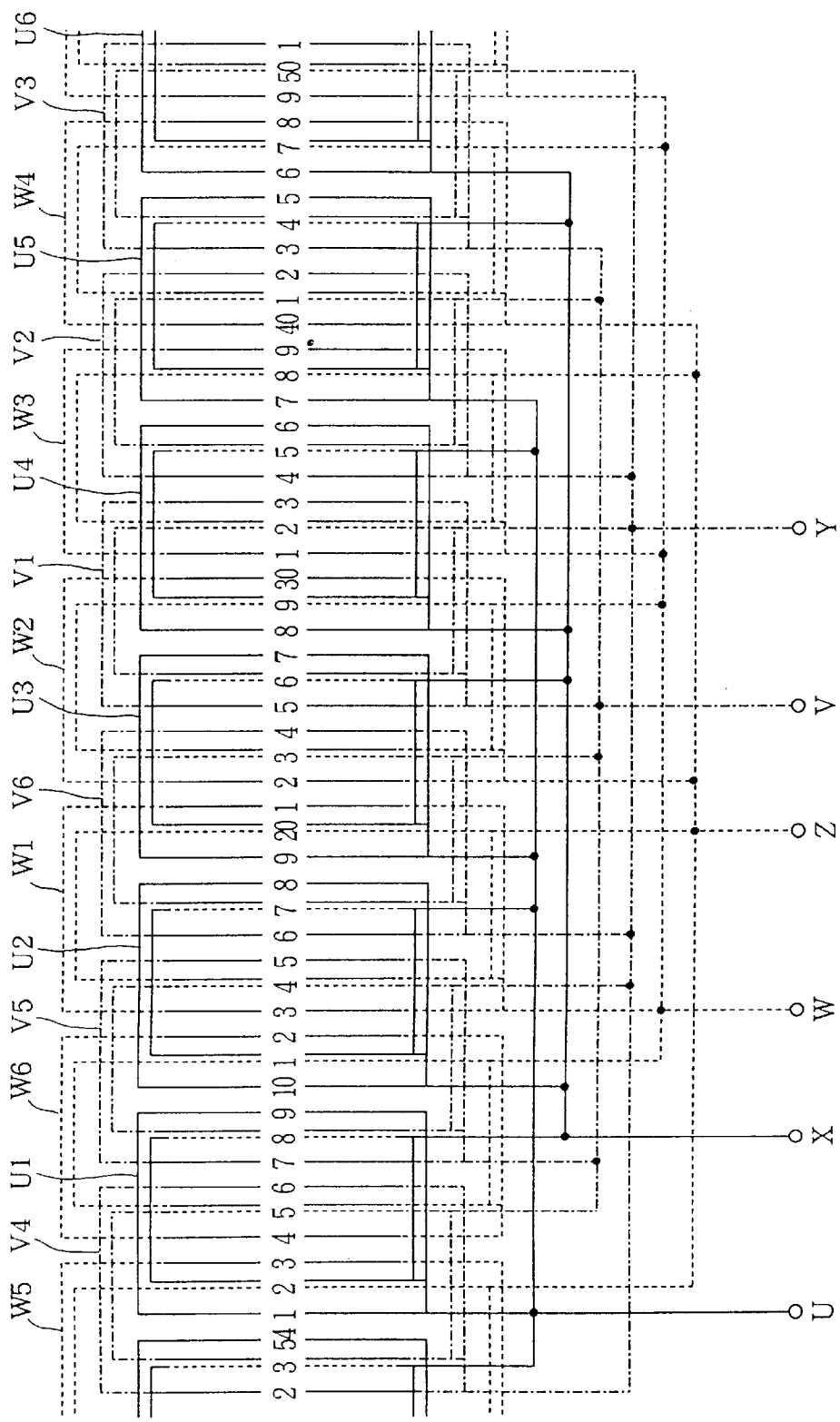
FIG. 27 is a development diagram of the armature winding of a third modified form of the sixth embodiment.
Figure 28:
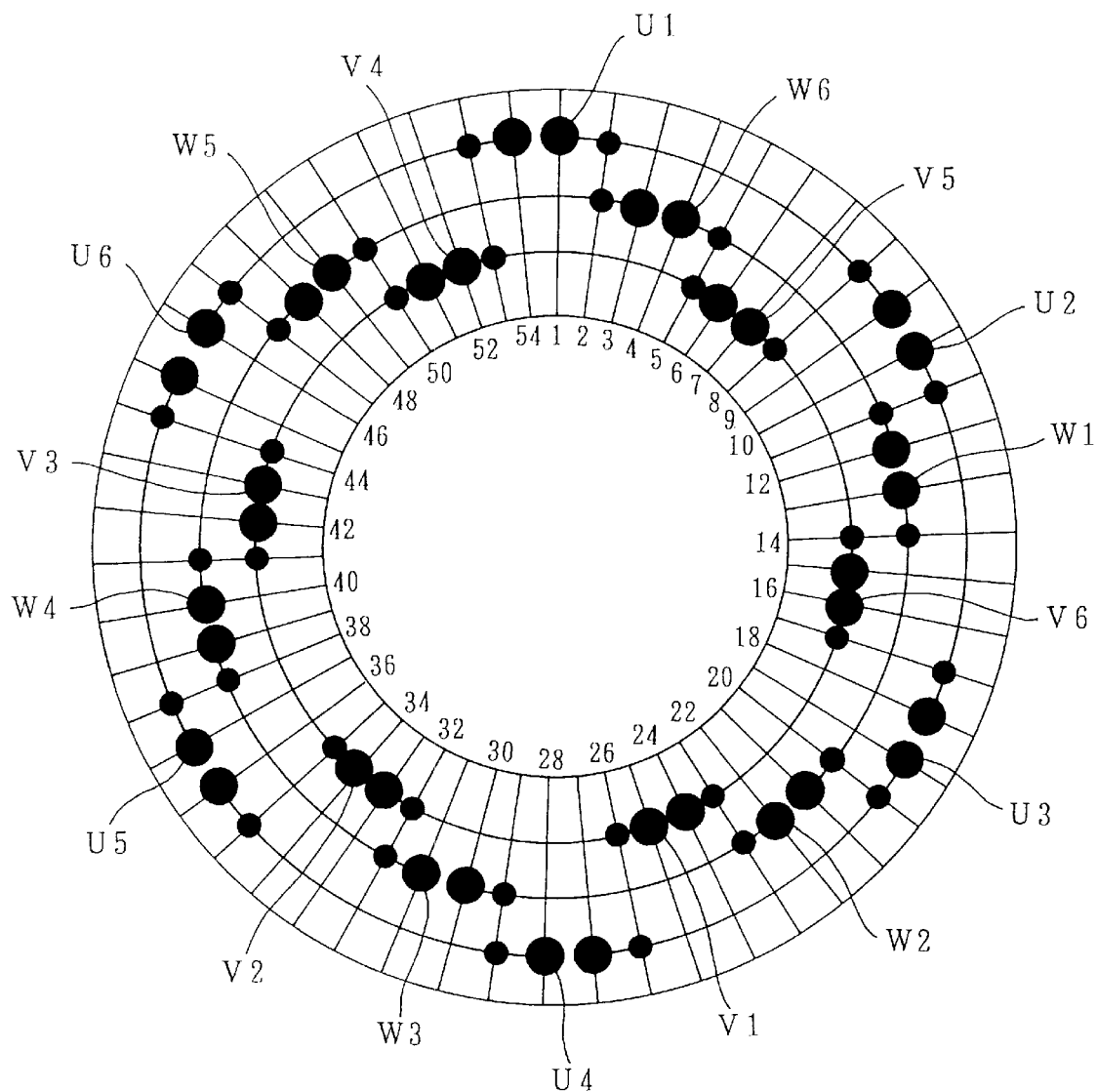
FIG. 28 illustrates a coil arrangement of the armature winding of the sixth embodiment as one example.
Figure 29:
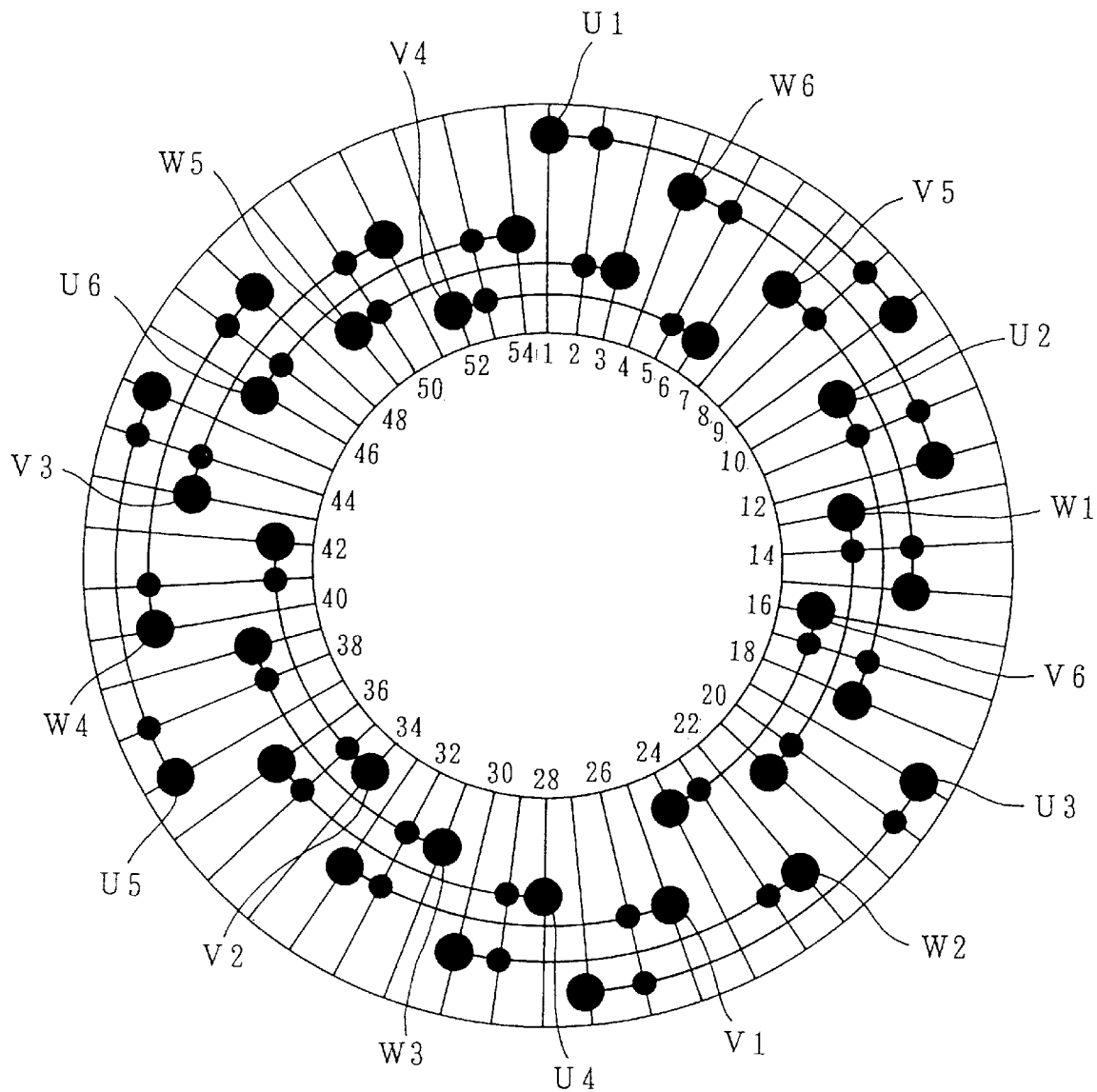
FIG. 29 illustrates a coil arrangement of the armature winding of the sixth embodiment as another example.

FIG. 23 illustrates a sixth embodiment of the present invention wherein the armature winding is composed into a four-pole 36-slot winding with two parallel electrical paths. FIG. 24 is a development diagram of the armature winding which is modified to have four parallel electrical paths. FIG. 25 shows the arrangement of the coils in each of the armature windings shown in FIGS. 23 and 24. FIG. 26 is a development diagram of the armature winding composed into a six-pole 54-slot winding with two parallel electrical paths. FIG. 27 is a development diagram of the armature winding with six parallel electrical paths. FIG. 28 shows the arrangement of coils of the armature winding shown in FIG. 26. FIG. 29 shows the arrangement of coils of the armature winding shown in FIG. 27.

Figure 30:
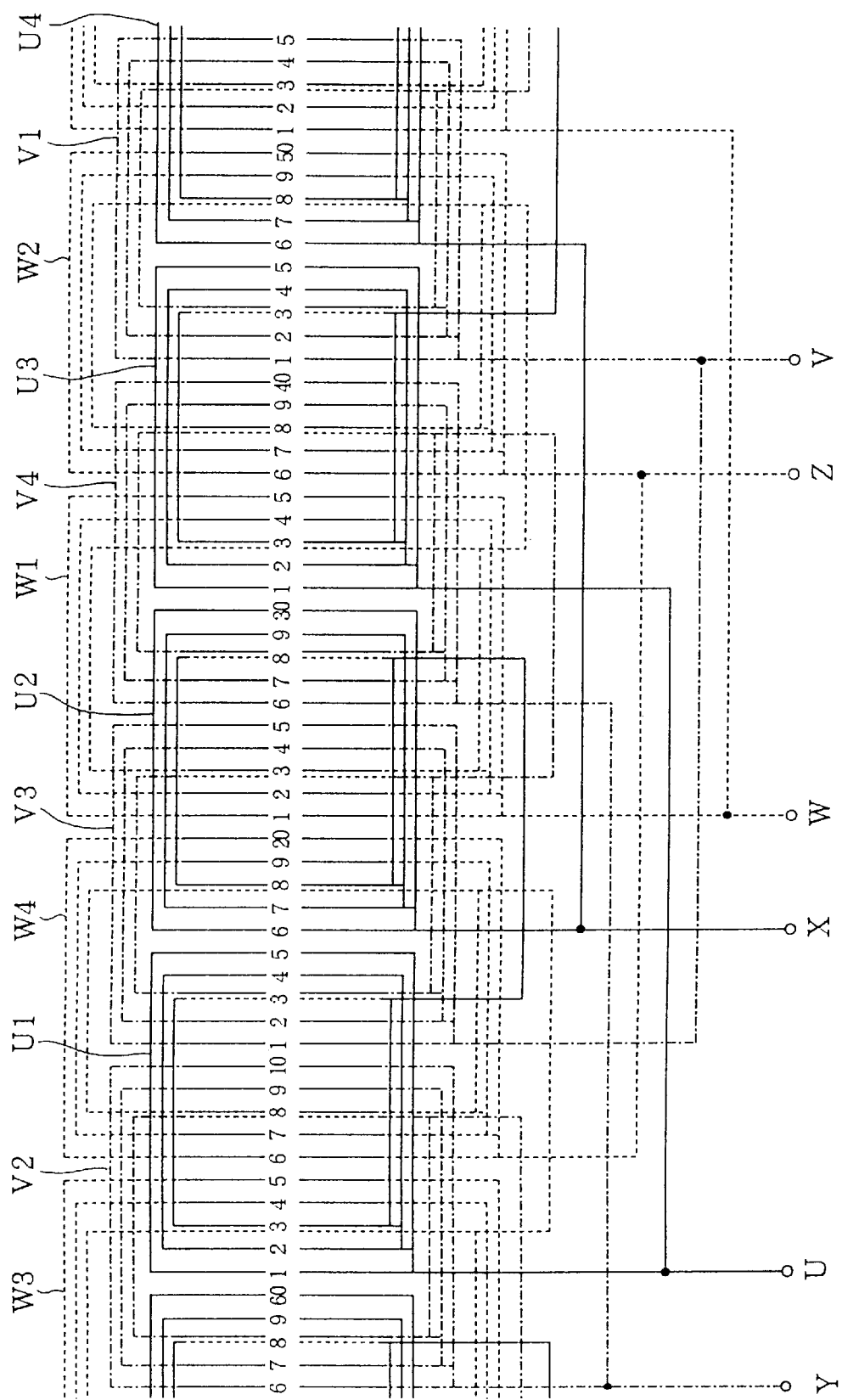
FIG. 30 is a development diagram of the armature winding of made by a method a seventh embodiment in accordance with the present invention.
Figure 32:
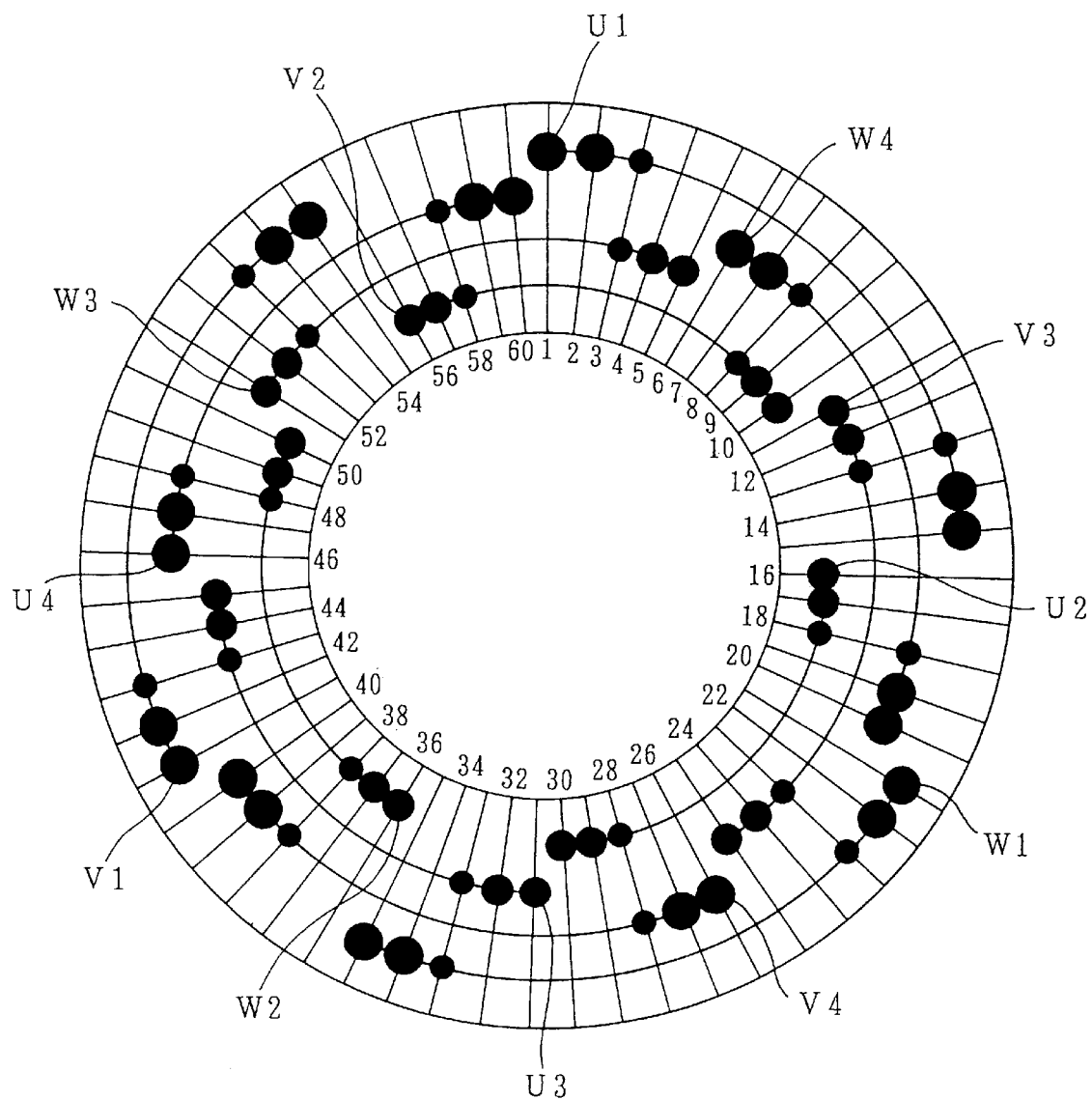
FIG. 32 illustrates a coil arrangement of the armature winding of the seventh embodiment.

FIGS. 30 and 32 illustrates a seventh embodiment of the present invention. The armature winding is composed into a three phase four-pole 60-slot winding with two parallel electrical paths in the seventh embodiment. The number q of slots per phase per pole is obtained as 60/(3×4)=5. Each pole winding of each phase consists of three (=q−2), concentrically distributed, continuous coils. Thus, the armature winding is composed into a double-layer, concentric-wound winding comprising 18 concentric-wound coils including pole windings U1, U2, U3 and U4 of phase U, pole windings V1, V2, V3 and V4 of phase V, and pole windings W1, W2, W3 and W4 of phase W.

Coil pitches of the coils composing each pole winding are set at 14, 12 and 10 respectively. For example, the first pole winding U1 of phase U is composed of a coil inserted in slots #1 and #15 at coil pitch of 14, a coil inserted in slots #2 and #14 at coil pitch of 12, and a coil inserted in slots #3 and #13 at coil pitch of 10, these coils being laid one upon another. In each of the other windings of phase U and each winding of the other phases, three coils with respective coil pitches 14, 12 and 10 are laid one upon another in the same manner as described above.

In phase U, the coils composing the first pole winding U1 are distributed in the slots #1 to #3 and #13 to #15 so as to compose concentric coils. The coils composing the second pole winding U2 of phase U are also distributed in the slots #16 to #18 and #28 to #30 so as to compose concentric coils.

For example, in the slots #58 to #3 into which the windings of phase U are inserted, the number of turns of the coils is changed from N3 to N2, N1, N1, N2 and N3 sequentially where N3≦N2<N1. That is, the number of turns is changed from N1 of the outermost of the concentric coils to N2, N3 and so on sequentially inwardly. Furthermore, the armature winding of the seventh embodiment is composed into the double-layer, concentric-wound type. As obvious from slots #70 to #3 in FIG. 19, the total number of turns of the coils inserted into the respective slots is N3+N3, N2, N1, N1, N2 and N3+N3 in each of the slots #58 to #3, for example. The number of turns is uniformed substantially in all the slots when N1 is set to be shown as N1=(0.7 to 1.0)×N1=(1.4 to 2.6)×N3. This proves that the sectional area of each slot is effectively used.

Figure 31:
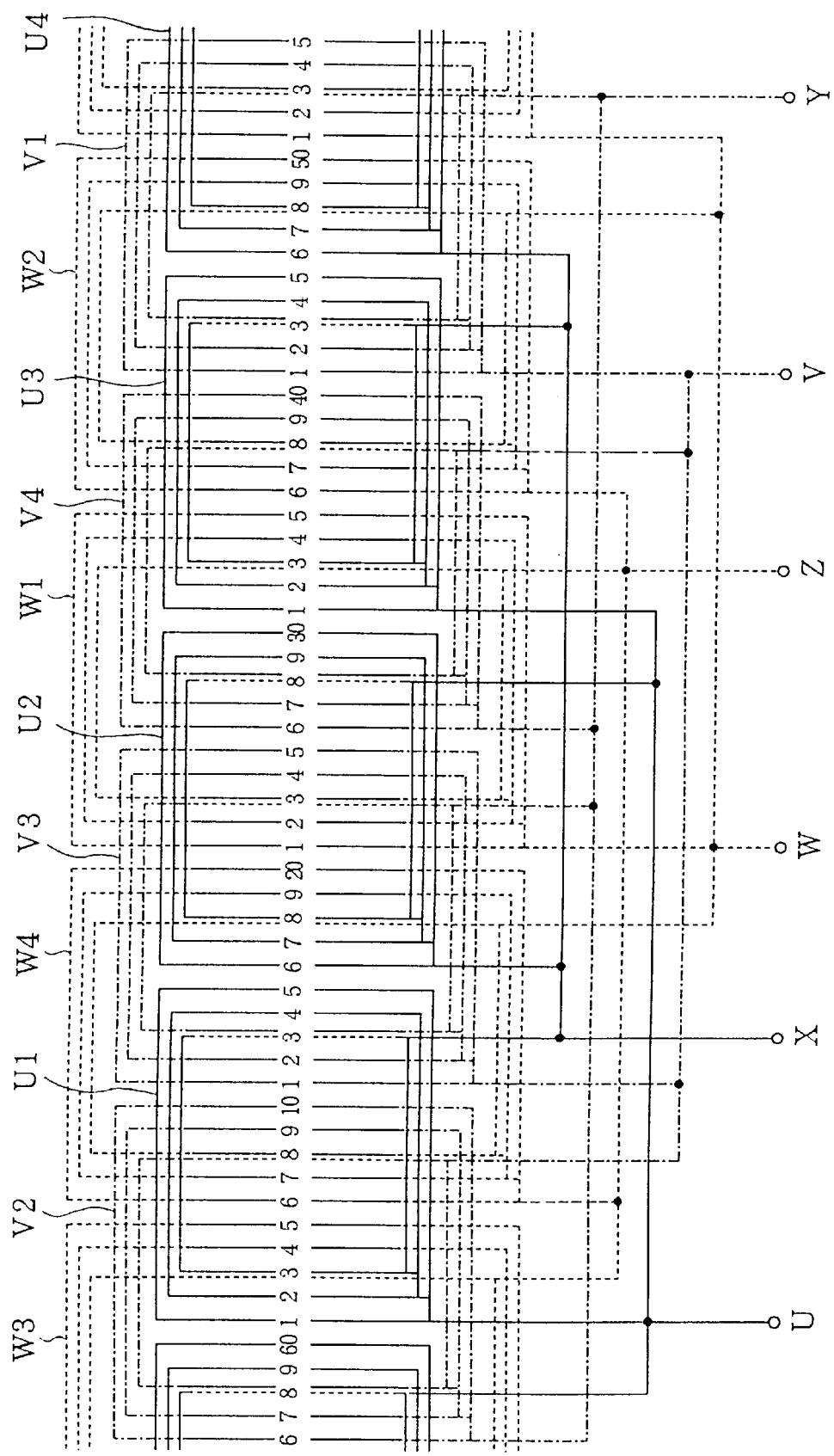
FIG. 31 is a development diagram of the armature winding of a first modified form of the seventh embodiment.

FIG. 31 shows a modified form of the seventh embodiment. The armature winding is composed into a four-pole 60-slot winding with four parallel electrical paths in the modified form. Since each phase consists of four pole windings, that is, the pole windings U1 to U4, V1 to V4, and W1 to W4 respectively, four parallel electrical paths can be provided between the terminals U and X.

According to the modified form, the number of parallel electrical paths can be set at p where p is the pole number. Consequently, the degree of freedom in the design of the armature winding can be improved. Of course, the number of parallel electrical paths may be one.

As obvious from FIG. 32, the coils of different phases are inserted into one fifth of all the slots, that is, 12 slots which are slots #3, #8, #13, #18, #23, #28, #33, #38, #43, #48, #53 and #58. These slots necessitate the insulators. Only one coil is inserted in each of the other slots which are #1, #2, #4 to

7, #9 to #12, #14 to #17, #19 to #22, #24 to #27, #29 to #32, #34 to #37, #39 to #42, #44 to #47, #49 to #52 and #54 to #57. No insulators are required for these slots. Consequently, the number of steps in the assembly of armature winding can be reduced to a large extent.

Figure 33:
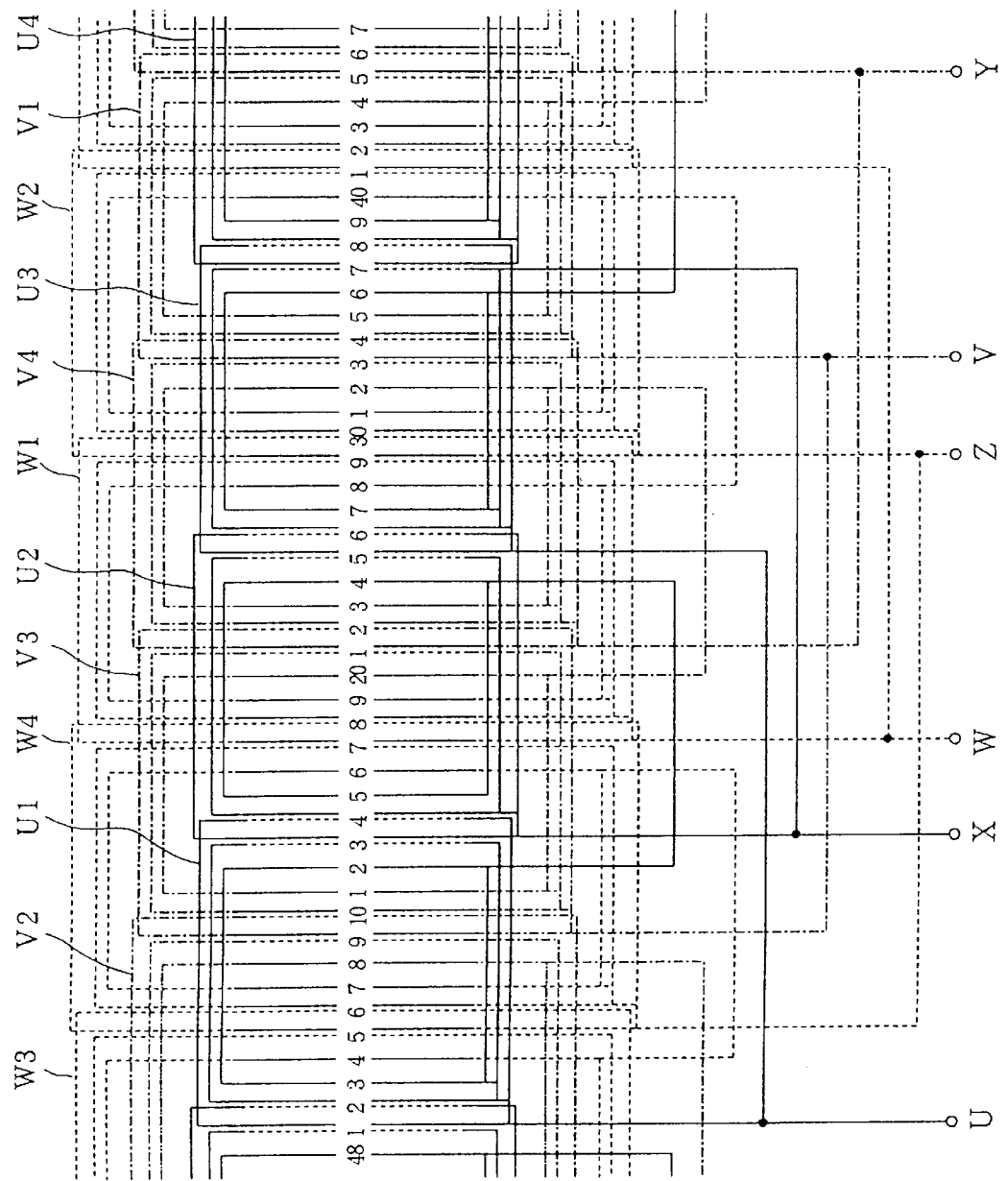
FIG. 33 is a development diagram of the armature winding of made by a method an eighth embodiment in accordance with the present invention.
Figure 35:
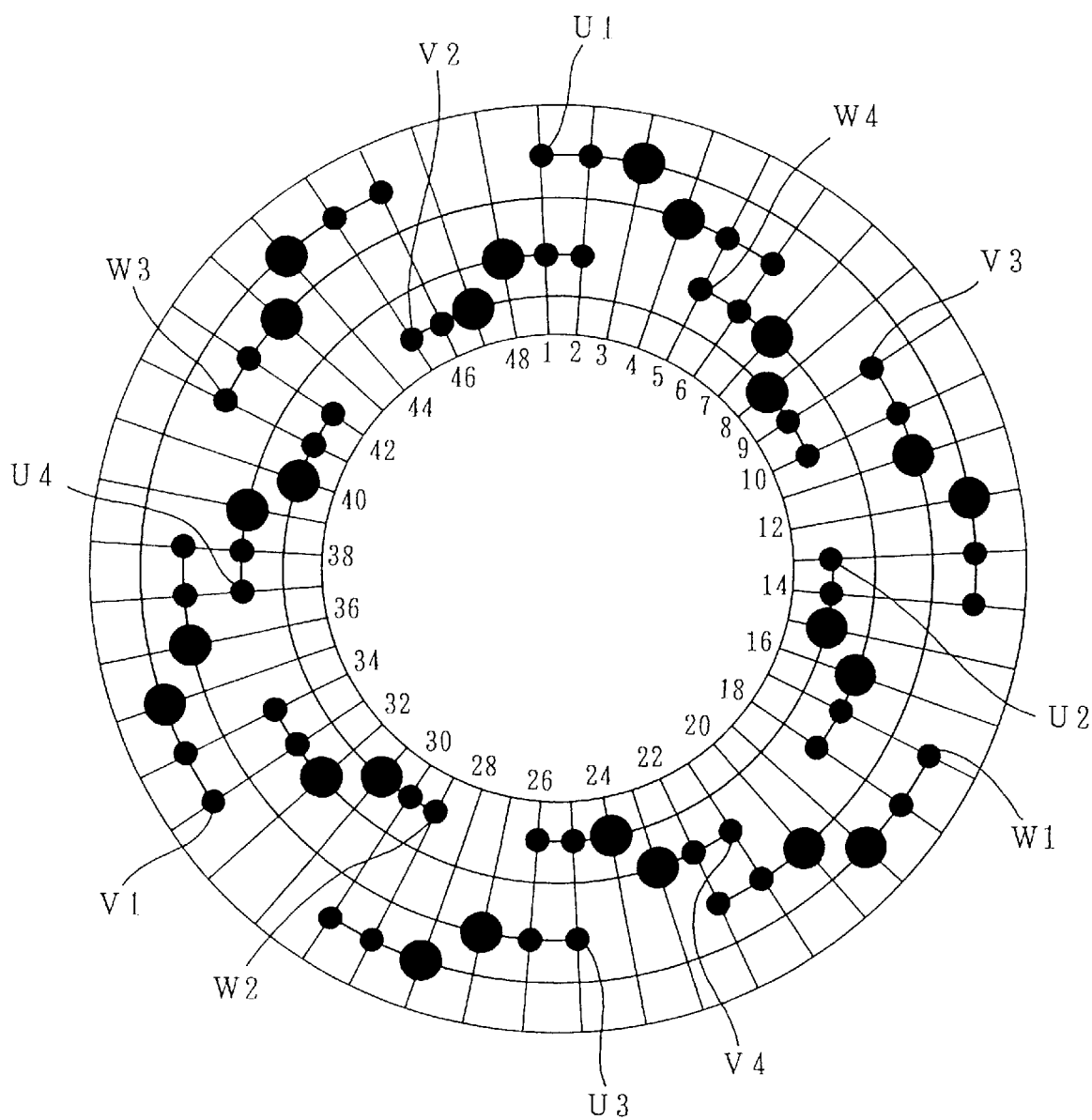
FIG. 35 illustrates a coil arrangement of the armature winding of the eighth embodiment.

FIGS. 33 and 35 illustrate an eighth embodiment of the present invention. The armature winding is composed into a three phase four-pole 48-slot winding with two parallel electrical paths in the eighth embodiment. The number q of slots per phase per pole is obtained as 48/(3×4)=4. Each pole winding of each phase consists of three (=q−1), concentrically distributed, continuous coils. Thus, the armature winding is composed into a double-layer, concentric-wound winding comprising 12 concentric-wound coils including pole windings U1, U2, U3 and U4 of phase U, pole windings V1, V2, V3 and V4 of phase V, and pole windings W1, W2, W3 and W4 of phase W.

Coil pitches of the coils composing each pole winding are set at 13, 11 and 9 respectively as shown in FIG. 35. For example, the first pole winding U1 of phase U is composed of a coil inserted in slots #1 and #14 at coil pitch of 13, a coil inserted in slots #2 and #13 at coil pitch of 11, and a coil inserted in slots #3 and #12 at coil pitch of 9, these coils being laid one upon another. In each of the other windings of phase U and each winding of the other phases, three coils with respective coil pitches 13, 11 and 9 are laid one upon another in the same manner as described above.

In phase U, the coils composing the first pole winding U1 are distributed in the slots #1 to #3 and #12 to #14 so as to compose concentric coils. The coils composing the second pole winding U2 of phase U are also distributed in the slots #13 to #15 and #24 to #26 so as to compose concentric coils.

For example, in the slots #48 to #3 into which the windings of phase U are inserted, the number of turns of the coils is changed sequentially from N1 to N2 and N3 in the slots #48 to #2 and from N3 to N2 and N1 in the slots #1 to #3 where N3≦N2<N1. That is, the number of turns is changed from N1 of the innermost of the concentric coils to N2, N3 and so on sequentially outwardly. Furthermore, the armature winding of the eighth embodiment is composed into the double-layer, concentric-wound type. As obvious from slots #48 to #3 in FIG. 35, the total number of turns of the coils inserted into the respective slots is N1, N2+N3, N3+N2 and N1 in each of the slots #48 to #3, for example. The number of turns is uniformed substantially in all the slots when N1 is set to be shown as N1=(0.7 to 1.3)×(N2+N3). This proves that the sectional area of each slot is effectively used.

Figure 34:
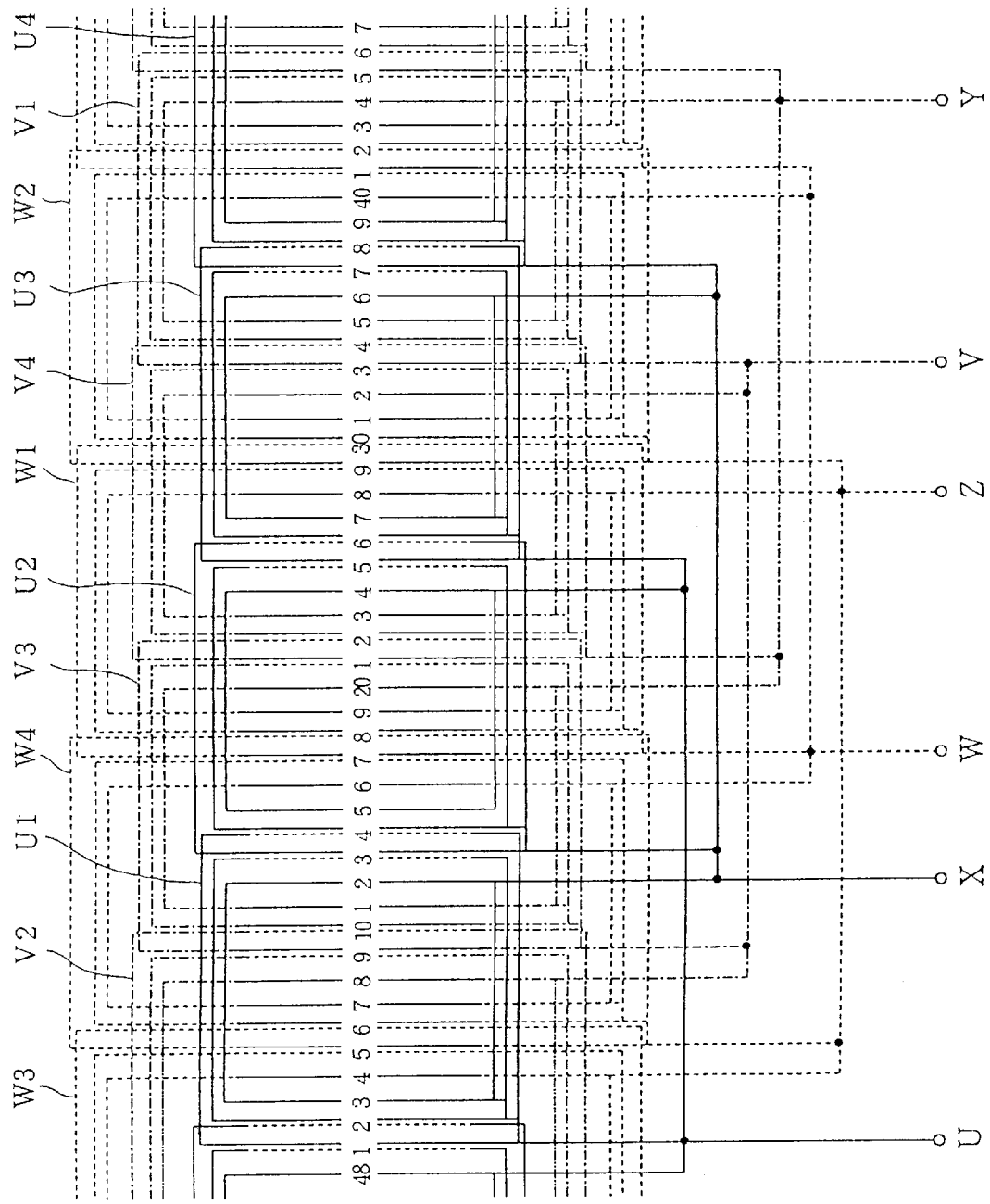
FIG. 34 is a development diagram of the armature winding of a first modified form of the eighth embodiment.

FIG. 34 shows a modified form of the eighth embodiment. The armature winding is composed into a four-pole 48-slot winding with four parallel electrical paths in the modified form. Since each phase consists of four pole windings, that is, the pole windings U1 to U4, V1 to V4, and W1 to W4 respectively, four parallel electrical paths can be provided between the terminals U and X.

According to the modified form, the number of parallel electrical paths can be set at p where p is the pole number. Consequently, the degree of freedom in the design of the armature winding can be improved. Of course, the number of parallel electrical paths may be one.

As obvious from FIG. 35, the coils belonging to different phases are inserted into one half of all the slots, that is, 24 slots which are slots #2, #3, #6, #7, #10, #11, #14, #15, #18, #19, #22, #23, #26, #27, #30, #31, #34, #35, #38, #39, #42, #43, #46 and #47. These slots necessitate the insulators. No insulators are required for the other slots which are #1, #4,
5, #8, #9, #12, #13, #16, #17, #20, #21, #24, #25, #28, #29, #32, #33, #36, #37, #40, #41, #44, #45 and #48. Consequently, the number of steps in the assembly of armature winding can be reduced to a large extent.

Figure 36:
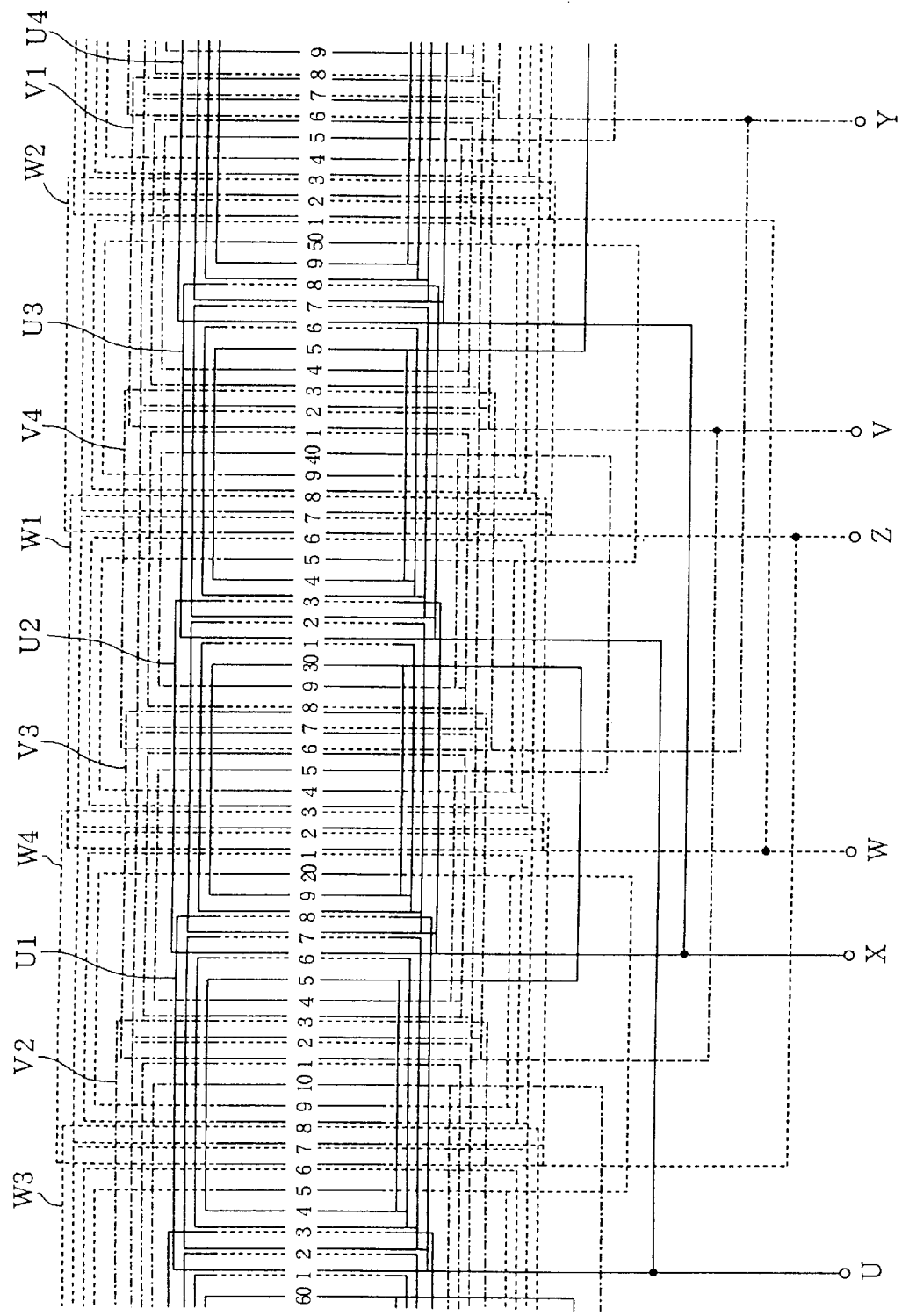
FIG. 36 is a development diagram of the armature winding of made by a method a ninth embodiment in accordance with the present invention.

FIGS. 36 and 38 illustrate a ninth embodiment of the present invention. The armature winding is composed into a three phase four-pole 60-slot winding with two parallel electrical paths in the ninth embodiment. The number q of slots per phase per pole is obtained as 60/(3×4)=5. Each pole winding of each phase consists of four (=q−1), concentrically distributed, continuous coils. Thus, the armature winding is composed into a double-layer, concentric-wound winding comprising 12 concentric-wound coils including pole windings U1, U2, U3 and U4 of phase U, pole windings V1, V2, V3 and V4 of phase V, and pole windings W1, W2, W3 and W4 of phase W.

Coil pitches of the coils composing each pole winding are set at 17, 15, 13 and 11 respectively as shown in FIG. 35. For example, the first pole winding U1 of phase U is composed of a coil inserted in slots #1 and #18 at coil pitch of 17, a coil inserted in slots #2 and #17 at coil pitch of 15, a coil inserted in slots #3 and #16 at coil pitch of 13, and a coil inserted in slots #4 and #15 at coil pitch of 11, these coils being laid one upon another.

In each of the other windings of phase U and each winding of the other phases, three coils with respective coil pitches 13, 11 and 9 are laid one upon another in the same manner as described above.

In phase U, the coils composing the first pole winding U1 are distributed in the slots #1 to #4 and #15 to #18 so as to compose concentric coils. The coils composing the second pole winding U2 of phase U are also distributed in the slots #16 to #19 and #30 to #33 so as to compose concentric coils.

For example, in the slots #60 to #4 into which the windings of phase U are inserted, the number of turns of the coils is changed sequentially from N1 to N2 and N3 in the slots #60 to #3 and from N4 to N4, N3, N2 and N1 in the slots #1 to #4 where N4≦N3≦N2<N1. That is, the number of turns is changed from N1 of the innermost of the concentric coils to N2, N3, N4 and so on sequentially outwardly.

Furthermore, the armature winding of the ninth embodiment is composed into the double-layer, concentric-wound type. As obvious from slots #60 to #4 in FIG. 38, the total number of turns of the coils inserted into the respective slots is N1, N2+N4, N3+N3 and N4+N2 in each of the slots #60 to #4, for example. The number of turns is uniformed substantially in all the slots when N1 is set to be shown as N1=(0.7 to 1.3)×(N2+N4)=(1.4 to 2.6)×N3. This proves that the sectional area of each slot is effectively used.

Figure 37:
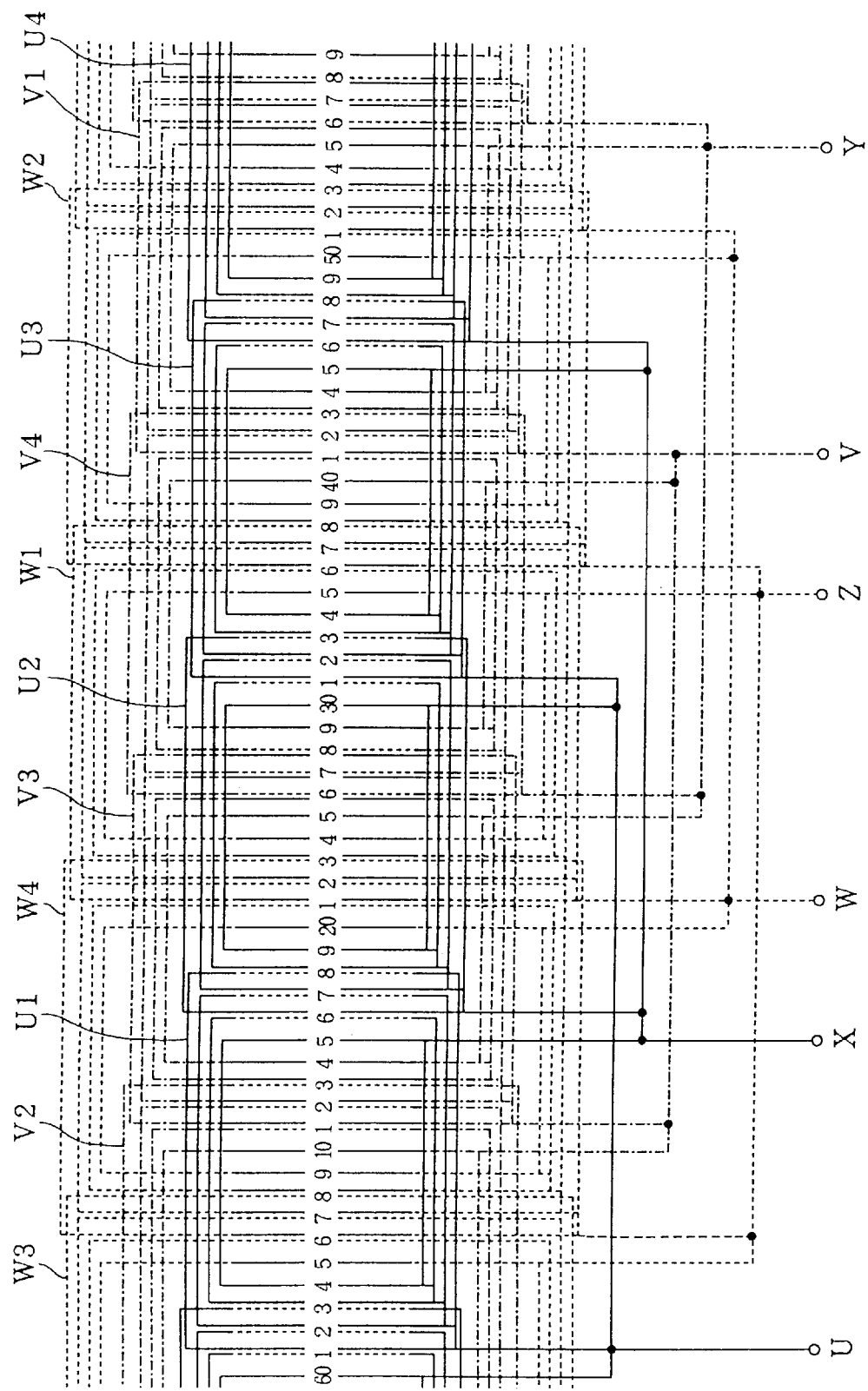
FIG. 37 is a development diagram of the armature winding of a first modified form of the ninth embodiment.

FIG. 37 shows a modified form of the ninth embodiment. The armature winding is composed into a four-pole 60-slot winding with four parallel electrical paths in the modified form. Since each phase consists of four pole windings, that is, the pole windings U1 to U4, V1 to V4, and W1 to W4 respectively, four parallel electrical paths can be provided between the terminals U and X.

According to the modified form, the number of parallel electrical paths can be set at p where p is the pole number. Consequently, the degree of freedom in the design of the armature winding can be improved. Of course, the number of parallel electrical paths may be one.

As obvious from FIG. 38, two coils belonging to the same phase are inserted into three fifths of all the slots, that is, 36 slots which are slots #1 to #3, #6 to #8, #12 to #14, #16 to #18, #21 to #23, #26 to #28, #31 to #33, #36 to #38, #41 to

43, #46 to #48, #51 to #53 and #56 to #58. #14, #15, #18, #19, #22, #23, #26, #27, #30, #31, #34, #35, #38, #39, #42, #43, #46 and #47. No insulators are required for the above-described slots. However, insulators may be inserted into these slots for the purpose of retaining the coils. Only one coil is inserted into each of the other slots which are #4, #5, #9, #10, #14, #15, #19, #20, #24, #25, #29, #30, #34, #35, #39, #40, #44, #45, #49, #50, #54, #55, #59 and #60. No insulators are required for these slots. Consequently, the number of steps in the assembly of armature winding can be reduced to a large extent.

Figure 39:
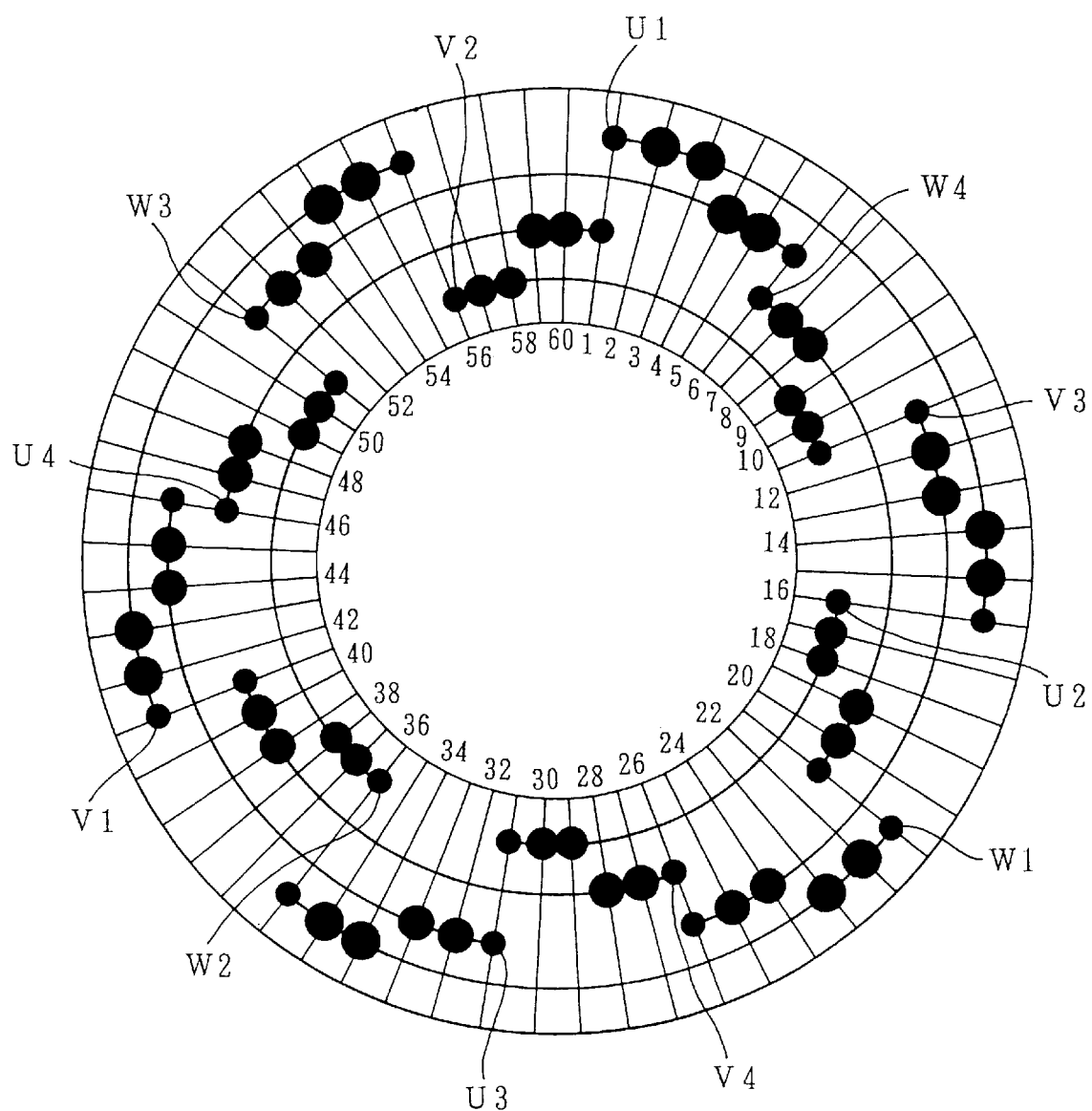
FIG. 39 illustrates a coil arrangement of the armature winding of made by a method a tenth embodiment.

FIG. 39 illustrates a tenth embodiment of the present invention. The armature winding is composed into a three phase four-pole 60-slot winding in the tenth embodiment. The number q of slots per phase per pole is obtained as 60/(3×4)=5. Each pole winding of each phase consists of three (=q−2), concentrically distributed, continuous coils. Thus, the armature winding is composed into a double-layer, concentric-wound winding comprising 12 concentric-wound coils including pole windings U1, U2, U3 and U4 of phase U, pole windings V1, V2, V3 and V4 of phase V, and pole windings W1, W2, W3 and W4 of phase W.

Coil pitches of the coils composing each pole winding are set at 15, 13 and 11 respectively. For example, the first pole winding U1 of phase U is composed of a coil inserted in slots #1 and #16 at coil pitch of 15, a coil inserted in slots #2 and #15 at coil pitch of 13, and a coil inserted in slots #3 and #14 at coil pitch of 11, these coils being laid one upon another.

In each of the other windings of phase U and each winding of the other phases, three coils with respective coil pitches 15, 13 and 11 are laid one upon another in the same manner as described above.

In phase U, the coils composing the first pole winding U1 are distributed in the slots #1 to #3 and #14 to #16 so as to compose concentric coils. The coils composing the second pole winding U2 of phase U are also distributed in the slots #16 to #18 and #29 to #31 so as to compose concentric coils.

For example, in the slots #59 to #3 into which the windings of phase U are inserted, the number of turns of the coils is changed sequentially from N1 to N2 and N3 in the slots #59 to #1 and from N3 to N2 and N1 in the slots #1 to #3 where N3<N2≦N1. That is, the number of turns is changed from N1 of the innermost of the concentric coils to N2, N3, N4 and so on sequentially outwardly. Furthermore, the armature winding of the ninth embodiment is composed into the double-layer, concentric-wound type. As obvious from slots #59 to #3 in FIG. 39, the total number of turns of the coils inserted into the respective slots is N1, N2, N3+N3, N2 and N1 in each of the slots #59 to #3, for example. The number of turns is uniformed substantially in all the slots when N1 is set to be shown as N1=(0.7 to 1.0)×N1=(1.4 to 2.6)×N3. This proves that the sectional area of each slot is effectively used. The number of parallel electrical paths can be set at p where p is the number of poles. Of course, the number of parallel electrical paths may be one.

In the tenth embodiment, two coils belonging to the same phase are inserted into one fifth of all the slots, that is, 12 slots which are slots #1, #6, #11, #16, #21, #26, #31, #36, #41, #46, #51 and #56. Only one coil is inserted into each of the other 48 slots which are #2 to #5, #7 to #10, #12 to #15, #17 to #20, #22 to #25, #27 to #30, #32 to #35, #37 to #40, #42 to #45, #47 to #50, #52 to #55 and #57 to #60. Consequently, since no insulators are required for the slots, the number of steps in the assembly of armature winding can be reduced to a large extent.

Figure 40:
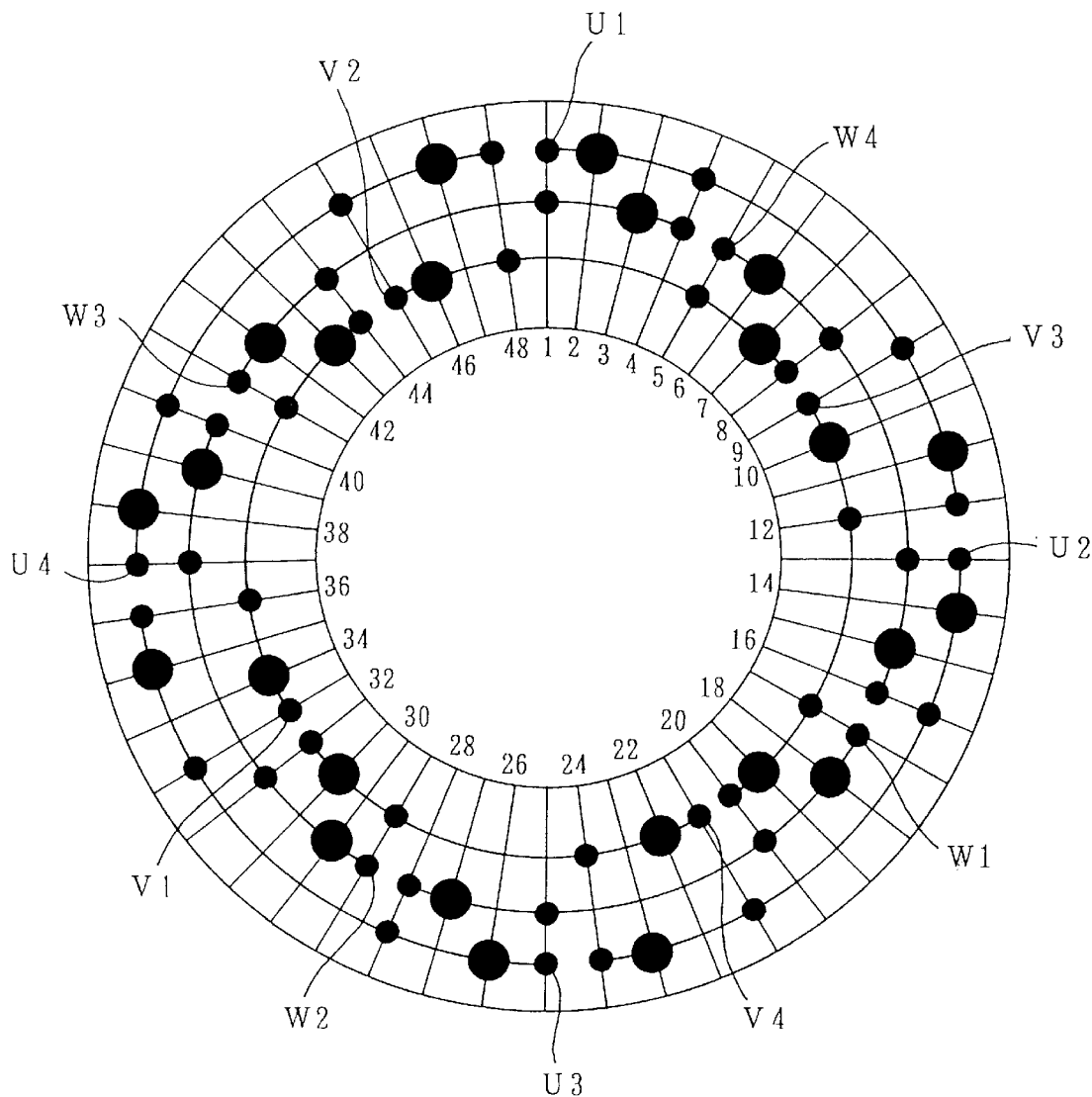
FIG. 40 illustrates a coil arrangement of the armature winding of made by a method an eleventh embodiment.

FIG. 40 illustrates an eleventh embodiment of the present invention. The armature winding is composed into a three phase four-pole 48-slot winding in the eleventh embodiment. The number g of slots per phase per pole is obtained as 48/(3×4)=4. Each pole winding of each phase consists of three (=q−1), concentrically distributed, continuous coils. Thus, the armature winding is composed into a double-layer, concentric-wound winding comprising 12 concentric-wound coils including pole windings U1, U2, U3 and U4 of phase U, pole windings V1, V2, V3 and V4 of phase V, and pole windings W1, W2, W3 and W4 of phase W.

Coil pitches of the coils composing each pole winding are set at 11, 9 and 5 respectively. For example, the first pole winding U1 of phase U is composed of a coil inserted in slots #1 and #12 at coil pitch of 11, a coil inserted in slots #2 and #11 at coil pitch of 9, and a coil inserted in slots #4 and #9 at coil pitch of 5, these coils being laid one upon another. In each of the other windings of phase U and each winding of the other phases, three coils with respective coil pitches 11, 9 and 5 are laid one upon another in the same manner as described above.

In phase U, the coils composing the first pole winding U1 are distributed in the slots #1 to #4 and #9 to #12 so as to compose concentric coils. The coils composing the second pole winding U2 of phase U are also distributed in the slots #13 to #16 and #21 to #24 so as to compose concentric coils.

For example, in the slots #45 to #4 into which the windings of phase U are inserted, the number of turns of the coils is changed from N3 to 0, N1, N2, N2, N1, 0 and N3 sequentially where N3≦N2<N1. That is, the number of turns is changed from N2 of the outermost of the concentric coils to N1, N3 and so on sequentially inwardly. Furthermore, the armature winding of the ninth embodiment is composed into the double-layer, concentric-wound type. As obvious from slots #45 to #4 in FIG. 40, the total number of turns of the coils inserted into the respective slots is N3+N2, N1, N1, N2+N3, N2+N3, N1, N1 and N3+N2 in each of the slots #45 to #4, for example. The number of turns is uniformed substantially in all the slots when N1 is set to be shown as N1=(0.7 to 1.3)×(N2+N3). This proves that the sectional area of each slot is effectively used.

In the eleventh embodiment, two coils belonging to different phases are inserted into one half of all the slots, that is, 24 slots which are slots #1, #4, #5 #8, #9, #12, #13, #16, #17, #20, #21, #24, #25, #28, #29, #32, #33, #36, #37, #40, #41, #44, #45, and #48. Although the insulators are required for the above-described slots, no insulators are required for the other 24 slots #2, #3, #6, #7, #10, #11, #14, #15, #18, #19, #22, #23, #26, #27, #30, #31, #34, #35, #38, #39, #42, #43, #46, and #47. Consequently, the number of steps in the assembly of armature winding can be reduced to a large extent.

Figure 41:
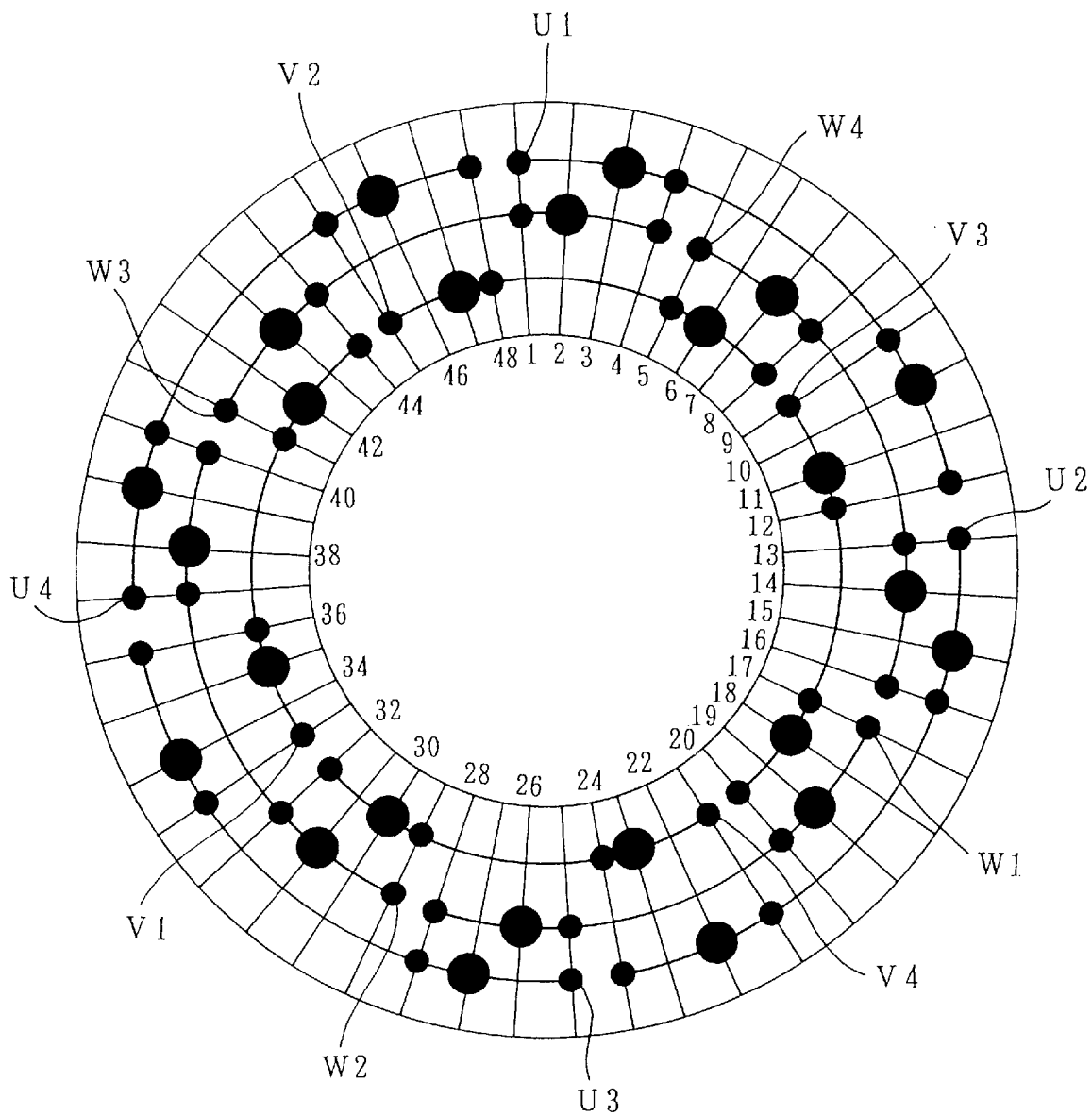
FIG. 41 illustrates a coil arrangement of the armature winding of method by a method a twelfth embodiment.

FIG. 41 illustrates a twelfth embodiment of the present invention. The armature winding is composed into a three phase four-pole 48-slot winding in the twelfth embodiment. The number q of slots per phase per pole is obtained as 48/(3×4)=4. Each pole winding of each phase consists of three (=q−1), concentrically distributed, continuous coils. Thus, the armature winding is composed into a double-layer, concentric-wound winding comprising 12 concentric-wound coils including pole windings U1, U2, U3 and U4 of phase U, pole windings V1, V2, V3 and V4 of phase V, and pole windings W1, W2, W3 and W4 of phase W.

Coil pitches of the coils composing each pole winding are set at 11, 7 and 5 respectively. For example, the first pole winding U1 of phase U is composed of a coil inserted in slots #1 and #12 at coil pitch of 11, a coil inserted in slots #3 and #10 at coil pitch of 7, and a coil inserted in slots #4 and #9 at coil pitch of 5, these coils being laid one upon another. In each of the other windings of phase U and each winding of the other phases, three coils with respective coil pitches 11, 7 and 5 are laid one upon another in the same manner as described above.

In phase U, the coils composing the first pole winding U1 are distributed in the slots #1, #3, #4, #9, #10 and #12 so as to compose concentric coils. The coils composing the second pole winding U2 of phase U are also distributed in the slots #13, #15, #16, #21, #22 and #24 so as to compose concentric coils.

For example, in the slots #45 to #4 into which the windings of phase U are inserted, the number of turns of the coils is changed from N3 to N1, 0, N2, N2, 0, N1 and N3 sequentially where N3≦N2<N1. That is, the number of turns is changed from N2 of the outermost of the concentric coils to N1, N3 and so on sequentially inwardly. Furthermore, the armature winding of the ninth embodiment is composed into the double-layer, concentric-wound type. As obvious from slots #45 to #4 in FIG. 41, the total number of turns of the coils inserted into the respective slots is N3+N2, N1, N1, N2+N3, N2+N3, N1, N1 and N3+N2 in each of the slots #45 to #4, for example. The number of turns is uniformed substantially in all the slots when N1 is set to be shown as N1=(0.7 to 1.3)×(N2+N3). This proves that the sectional area of each slot is effectively used.

In the twelfth embodiment, two coils belonging to different phases are inserted into one half of all the slots, that is, 24 slots which are slots #1, #4, #5 #8, #9, #12, #13, #16, #17, #20, #21, #24, #25, #28, #29, #32, #33, #36, #37, #40, #41, #44, #45, and #48. Although the insulators are required for the above-described slots, no insulators are required for the other 24 slots #2, #3, #6, #7, #10, #11, #14, #15, #18, #19, #22, #23, #26, #27, #30, #31, #34, #35, #38, #39, #42, #43, #46, and #47. Consequently, the number of steps in the assembly of armature winding can be reduced to a large extent.

Figure 42:
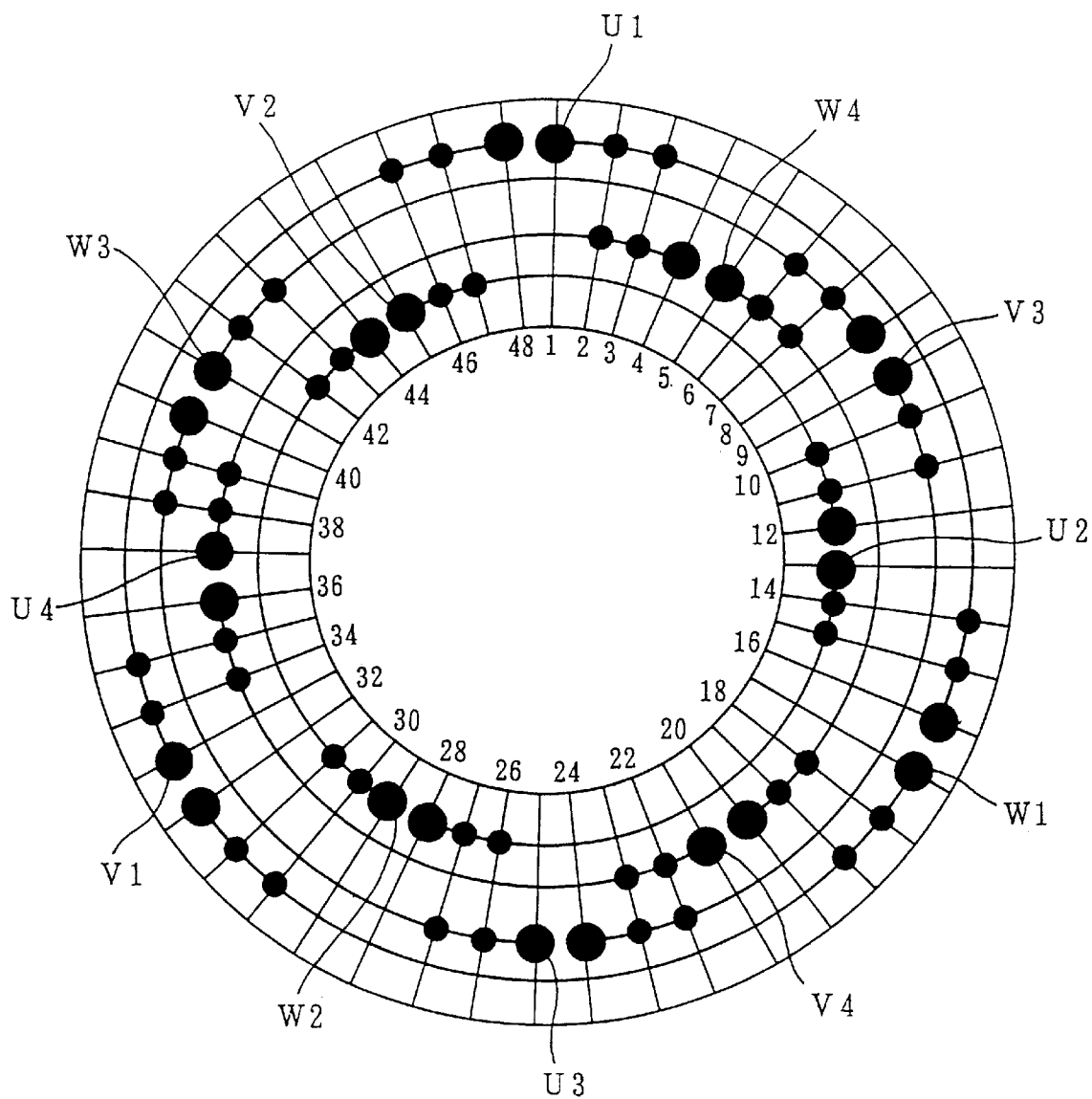
FIG. 42 illustrates a coil arrangement of the armature winding of made by a method a thirteenth embodiment.

FIG. 42 illustrates a thirteenth embodiment of the present invention. The armature winding is composed into a three phase four-pole 48-slot winding in the thirteenth embodiment. The number q of slots per phase per pole is obtained as 48/(3×4)=4. Each pole winding of each phase consists of three (=q−1), concentrically distributed, continuous coils. Thus, the armature winding is composed into a double-layer, concentric-wound winding comprising 12 concentric-wound coils including pole windings U1, U2, U3 and U4 of phase U, pole windings V1, V2, V3 and V4 of phase V, and pole windings W1, W2, W3 and W4 of phase W.

Coil pitches of the coils composing each pole winding are set at 15, 13 and 11 respectively. For example, the first pole winding U1 of phase U is composed of a coil inserted in slots #1 and #16 at coil pitch of 15, a coil inserted in slots #2 and #15 at coil pitch of 13, and a coil inserted in slots #3 and #14 at coil pitch of 11, these coils being laid one upon another. In each of the other windings of phase U and each winding of the other phases, three coils with respective coil pitches 15, 13 and 11 are laid one upon another in the same manner as described above.

In phase U, the coils composing the first pole winding U1 are distributed in the slots #1 to #3 and #14 to #16 so as to compose concentric coils. The coils composing the second pole winding U2 of phase U are also distributed in the slots #13 to #15 and #26 to #28 so as to compose concentric coils.

For example, in the slots #1 to #4 into which the windings of phase U are inserted, the number of turns of the coils is changed sequentially from N1 to N2 and N3 in the slots #1 to #3 and from N3 to N2 and N1 in the slots #2 to #4 where N3≦N2<N1. That is, the number of turns is changed from N1 of the outermost of the concentric coils to N2, N3 and so on sequentially inwardly. Furthermore, the armature winding of the thirteenth embodiment is composed into the double-layer, concentric-wound type. As obvious from slots #46 to #3 in FIG. 42, the total number of turns of the coils inserted into the respective slots is N3+N2, N2+N3, N1, N1, N2+N3 and N3+N2 in each of the slots #46 to #3, for example. The number of turns is uniformed substantially in all the slots when N1 is set to be shown as N1=(0.7 to 1.3)×(N3+N2). This proves that the sectional area of each slot is effectively used.

In the thirteenth embodiment, two coils belonging to the same phase are inserted into one half of all the slots, that is, 24 slots which are slots #2, #3, #6 #7, #10, #11, #14, #15, #18, #19, #22, #23, #26, #27, #30, #31, #34, #35, #38, #39, #42 and #43. Only one coil is inserted in each of the other 24 slots #1, #4, #5, #8, #9, #12, #13, #16, #17, #20, #21, #24, #25, #28, #29, #32, #33, #36, #37, #40, #41, #44, #45, and #48. Consequently, since no insulators are required for the slots, the number of steps in the assembly of armature winding can be reduced to a large extent.

In the thirteenth embodiment, the three phase first pole windings U1, V1 and W1 and the three phase third pole windings U3, V3 and W3 poled similarly to the first pole windings are simultaneously inserted into the slots. Subsequently, the three phase second pole windings U2, V2 and W2 and the three phase fourth pole windings U4, V4 and W4 are simultaneously inserted into the slots.

In the foregoing embodiments, the armature winding of the present invention has been applied to the four-pole 48-slot, four-pole 60-slot, four-pole 72-slot, six-pole 72-slot, four-pole 36-slot, six-pole 54-slot arrangements. The present invention should not be limited to these arrangements. The invention may be applied to the arrangements of other numbers of poles and other numbers of slots.

In the foregoing embodiments, the number of turns in a winding machine is previously set at a selected value so that coils with different turns can be automatically produced. Furthermore, the thickness of coil ends of the previously inserted coils of one phase and those of the subsequently inserted coils of another phase crossing each other is about one half of that in a single-layer concentric-wound winding. Accordingly, since the coil ends can be shaped with a smaller force, the damage applied to the coils can be reduced and the coils of the subsequent phase can be readily inserted.

FIGS. 43 to 48 illustrate a fourteenth embodiment of the present invention. In the figures, reference numerals 1 to 48 designate slot numbers. Reference symbols U1 and U2 designate pole windings of phase U, V1 and V2 pole windings of phase V, and W1 and W2 pole windings of phase W.

In the embodiment, the invention is applied to a three-phase, four-pole, 48-slot armature winding. Two parallel electrical paths are formed between outer terminals U and X by pole windings. The number q of slots per phase per pole is obtained as 48/(3×4)=4. Each pole winding of each phase consists of six (=2×(q−1)), concentrically distributed, continuous coils. Thus, the armature winding is composed into a double-layer, concentric-wound winding and comprises six concentric-wound coils including pole windings U1 and U2 of phase U, pole windings V1 and V2 of phase V, and pole windings W1 and W2 of phase W.

Coil pitches of the coils composing each pole winding are set at 12. For example, the first pole winding U1 of phase U is composed of a coil inserted in slots #46 and #10 at coil pitch of 12, a coil inserted in slots #47 and #11 at coil pitch of 12, a coil inserted in slots #48 and #12 at coil pitch of 12, a coil inserted in slots #1 and #13 at coil pitch of 12, a coil inserted in slots #2 and #14 at coil pitch of 12, and a coil inserted in slots #3 and #12 at coil pitch of 7, these coils being laid one upon another. In each of the other windings of phase U and each winding of the other phases, six coils with respective coil pitches 17, 15, 13, 11, 9 and 7 are laid one upon another in the same manner as described above.

Figure 44:
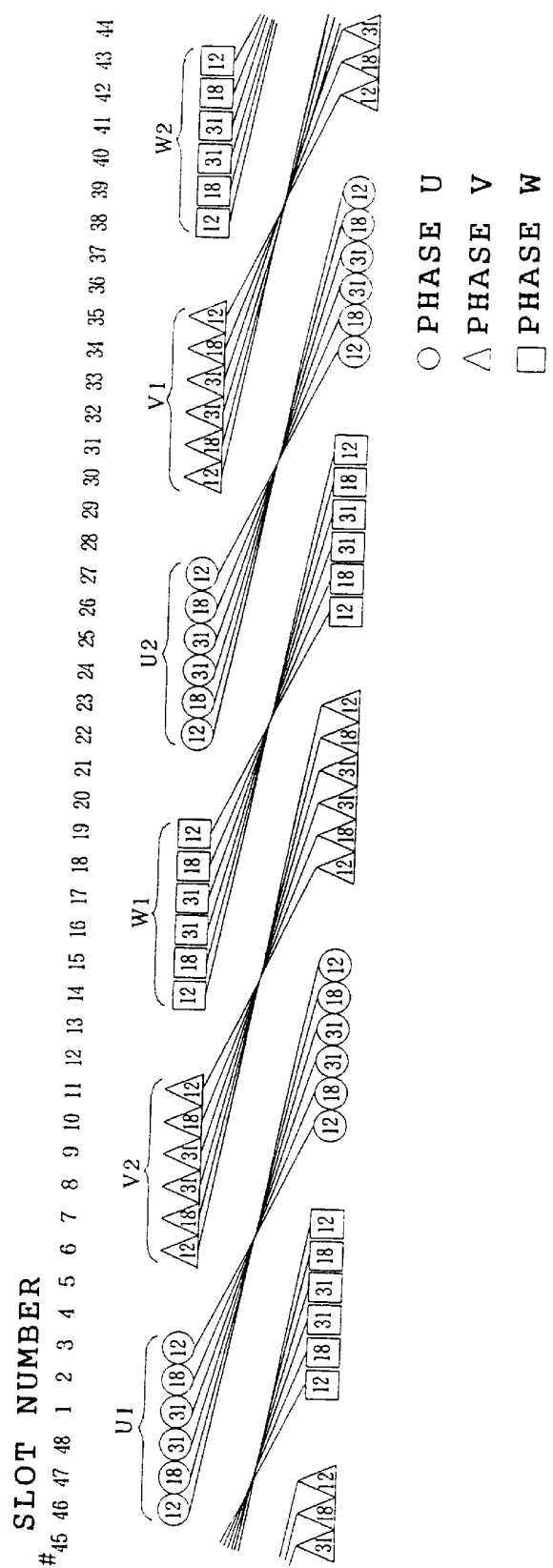
FIG. 44 illustrates the numbers of made by a method turns of coils inserted in the slots in the fourteenth embodiment.

FIG. 44 shows the numbers of turns of the coils inserted in the respective slots. It is noted that FIG. 44 shows only the arrangement of the coils inserted in the respective slots but shows nothing as to which of the coils serves as an upper or a lower coil in the slot. The numbers of turns of coils inserted in the slots in the embodiment differ from those in the prior art. For example, in phase U, the first pole winding U1 is distributed in the slots #46 to #3 and in the slots #10 to #15, and the number of turns is changed sequentially from 12 in each of slots #46 and #10 to 18 in each of slots #47 and #11, 31 in each of slots #48 and #12, 31 in each of slots #1 and #13, 18 in each of slots #2 and #14, and 12 in each of slots #3 and #15, whereby the winding U1 is composed into a concentric-wound winding.

Furthermore, the second pole winding U2 is distributed in slots #22 to #27 and slots #34 to #39, and the number of turns of the coil is changed sequentially from 12 in each of slots #22 and #34 to 18 in each of slots #23 and #35, 31 in each of slots #24 and #36, 31 in each of slots #25 and #37, 18 in each of slots #26 and #38 and 12 in each of slots #27 and #39, whereby the winding U2 is composed into a concentric-wound winding. Thus, in the windings composing the phase U, the number of turns of the coil is changed sequentially from 12 to 18, 31, 31, 18 and 12 as in the slots #46 to #3, for example. The degree of change in the number of turns differs from that in the prior art sinusoidal winding. However, since the number of turns is changed stepwise in the embodiment, the magnetomotive force distribution can be rendered approximately sinusoidal as in the prior art.

In the above-described arrangement, a first pole (N1) and a third pole (N2) are formed inside the first and second pole windings U1 and U2 respectively. A second pole (S1) and a fourth pole (S2) are formed in an area between the slots #16 and #21 and an area between the slots #40 and #45 respectively, in each of which areas the windings U1 and U2 adjoin each other. Consequently, each one of the windings U1 and U2 forms two poles.

The coils are arranged in the fourteenth embodiment in the same manner as in the first embodiment. Accordingly, the magnetomotive force distribution as shown in FIG. 3A and the winding factors as shown in FIG. 4 are also achieved in the sinusoidal winding of the fourteenth embodiment. As obvious from FIGS. 3A, 3B and 4, the magnetomotive force distribution can approximate to the sinusoidal wave and the high frequency winding factor can be reduced to a large extent by the use of the sinusoidal winding of the fourteenth embodiment.

Since the above-described arrangement is composed into the double-layer, concentric-wound type, the total number of turns of upper and lower coils inserted in slots #1 to #8, for example, is 31, 30, 30, 31, 31, 30, 30, and 31. Thus, the total number of turns of upper and lower coils inserted in each slot is approximately uniform, which shows that the sectional area of each slot is effectively used.

Figure 43:
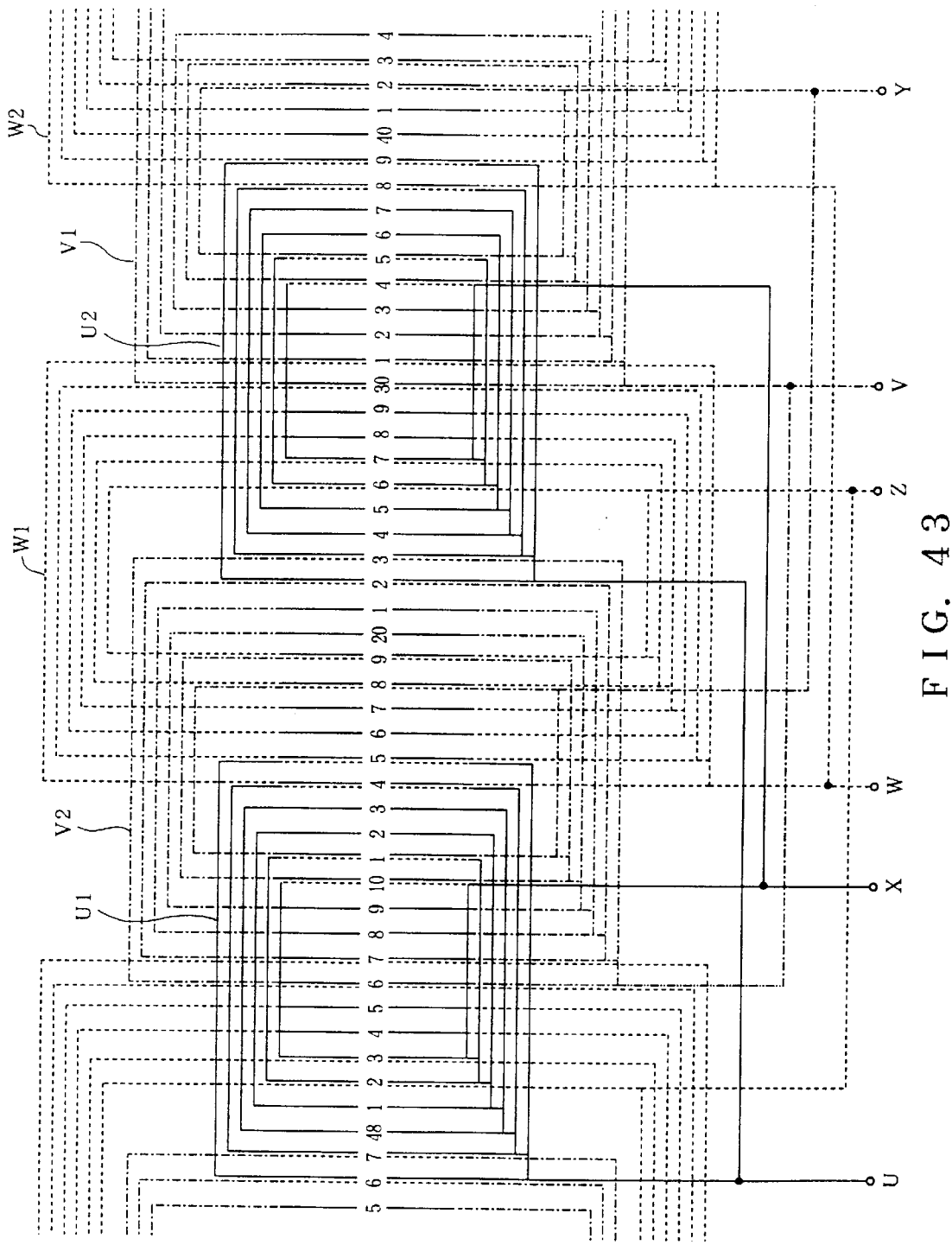
FIG. 43 is a development diagram of the armature winding of a fourteenth embodiment in accordance with the present invention.
Figure 45:
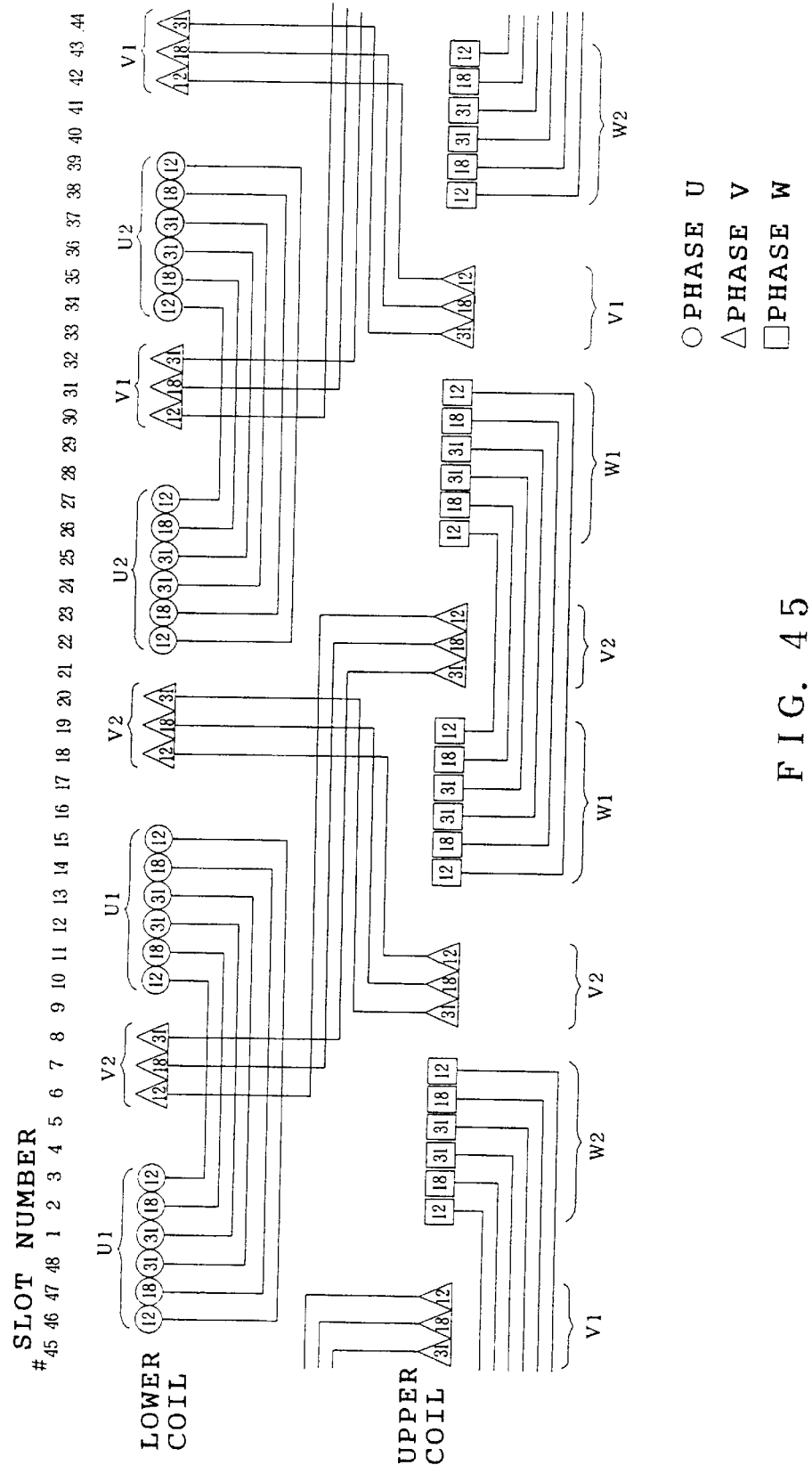
FIG. 45 illustrates an arrangement of upper and lower coils and the number of turns of each coil in the armature winding of the fourteenth embodiment.
Figure 46:
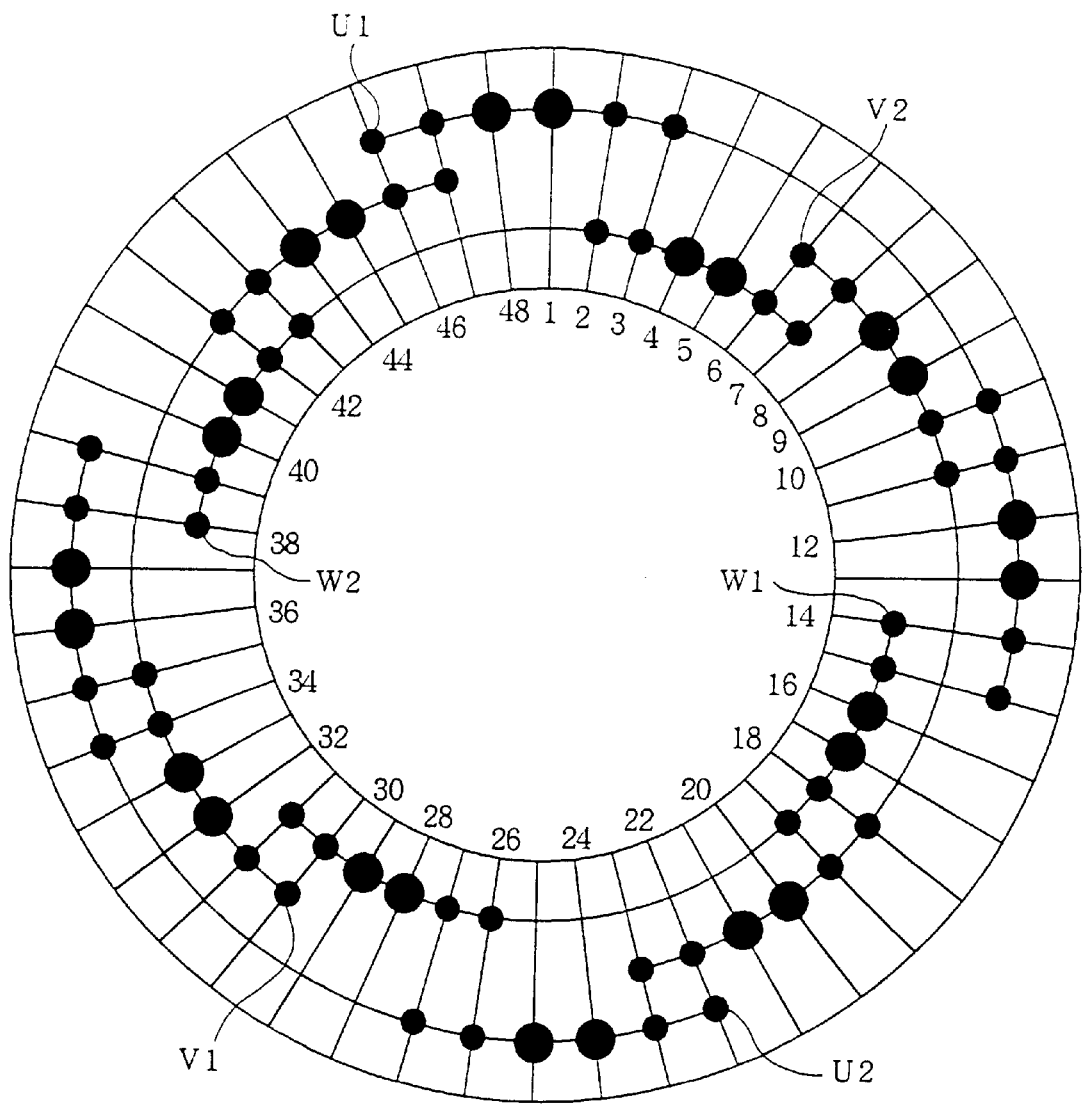
FIG. 46 illustrates a coil arrangement of the armature winding of the fourteenth embodiment.

FIG. 45 illustrates arrangement of upper and lower coils and the number of turns of the coils in the winding arrangement shown in FIG. 43. FIG. 46 illustrates an arrangement of the coils shown in FIG. 45. Each solid arc designates a coil end and each black dot designates a coil side in FIG. 46. Each small black dot shows the case where only one coil is inserted in the slot, whereas each large black dot shows the case where two coils are inserted in the slot. Furthermore, each large black dot shows that the number of turns of coil thereof is larger than that of each small black dot.

In the insertion of coils, both pole windings U1 and U2 of phase U are first inserted into the slots. Both pole windings V1 and V2 of phase V are then inserted into the slots. Both pole windings W1 and W2 of phase W are finally inserted into the slots. Thus, both pole windings per phase can simultaneously be inserted into the slots so that the double-layer, concentric-wound winding is composed. Consequently, the insertion of coils can be simplified and accordingly, the coils can be mechanically inserted into the slots.

Figure 47:
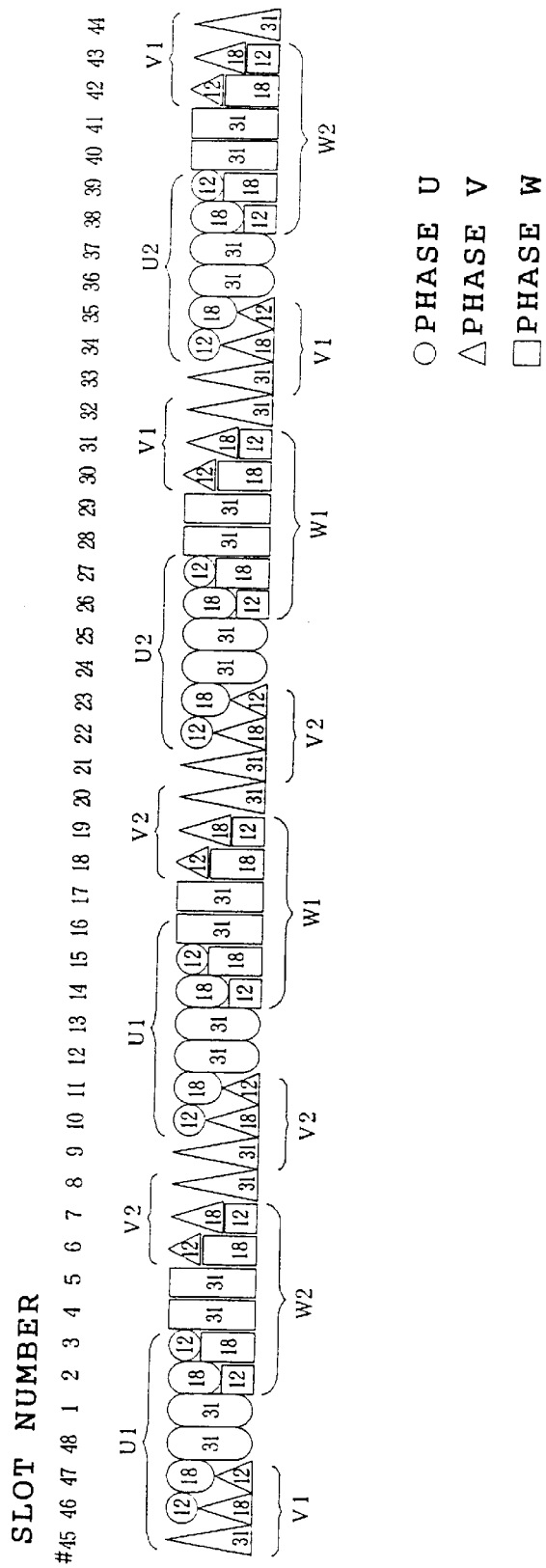
FIG. 47 illustrates the numbers of turns of coils inserted in the slots in the armature winding of the fourteenth embodiment.

FIG. 47 shows the number of turns of the coil or coils in each slot in the embodiment. In the conventional sinusoidal winding composed into the double-layer, concentric-wound winding, the coils the number of which is identical with that of the slots per phase per pole, that is, four coils, are employed in each pole in each phase. Consequently, the upper and the lower coils in all the slots belong to the phases different from each other. In such a case, insulators need to be inserted into the slots to separate each coil from the other. In the above-described embodiment, however, the number of coils per phase is six. Accordingly, the coils of different phases are inserted into a half of all the slots, that is, 24 slots which are slots #2, #3, #6, #7, #10, #11, #14, #15, #18, #19, #22, #23, #26, #27, #30, #31, #34, #35, #38, #39, #42, #43, #46, and #47.

Although the insulators are required for these slots, no insulators are required for the other 24 slots #1, #4, #5, #8, #9, #12, #13, #16, #17, #20, #21, #24, #25, #28, #29, #32, #33, #36, #37, #40, #41, #44, #45, and #48. Consequently, the number of steps in the assembly of armature winding can be reduced to a large extent. In the embodiment, furthermore, the number of windings per phase per pole is two (=P/2 where P is the number of poles), which number is smaller by two than that (=P) in the conventional arrangement. Consequently, the number of windings can be reduced.

Furthermore, the thickness of coil ends of the previously inserted coils of one phase and those of the subsequently inserted coils of another phase crossing each other is about one half of that in a single-layer concentric-wound winding. Accordingly, since the coil ends can be shaped with a smaller force, the damage applied to the coils can be reduced and the coils of the subsequent phase can be readily inserted.

The difference between the numbers of turns of two coils in each slot is small, that is, the difference of the sectional area between the coils is small. Accordingly, the coil inserting work for the second layer can be prevented from being worsened in the efficiency and the insulators can be prevented from being moved in the slots.

Figure 48:
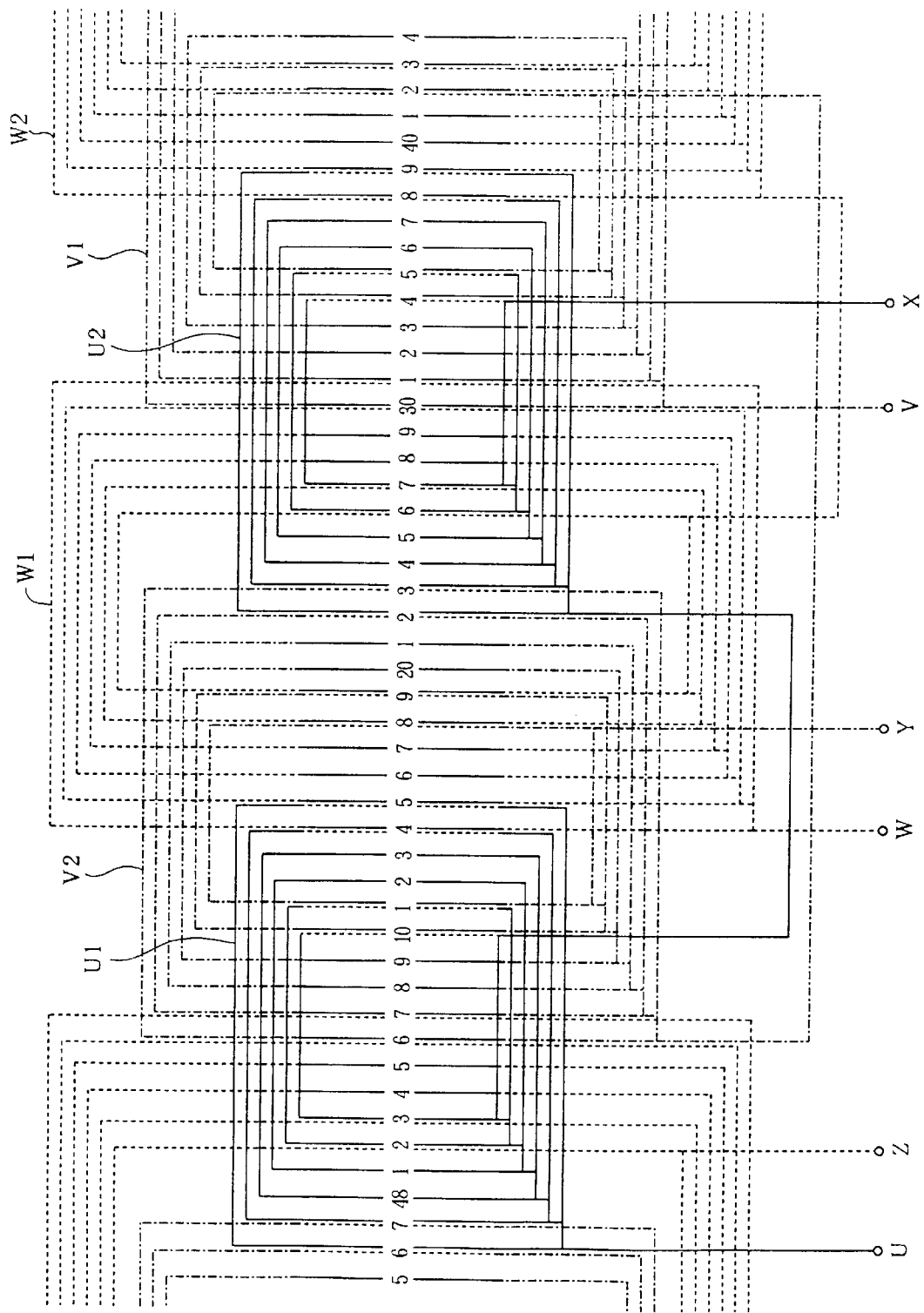
FIG. 48 is a development diagram of the armature winding of a modified form of the fourteenth embodiment.

In the winding arrangement as shown in FIG. 43, two parallel pole winding sets each including two series connected windings are between terminals U and X and accordingly, two parallel electrical paths are provided between the terminals. In FIG. 43, a parallel electrical path is composed of each of pairs of the windings U1 and U2, the windings V1 and V2, and the winding W1 and W2. Referring to FIG. 48 showing a modified form of the fourteenth embodiment, one electrical path may be composed of series connected pairs of the windings U1 and U2, the windings V1 and V2, and the windings W1 and W2.

Figure 70B:
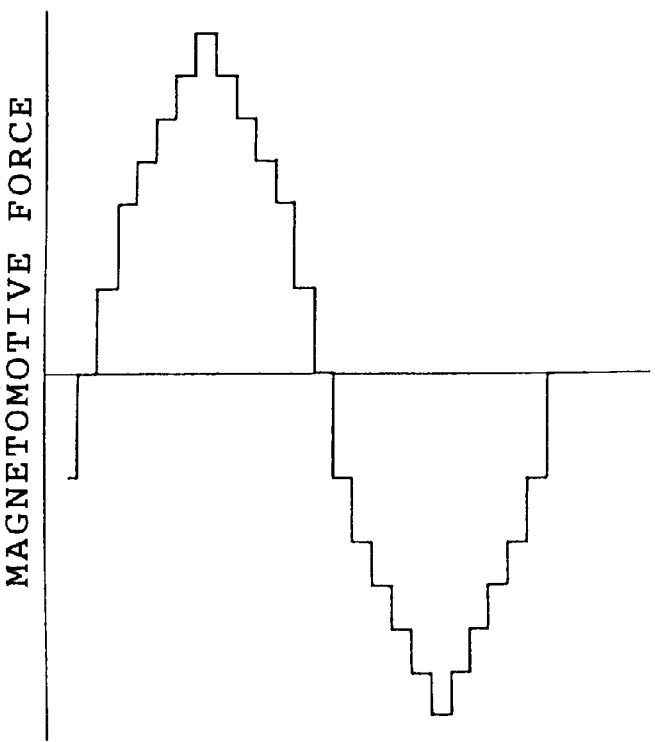
Figure 71:
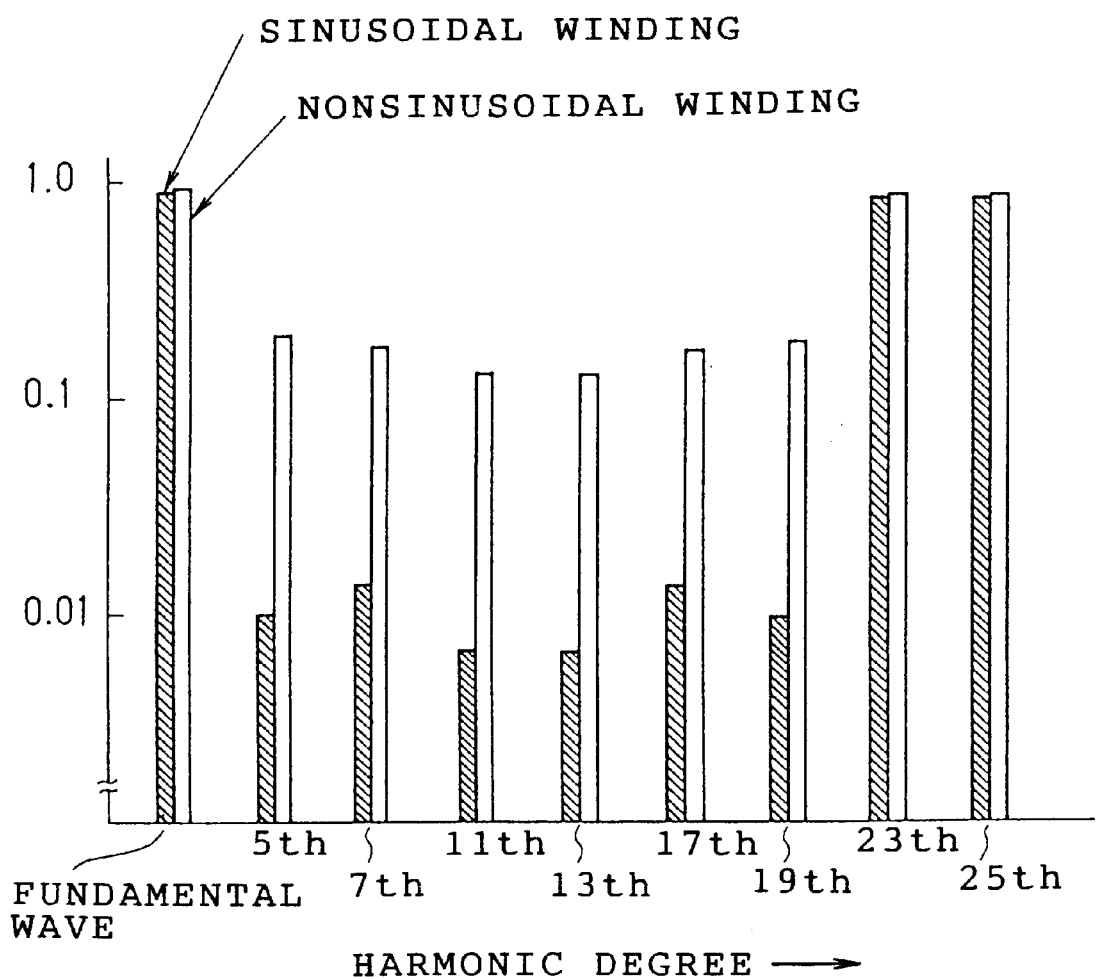
FIG. 71 is a graph comparatively showing winding factors in sinusoidal and nonsinusoidal windings in the prior art.
Figure 72:
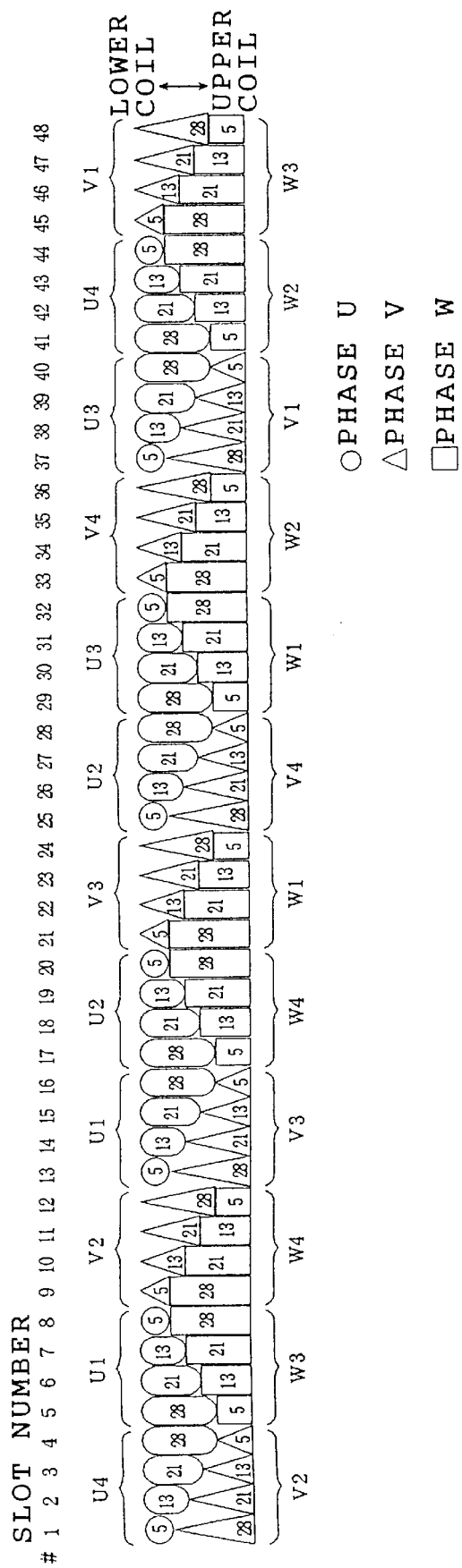
FIG. 72 illustrates an arrangement of upper and lower coils and the number of turns of each coil in the fifth conventional arrangement shown in FIG. 68.

The winding factor with respect to the fundamental wave is 0.933 in the number of turns of each coil in the embodiment, whereas it is 0.908 in the sinusoidal winding shown in FIGS. 70A, 70B and 71. Thus, the winding factor is improved about 2.8%, which results in an improvement in the motor characteristics.

FIG. 44 exemplifies the number of turns of coils in each slot. For example, regarding the slots into which the windings of phase U are inserted, the number of turns is changed from T1 (=12) to T2 (=18), T3 (=31), T3, T2, and T1 sequentially in the slots #46 to #3 where T1≦T2<T3. That is, the number of turns is changed from T1 of the outermost of the concentric coils to T2, T3 and so on sequentially inwardly.

Furthermore, the armature winding of the fourteenth embodiment is composed into the double-layer, concentric-wound type. As obvious from slots #46 to #3 in FIG. 43, the total number of turns of the coils inserted into the respective slots is T1+T2, T2+T1, T3, T3, T2+T1, and T1+T2. The number of turns is uniformed substantially in all the slots when T3 is set to be shown as T3=(0.7 to 1.3)×(T1+T2). This proves that the sectional area of each slot is effectively used.

FIGS. 49 to 54 illustrate a fifteenth embodiment of the present invention. In the embodiment, the invention is applied to a three-phase, four-pole, 48-slot armature winding. Two parallel electrical paths are formed between outer terminals U and X by pole windings. The number q of slots per phase per pole is obtained as 48/(3×4)=4. Each pole winding of each phase consists of six (=2×(q−1)), concentrically distributed, continuous coils. Thus, the armature winding is composed into a double-layer, concentric-wound winding and comprises six, hexagonal, concentric-wound coils including pole windings U1 and U2 of phase U, pole windings V1 and V2 of phase V, and pole windings W1 and W2 of phase W.

Coil pitches of the coils composing each pole winding are set at 12. For example, the first pole winding U1 of phase U is composed of a coil inserted in slots #46 and #10 at coil pitch of 12, a coil inserted in slots #47 and #11 at coil pitch of 12, a coil inserted in slots #48 and #12 at coil pitch of 12, a coil inserted in slots #1 and #13 at coil pitch of 12, a coil inserted in slots #2 and #14 at coil pitch of 12, and a coil inserted in slots #3 and #12 at coil pitch of 7, these coils being laid one upon another. In each of the other windings of phase U and each winding of the other phases, six coils with respective coil pitches 17, 15, 13, 11, 9 and 7 are laid one upon another in the same manner as described above.

Figure 50:
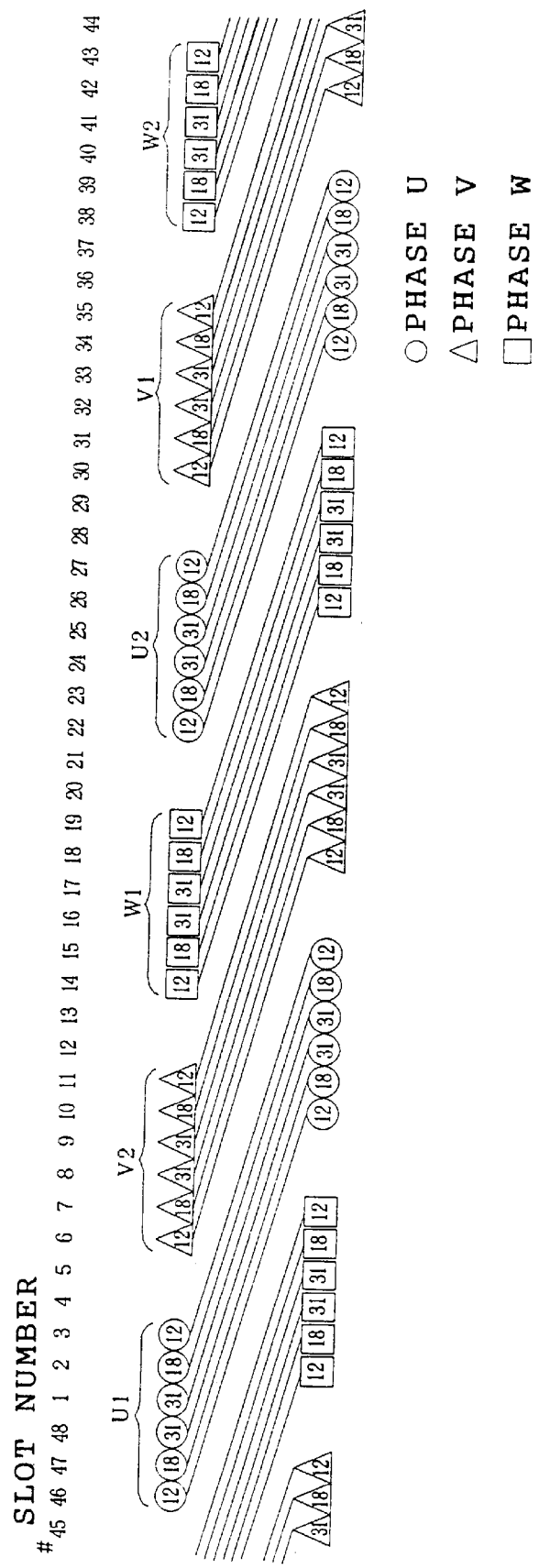
FIG. 50 illustrates the numbers of turns of coils inserted in the slots in the fifteenth embodiment.

FIG. 50 shows the numbers of turns of the coils inserted in the respective slots. It is noted that FIG. 50 shows only the arrangement of the coils inserted in the respective slots but shows nothing as to which of the coils serves as an upper or a lower coil in the slot. The numbers of turns of coils inserted in the slots in the embodiment differ from those in the prior art. For example, in phase U, the first pole winding U1 is distributed in the slots #46 to #3 and in the slots #10 to #15, and the number of turns is changed sequentially from 12 in each of slots #46 and #10 to 18 in each of slots #47 and #11, 31 in each of slots #48 and #12, 31 in each of slots #1 and #13, 18 in each of slots #2 and #14, and 12 in each of slots #3 and #15, whereby the winding U1 is composed into a concentric-wound winding.

Furthermore, the second pole winding U2 is distributed in slots #22 to #27 and slots #34 to #39, and the number of turns of the coil is changed sequentially from 12 in each of slots #22 and #34 to 18 in each of slots #23 and #35, 31 in each of slots #24 and #36, 31 in each of slots #25 and #37, 18 in each of slots #26 and #38 and 12 in each of slots #27 and #39, whereby the winding U2 is composed into a concentric-wound winding. Thus, in the windings composing the phase U, the number of turns of the coil is changed sequentially from 12 to 18, 31, 31, 18 and 12 as in the slots #46 to #3, for example. The degree of change in the number of turns differs from that in the prior art sinusoidal winding. However, since the number of turns is changed stepwise in the embodiment, the magnetomotive force distribution can be rendered approximately sinusoidal as in the prior art.

The coils are arranged in the fifteenth embodiment in the same manner as in the first and twelfth embodiments. Accordingly, the magnetomotive force distribution as shown in FIG. 3A and the winding factors as shown in FIG. 4 are also achieved in the sinusoidal winding of the fifteenth embodiment. As obvious from FIGS. 3A, 3B and 4, the magnetomotive force distribution can approximate to the sinusoidal wave and the high frequency winding factor can be reduced to a large extent by the use of the sinusoidal winding of the fifteenth embodiment.

Since the above-described arrangement is composed into the double-layer, concentric-wound type, the total number of turns of upper and lower coils inserted in slots #1 to #8, for example, is 31, 30, 30, 31, 31, 30, 30, and 31. Thus, the total number of turns of upper and lower coils inserted in each slot is approximately uniform, which shows that the sectional area of each slot is effectively used.

Figure 49:
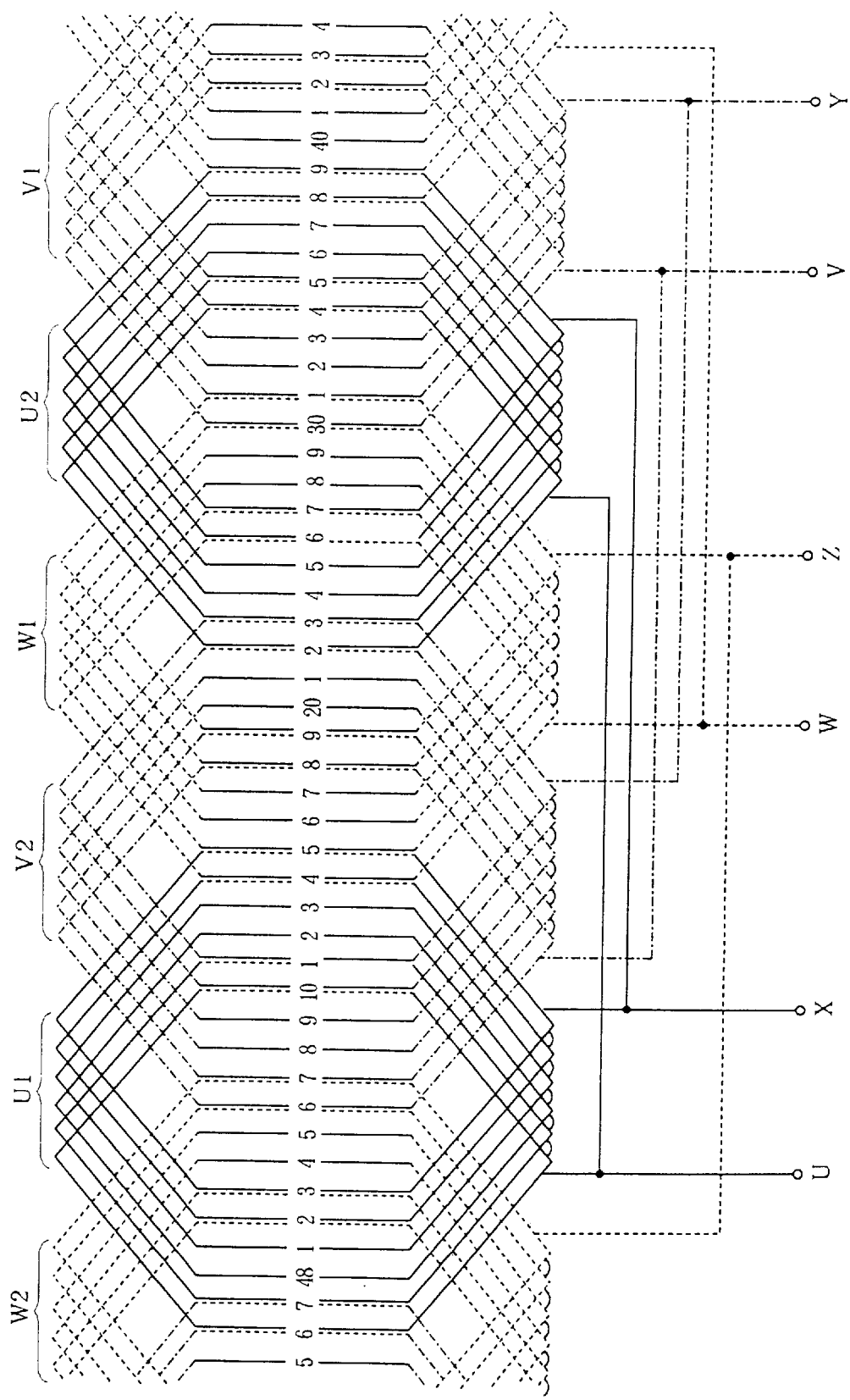
FIG. 49 is a development diagram of an armature winding of made by a method a fifteenth embodiment in accordance with the present invention.
Figure 51:
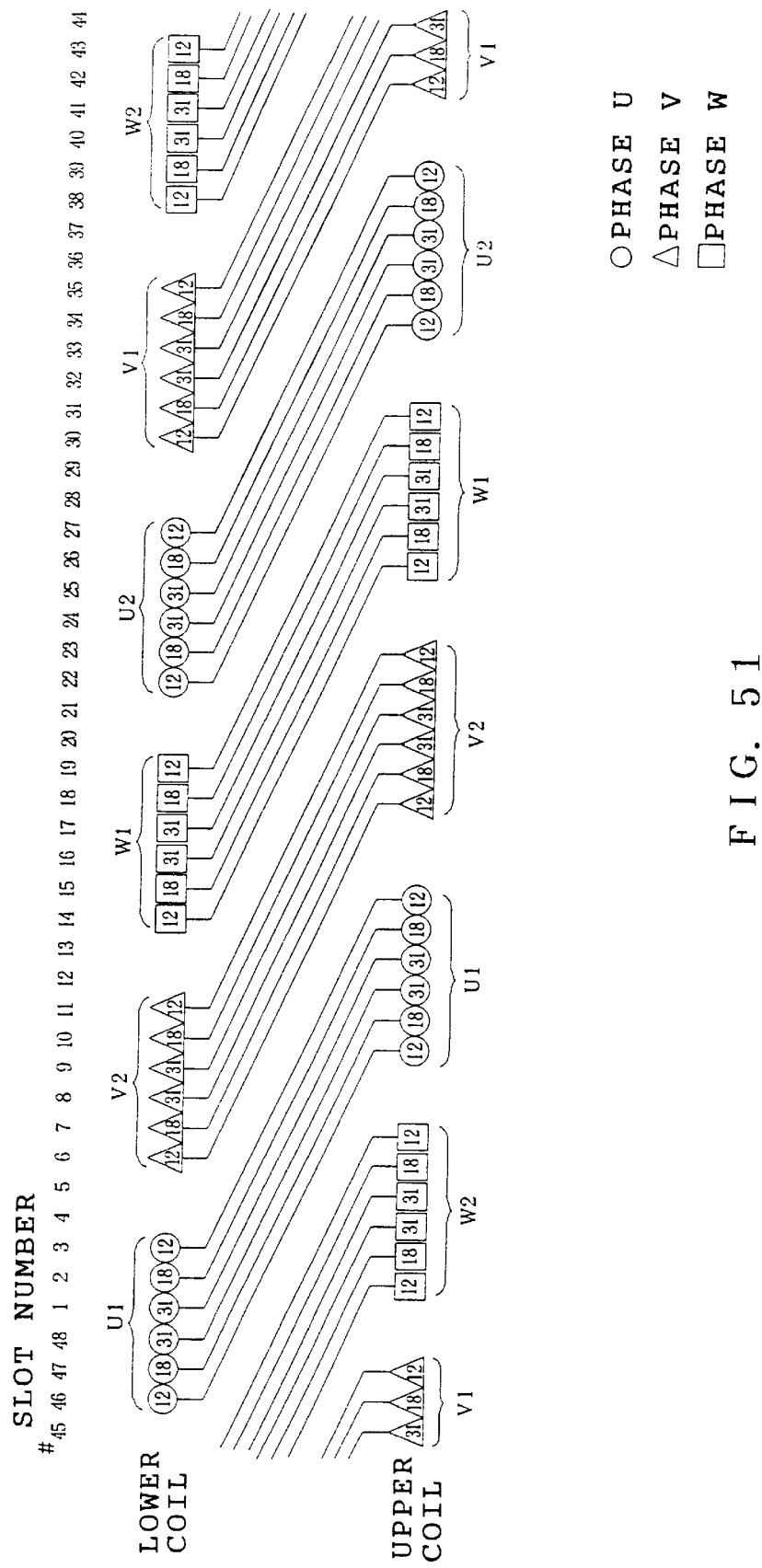
FIG. 51 illustrates an arrangement of upper and lower coils and the number of turns of each coil in the armature winding of the fifteenth embodiment.
Figure 52:
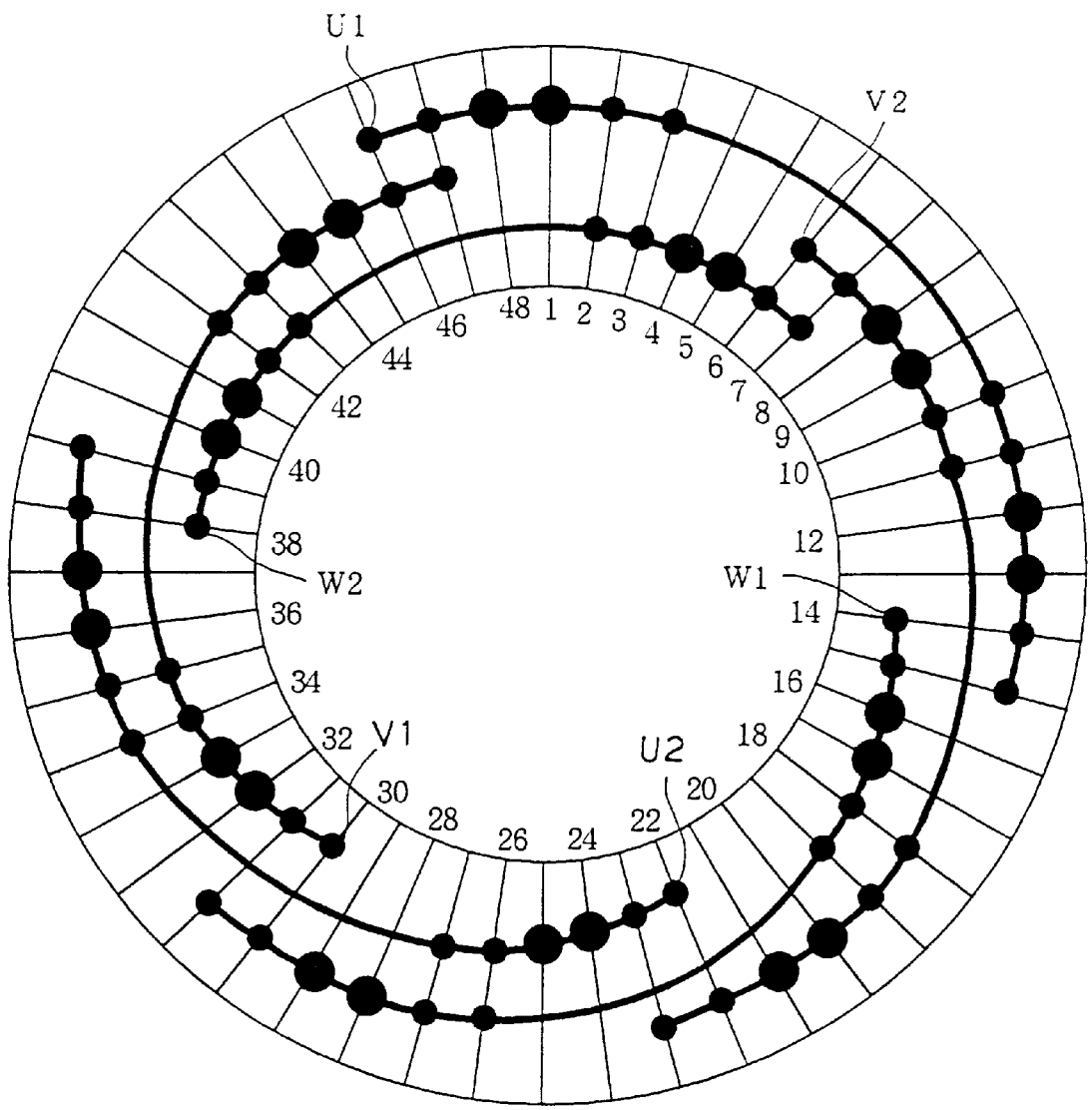
FIG. 52 illustrates a coil arrangement of the armature winding of the fifteenth embodiment.

FIG. 51 illustrates arrangement of upper and lower coils and the number of turns of the coils in the winding arrangement shown in FIG. 49. FIG. 52 illustrates an arrangement of the coils shown in FIG. 51 in the case where the coils are not lifted. As shown in FIG. 52, the first winding U1 of phase U is first inserted into the slots. The second winding V2 of phase V is then inserted into the slots. The first winding W1 of phase W is then inserted into the slots. The second winding U2 of phase U is then inserted into the slots. The first winding V1 of phase V is then inserted into the slots. The second winding W2 of phase W is finally inserted into the slots. Thus, the coils composing the windings can sequentially be inserted into the slots in the case where the coils are not lifted.

Figure 53:
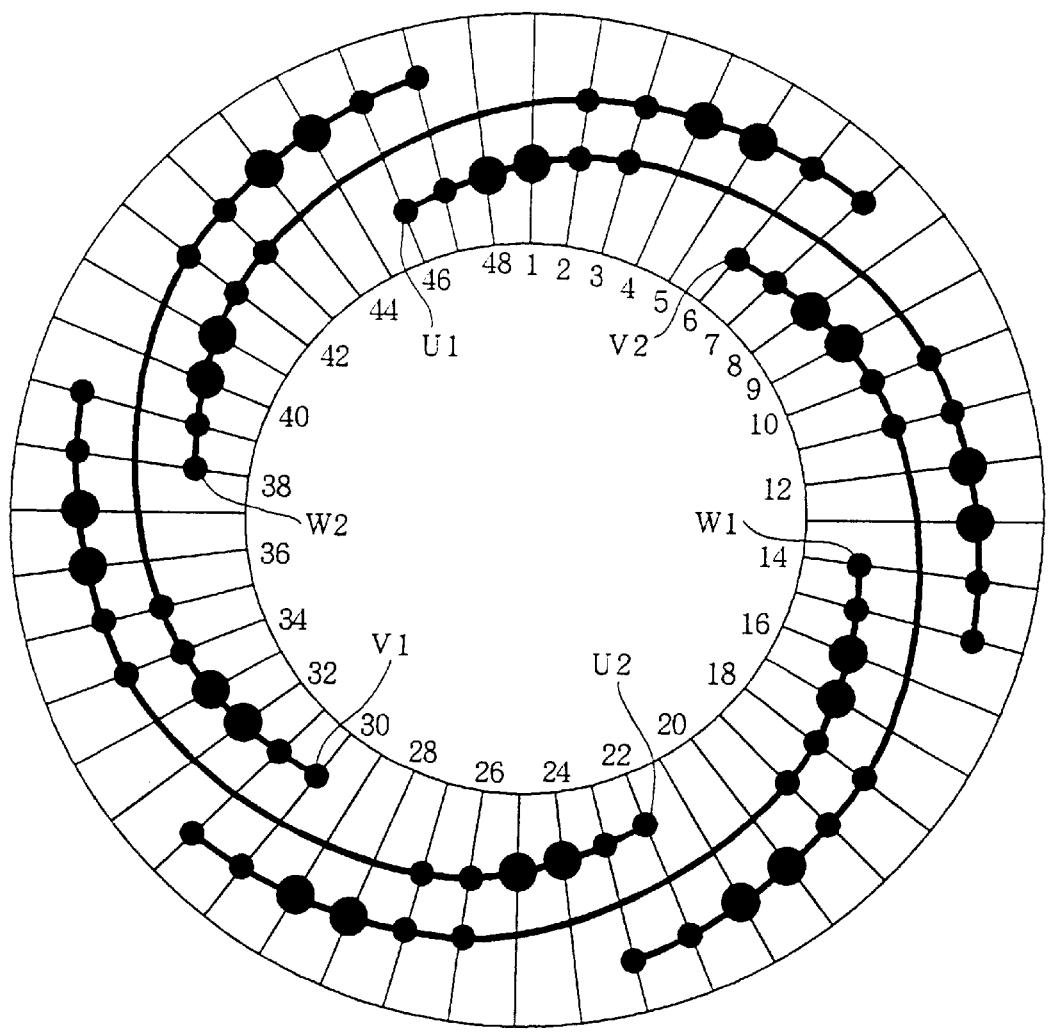
FIG. 53 illustrates a coil arrangement of the armature winding of a first modified form of the fifteenth embodiment.

FIG. 53 illustrates an arrangement of coils in the case where one winding is lifted at the time of coil insertion. One part of the first winding U1 of phase U is first inserted into the slots #10 to #15. One part of the second winding V2 of phase V is then inserted into the slots #18 to #23. One part of the first winding W1 of phase W is then inserted into the slots #26 to #31. One part of the second winding U2 of phase U is then inserted into the slots #34 to #39. One part of the first winding V1 of phase V is then inserted into the slots #42 to #47. One part of the second winding W2 of phase W is inserted into the slots #2 to #7. The other parts of the windings, which have been lifted up, are inserted into the slots in the following sequence. The other part of the first winding U1 of phase U is inserted into the slots #46 to #3. The other part of the second winding V2 of phase V is then inserted into the slots #6 to #11. The other part of the first winding W1 of phase W is then inserted into the slots #14 to #19. The other part of the second winding U2 of phase U is then inserted into the slots #22 to #27. The other part of the first winding V1 of phase V is then inserted into the slots #30 to #35. The other part of the second winding W2 of the phase W is finally inserted into the slots #38 to #43. Thus, the coils can sequentially be inserted into the slots even though some of the coils have been lifted up, and the same winding arrangement in the slots as shown in FIG. 52 can be obtained.

FIG. 50 shows the numbers of turns of coils inserted in the slots. Four coils (the number q) are used per phase per pole in the conventional sinusoidal winding of the double-layer concentric type. Since the upper and lower coils in each slot belong to the phases different from each other, an insulator needs to be inserted into each slot. In the embodiment of FIG. 50, however, the upper and lower coils belong to different phases in 24 slots, which number is half of that of all the slots and which are slots #2, #3, #6, #7, #10, #11, #14, #15, #18, #19, #22, #23, #26, #27, #30, #31, #34, #35, #38, #39, #42, #43, #46, and #47. Although the insulators are required for these slots, no insulators are required for the other 24 slots #1, #4, #5, #8, #9, #12, #13, #16, #17, #20, #21, #24, #25, #28, #29, #32, #33, #36, #37, #40, #41, #44, #45 and #48. Consequently, the number of steps in the assembly of armature winding can be reduced to a large extent. In the embodiment, furthermore, the number of windings per phase is two (=P/2 where P is the number of poles), which number is smaller by two than that (=P) in the conventional arrangement. Consequently, the number of windings can be reduced.

Furthermore, the thickness of coil ends of the previously inserted coils of one phase and those of the subsequently inserted coils of another phase crossing each other is about one half of that in a single-layer concentric-wound winding. Accordingly, since the coil ends can be shaped with a smaller force, the damage applied to the coils can be reduced and the coils of the subsequent phase can be readily inserted. Furthermore, the difference between the numbers of turns of two coils in each slot is small, that is, the difference of the sectional area between the coils is small. Accordingly, the coil inserting work for the second layer can be prevented from being worsened in the efficiency and the insulators can be prevented from being moved in the slots.

Figure 54:
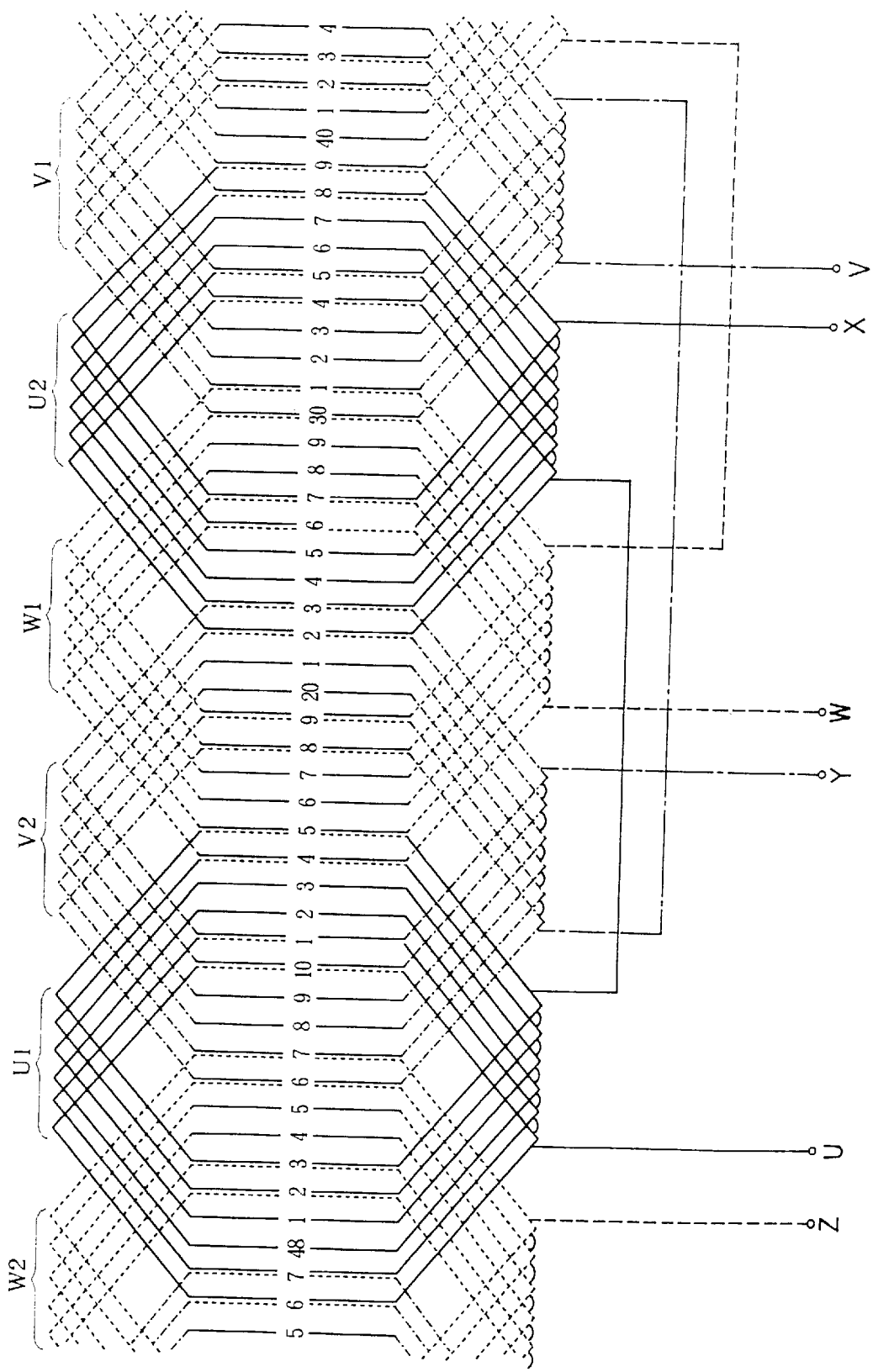
FIG. 54 is a development diagram of the armature winding of a second modified form of the fifteenth embodiment.

In the winding arrangement as shown in FIG. 49, two parallel pole winding sets each including two series connected windings are between terminals U and X and accordingly, two parallel electrical paths are provided between the terminals. In FIG. 49, a parallel electrical path is composed of each of pairs of the windings U1 and U2, the windings V1 and V2, and the winding W1 and W2. Referring to FIG. 54 showing a modified form of the fifteenth embodiment, each of the winding pairs U1 and U2, V1 and V2, and W1 and W2 may be series connected such that one electrical path is provided.

The winding factor with respect to the fundamental wave is 0.933 in the number of turns of each coil in the embodiment, whereas it is 0.908 in the sinusoidal winding shown in FIGS. 70A, 70B and 71. Thus, the winding factor is improved about 2.8%, which results in an improvement in the motor characteristics.

FIG. 50 exemplifies the number of turns of coils in each slot. For example, regarding the slots into which the windings of phase U are inserted, the number of turns is changed from T1 (=12) to T2 (=18), T3 (=31), T3, T2, and T1 sequentially in the slots #46 to #3 where $T1 \leq T2 < T3$. That is, the number of turns is changed from T1 of the outermost of the concentric coils to T2, T3, T3, T2 and T1 sequentially inwardly.

Furthermore, the armature winding of the fifteenth embodiment is composed into the lap winding type. As obvious from slots #46 to #3 in FIG. 50, the total number of turns of the coils inserted into the respective slots is T1+T2, T2+T1, T3, T3, T2+T1, and T1+T2. The number of turns is uniformed substantially in all the slots when T3 is set to be shown as T3=(0.7 to 1.3)×(T1+T2). This proves that the sectional area of each slot is effectively used.

Figure 55:
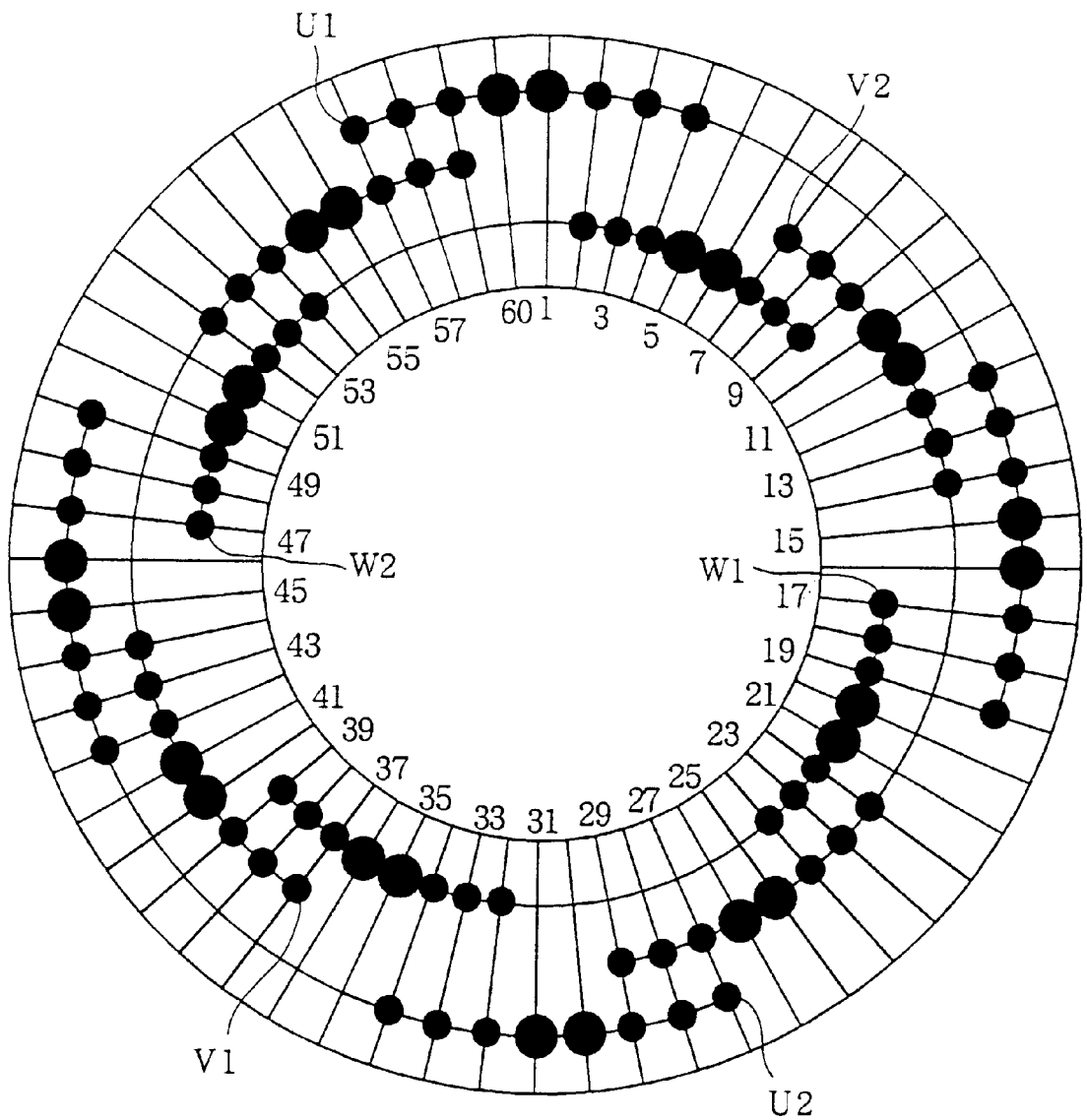
FIG. 55 illustrates a coil arrangement of an armature winding of made by a method a sixteenth embodiment in accordance with the present invention.

FIG. 55 illustrates a sixteenth embodiment of the present invention. In the embodiment, the invention is applied to a four-pole, 60-slot armature winding. The number q of slots per phase per pole is obtained as (60/3×4)=5. Each pole winding of each phase consists of eight (=2×(q−1)), concentrically distributed, continuous coils which are arranged into a double-layer winding. These eight coils are connected together into one pole winding corresponding to two poles. Thus, the whole armature winding comprises six concentric-wound coils including six coils U1 and U2 of phase U, V1 and V2 of phase V, and W1 and W2 of phase W.

The sixteenth embodiment shows that a sinusoidal winding can be composed into a double-layer, concentric-wound winding even when the number of slots is changed from 48 to 60. FIG. 55 exemplifies the number of turns of coils in each slot. For example, regarding the slots into which the windings of phase U are inserted, the number of turns is changed from T1 of the outermost to T2, T3, T4, T4, T3, T2 and T1 sequentially inwardly in the slots #57 to #4 where $T1 \leq T2 \leq T3 < T4$. That is, the number of turns is changed from T1 of the outermost of the concentric coils to T2, T3, and T4 sequentially inwardly.

Furthermore, the armature winding of the sixteenth embodiment is composed into the double-layer, concentric-wound type. As obvious from slots #57 to #4 in FIG. 55, the total number of turns of the coils inserted into the respective slots is T1+T3, T2+T2, T3+T1, T4, T4, T3+T1, T2+T2, and T1+T3. The number of turns is uniformed substantially in all the slots when T1 is set to be shown as T1=(0.7 to 1.3)× (T3+T1)=(1.4 to 2.6)×T2. This proves that the sectional area of each slot is effectively used.

Figure 56:
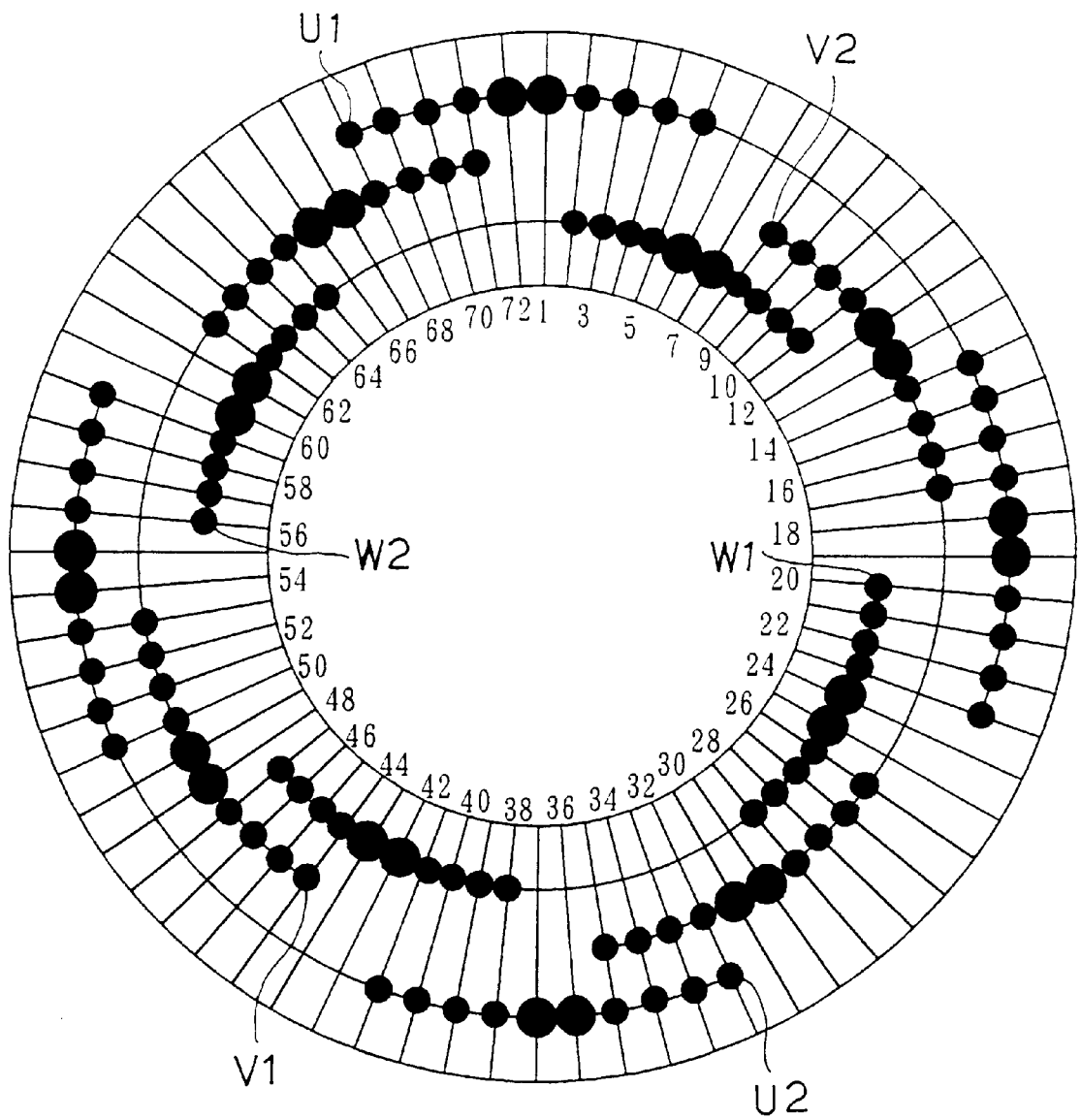
FIG. 56 illustrates a coil arrangement of the armature winding of a modified form of the sixteenth embodiment.

FIG. 56 illustrates a modified form of the sixteenth embodiment wherein the invention is applied to a four-pole, 72-slot armature winding. The number q of slots per phase per pole is obtained as (72/3×4)=6. Each pole winding of each phase consists of ten (=2×(q−1)), concentrically distributed, continuous coils which are arranged into a double-layer winding. These ten coils are connected together into one pole winding corresponding to two poles. Thus, the whole armature winding comprises six concentric-wound coils including six coils U1 and U2 of phase U, V1 and V2 of phase V, and W1 and W2 of phase W. Accordingly, a sinusoidal winding can be composed into a double-layer, concentric-wound winding even when the number of slots is changed to 72.

The number of turns of coils in each slot will be described. For example, regarding the slots into which the windings of phase U are inserted, the number of turns is changed from T1 of the outermost to T2, T3, T4, T5, T5, T4, T3, T2 and T1 sequentially inwardly in the slots #68 to #5 where $T1 \leq T2 \leq T3 \leq T4 < T5$. That is, the number of turns is changed from T1 of the outermost of the concentric coils to T2, T3, T4, and T4 sequentially inwardly.

Furthermore, the armature winding is composed into the double-layer, concentric-wound type. As obvious from slots #57 to #4 in FIG. 56, the total number of turns of the coils inserted into the respective slots is T1+T4, T2+T3, T3+T2, T4+T1, T5, T5, T4+T1, T3+T2, T2+T3 and T1+T4. The number of turns is uniformed substantially in all the slots when T5 is set to be shown as T5=(0.7 to 1.3)×(T4+T1 )= (0.7 to 1.3)×(T3+T2). This proves that the sectional area of each slot is effectively used.

Figure 57:
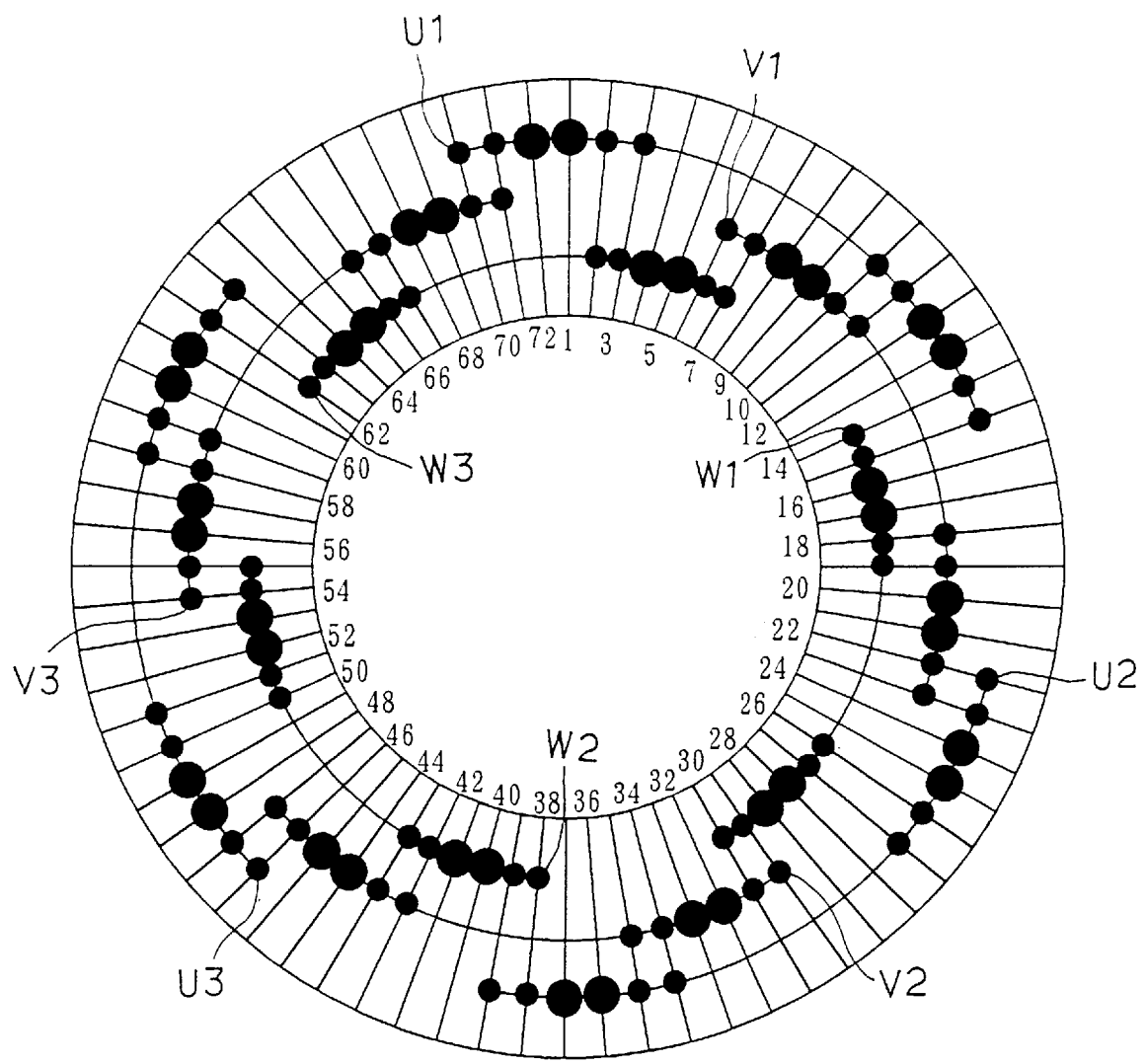
FIG. 57 illustrates a coil arrangement of an armature winding of made by a method a seventeenth embodiment in accordance with the present invention.

FIG. 57 illustrates a seventeenth embodiment of the present invention. In the embodiment, the invention is applied to a three-phase, six-pole, 60-slot armature winding. The number q of slots per phase per pole is obtained as (72/3×6)=4. Each pole winding of each phase consists of six (=2×(q−1)), concentrically distributed, continuous coils which are arranged into a double-layer winding. These six coils are connected together into one pole winding corresponding to two poles. Thus, the whole armature winding comprises nine concentric-wound windings including pole windings U1, U2 and U3 of phase U, pole windings V1, V2 and V3 of phase V, pole windings W1, W2 and W3 of phase W. Accordingly, a sinusoidal winding can be composed into a double-layer, concentric-wound winding even when the number of poles is changed from four to six. Furthermore, since each phase includes three pole windings U1–U3, V1–V2, and W1–W3, the number of parallel electrical paths can be one or three.

The number of turns of coils in each slot will be described. For example, regarding the slots into which the windings of phase U are inserted, the number of turns is changed from T1 of the outermost to T2, T3, T3, T2 and T1 sequentially inwardly in the slots #70 to #3 where T1≦T2<T3. Furthermore, the armature winding is composed into the double-layer, concentric-wound type. As obvious from slots #70 to #3 in FIG. 57, the total number of turns of the coils inserted into the respective slots is T1+T2, T2+T1, T3, T3, T2+T1 and T1+T2. The number of turns is uniformed substantially in all the slots when T1 is set to be shown as T1=(0.7 to 1.3)×(T2+T3). This proves that the sectional area of each slot is effectively used.

Figure 58:
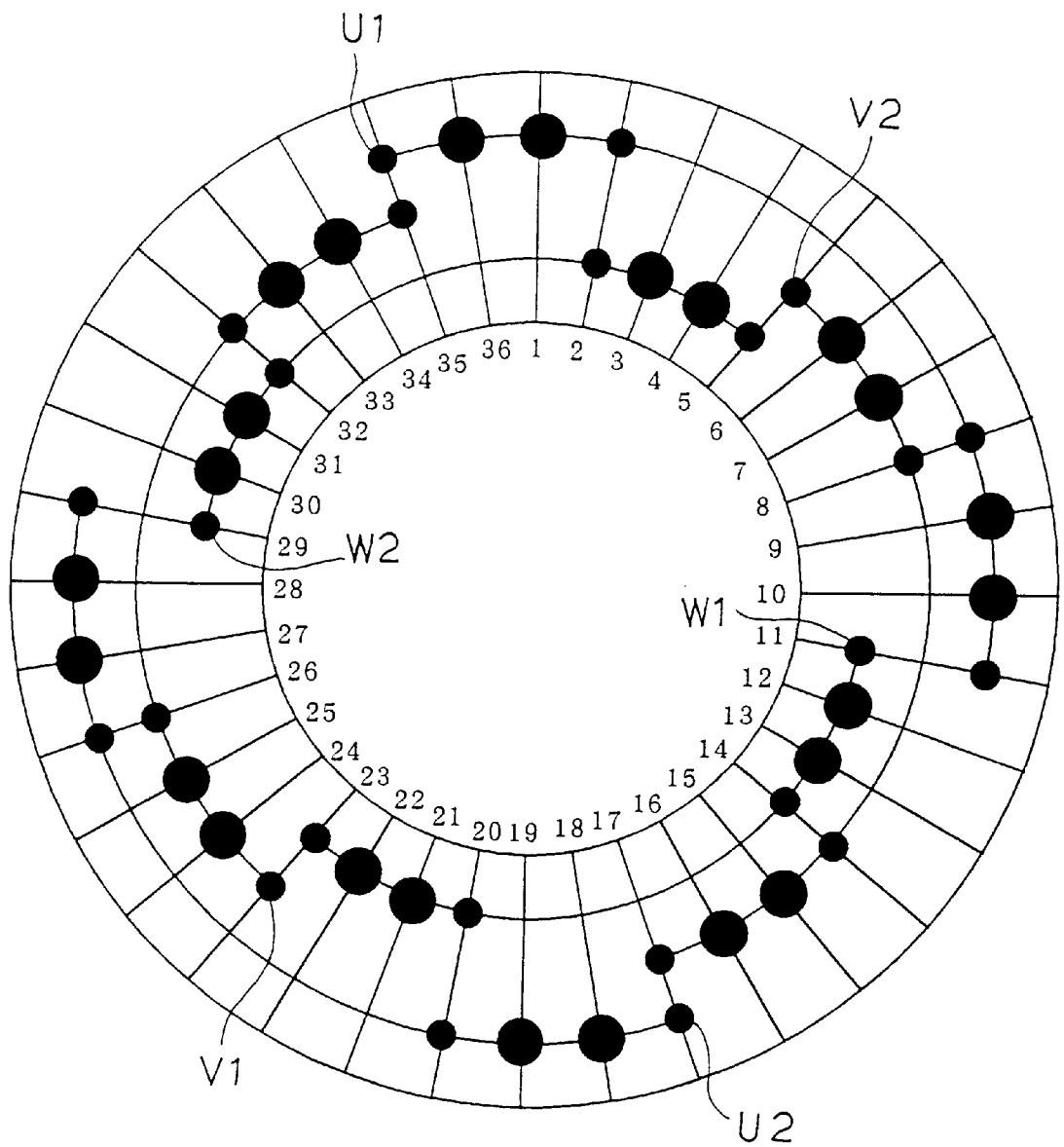
FIG. 58 illustrates a coil arrangement of an armature winding of made by a method an eighteenth embodiment in accordance with the present invention.

FIG. 58 illustrates an eighteenth embodiment wherein the invention is applied to a three-phase four-pole, 36-slot armature winding. In the eighteenth embodiment, a similar winding arrangement is obtained as that in the seventeenth embodiment.

Although the sixteenth and seventeenth embodiments relate to a double-layer, concentric-wound winding, the winding arrangements of these embodiments may be applied to a lap winding as described as the fifteenth embodiment.

The invention has been applied to the armature windings of three-phase four-pole 48-slot, four-pole 60-slot, four-pole 72-slot, six-pole 72-slot, and four-pole 36-slot arrangements in the heretofore described embodiments. The present invention should not be limited to these arrangements but may be applied to those having other numbers of poles and slots. In the foregoing embodiments, furthermore, the number of turns in a winding machine is previously set at a selected value so that coils with different turns can be automatically produced. Additionally, the coils can be inserted into the slots by a coil inserting machine.

Figure 59:
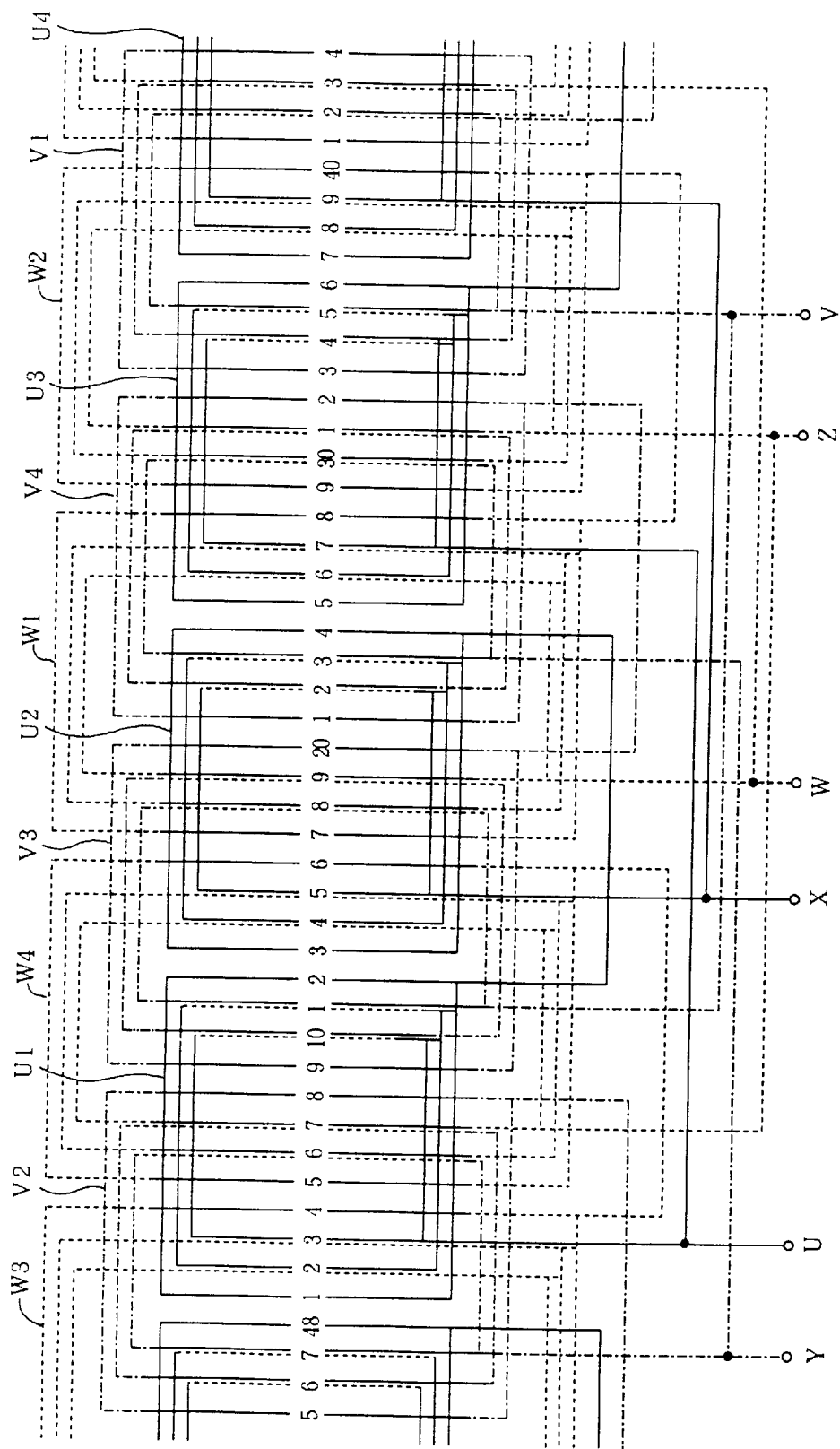
FIG. 59 is a development diagram of an armature winding of made by a method a nineteenth embodiment in accordance with the present invention.

FIG. 59 illustrates a nineteenth embodiment of the present invention. In the embodiment, the invention is applied to a three-phase, four-pole, 48-slot armature winding of the double-layer, concentric-wound type, and two parallel electrical paths are formed between outer terminals U and X by pole windings, as described as the first embodiment with reference to FIG. 1. Accordingly, the winding arrangement shown in FIG. 59 is the same as that shown in FIG. 1 except for locations of lead wires.

Coils connected to an armature winding terminal U of phase U in FIG. 1 have their beginnings of turn in slots #1 and #25 respectively, whereas those in FIG. 59 have their beginnings of turn in slots #3 and #27 respectively. On one hand, the number of turns of the coils inserted in the respective slots #1 and #25 in FIG. 1 is 31, and only these coils constituting the phase U are disposed in the respective slots. Regarding armature winding terminals V, W, X, Y and Z, the beginnings of turn of coils are located in slots #33 and #9, #17 and #41, #13 and #37, #45 and #21, and #29 and #5 respectively, and the number of turns of the coils in these slots is 31. On the other hand, the beginnings of turn of coils connected to the terminal U are located in slots #3 and #27 respectively in FIG. 59, as described above. The number of turns of these coils is 12, and a coil of another phase is disposed in each of these slots #3 and #27. Regarding terminals V, W, X, Y and Z, the beginnings of turn of coils are located in slots #35 and #11, #19 and #43, #15 and #39, #47 and #23, and #31 and #7 respectively, and the number of turns of the coils in these slots is 12.

Generally, there is no problem of surge voltage when a dynamoelectric machine is energized from a commercial power source. However, when the dynamoelectric machine is energized from an inverter controlled power source, a capacitance of a power supply cable connected between the dynamoelectric machine and the inverter sometimes produces a surge voltage higher than a power source voltage. The surge voltage is applied to the windings of the dynamoelectric machine such that there is a possibility of occurrence of dielectric breakdown in the windings in a worst case. In such a case, the highest voltage is applied to the coils near power supply terminals, and there is a possibility of occurrence of dielectric breakdown in the coils belonging to the same phase.

In a single-layer concentric-wound winding wherein coils of the same phase are disposed in each of slots, a considerably large voltage difference occurs between the beginning and the end of turn of a coil disposed in each slot. Furthermore, an insulator is disposed in each slot in a double-layer concentric-wound winding so as to divide the interior of the slot into two areas, where two coils belonging to different phases are disposed respectively. Accordingly, the coils belonging to different phases are protected against the dielectric breakdown, but a considerably large voltage difference, which is smaller than in the single-layer concentric-wound winding, occurs between the beginning and the end of turn of a coil disposed in each slot. In the winding arrangement of FIG. 1, furthermore, only the coils of the same phase are disposed in the slots, as in the single-layer concentric-wound winding, where the winding of the coils is initiated. Consequently, a considerably large voltage difference occurs between the start and the end of the winding of the coil.

In the arrangement shown in FIG. 59, however, the beginning of turn of the coil connected to each winding terminal is a coil with the smallest number of turns and is connected sequentially to coils with a larger number of turns. Accordingly, the number of turns of the coils of different phases located nearest to the terminal to which a largest surge voltage is applied is the smallest. Consequently, the difference in voltage between the beginning and the end of turn of the coils belonging to the same phase in the same slot can be rendered smaller, whereupon the coils can be protected against the dielectric breakdown due to the surge voltage. Since an insulator is interposed between the coils belonging to the different phases, there is no problem of dielectric breakdown. Furthermore, the number of turns of the coils disposed in a subsequent slot can be rendered smaller as compared with that in the single-layer concentric-wound winding such that the difference in voltage can be rendered smaller between the beginning and the end of turn of the coils belonging to the same phase. Furthermore, the dielectric breakdown due to the surge voltage can be reduced between the coils belonging to the same phase since the number of turns of the coils in the slot nearest to each terminal when the armature winding is connected either in a delta connection or in a wye connection. Furthermore, when the armature winding is connected only in the wye connection, the beginnings of turn of only the coils nearest to the terminals U, V, and W connected to a power source are located in the slots where the number of turns is the smallest.

In the above-described nineteenth embodiment, the invention is applied to a three-phase, four-pole, 48-slot armature winding of the double-layer, concentric-wound type, and two parallel electrical paths are formed between outer terminals U and X by pole windings. The invention should not be limited to this arrangement and may be applied to four-pole 60-slot, four-pole 72-slot, six-pole 72-slot, and six-pole 90 slot armature windings in which one, two, three, four, and six parallel electrical paths are formed.

Figure 60:
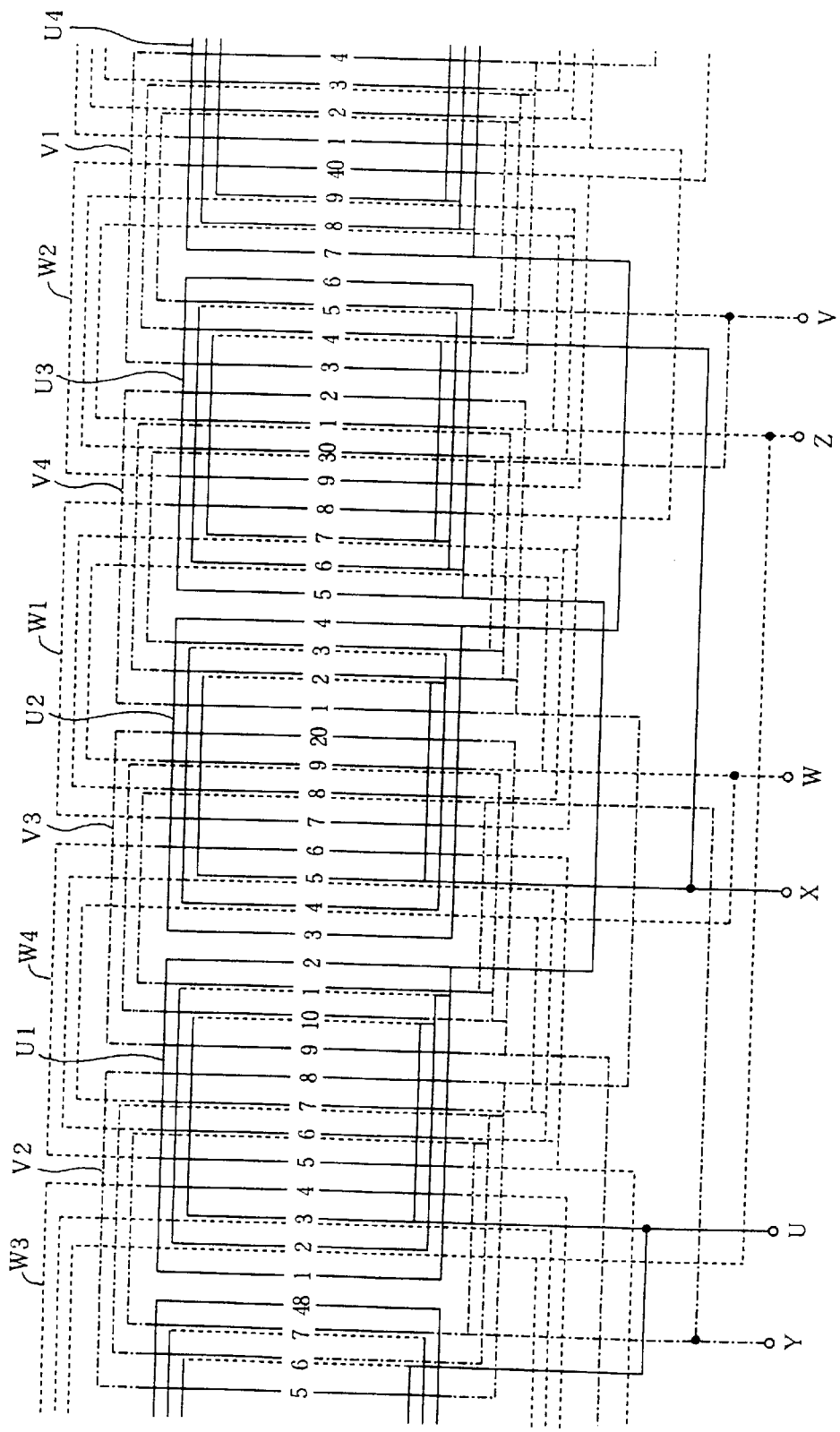
FIG. 60 is a development diagram of an armature winding of a twentieth embodiment in accordance with the present invention.

FIG. 60 illustrates a twentieth embodiment of the present invention. The twentieth embodiment provides for a double-layer, concentric-wound armature winding similar to that described as the modified form of the first embodiment with reference to FIG. 8 except for locations of lead wires.

Coils connected to an armature winding terminal U of phase U in FIG. 8 have their beginnings of turn in slots #1 and #46 respectively, whereas those in FIG. 60 have their beginnings of turn in slots #3 and #46 respectively. On one hand, the number of turns of the coils inserted in the respective slots #1 and #25 in FIG. 8 is 31, and only these coils constituting the phase U are disposed in the respective slots. Regarding armature winding terminals V, W, X, Y and Z, the beginnings of turn of coils are located in slots #33 and #30, #17 and #14, #13 and #34, #45 and #18, and #29 and #2 respectively, and the number of turns of the coils in these slots is 31. On the other hand, in FIG. 60, the beginnings of turn of coils connected to the terminal U are located in slots #3 and #27 respectively, as described above. The number of turns of these coils is 12, and a coil of another phase is disposed in each of these slots #3 and #27. Regarding terminals V, W, X, Y and Z, the beginnings of turn of coils are located in slots #35 and #30, #19 and #14, #15 and #34, #47 and #18, and #31 and #2 respectively, and the number of turns of the coils in these slots is 12.

In the arrangement shown in FIG. 60, however, the beginning of turn of the coil connected to each winding terminal is a coil with the smallest number of turns and is connected sequentially to coils with a larger number of turns. Accordingly, the number of turns of the coils of different phases located nearest to the terminal to which a largest surge voltage is applied is the smallest. Consequently, the difference in voltage between the beginning and the end of turn of the coils belonging to the same phase in the same slot can be rendered smaller, whereupon the coils can be protected against the dielectric breakdown due to the surge voltage. Since an insulator is interposed between the coils belonging to the different phases, there is no problem of dielectric breakdown. Furthermore, the number of turns of the coils disposed in a subsequent slot can be rendered smaller as compared with that in the single-layer concentric-wound winding such that the difference in voltage can be rendered smaller between the beginning and the end of turn of the coils belonging to the same phase. Furthermore, the dielectric breakdown due to the surge voltage can be reduced between the coils belonging to the same phase since the number of turns of the coils in the slot nearest to each terminal when the armature winding is connected either in a delta connection or in a wye connection. Furthermore, when the armature winding is connected only in the wye connection, the beginnings of turn of only the coils nearest to the terminals U, V, and W connected to a power source are located in the slots where the number of turns is the smallest.

In the above-described twentieth embodiment, the invention is applied to a three-phase, four-pole, 48-slot armature winding of the double-layer, concentric-wound type, and four parallel electrical paths are formed between outer terminals U and X by pole windings. The invention should not be limited to this arrangement and may be applied to four-pole 60-slot, four-pole 72-slot, six-pole 72-slot, and six-pole 90 slot armature windings in which four and six parallel electrical paths are formed.

Figure 61:
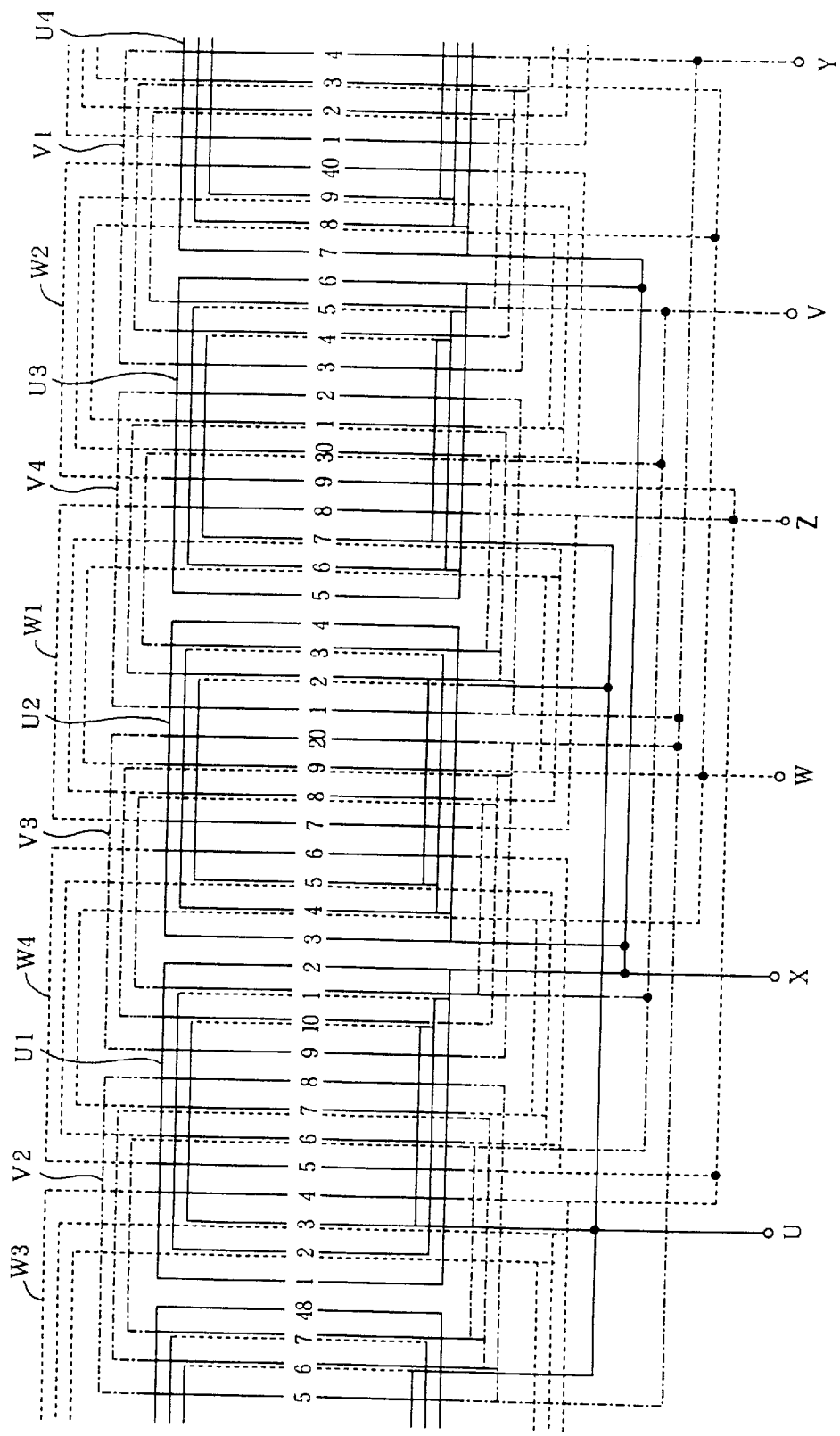
FIG. 61 is a development diagram of an armature winding of made by a method a twenty-first embodiment in accordance with the present invention.
Figure 62:
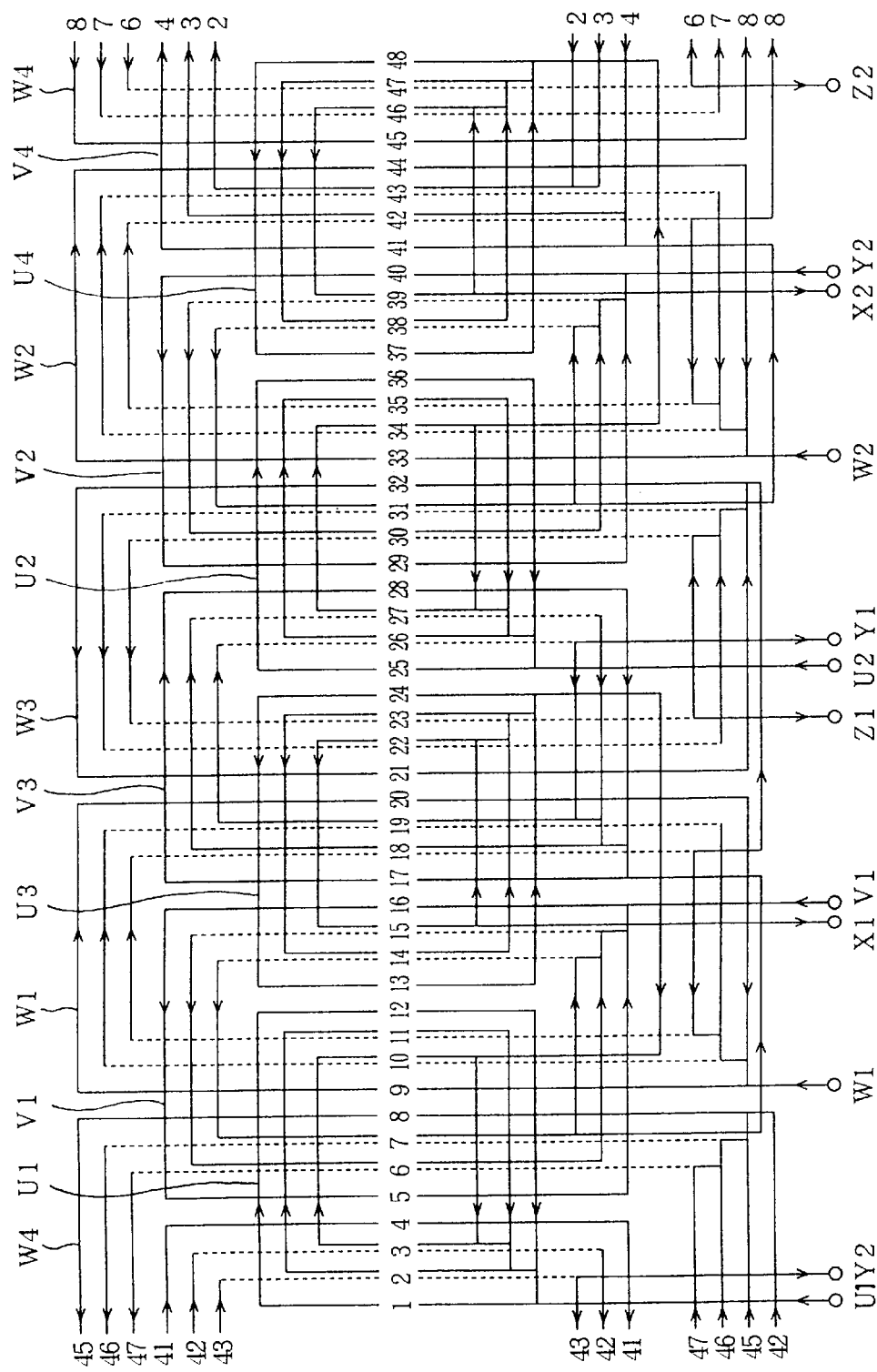
FIG. 62 is a development diagram of a first conventional armature winding composed into a concentric-wound type.
Figure 63:
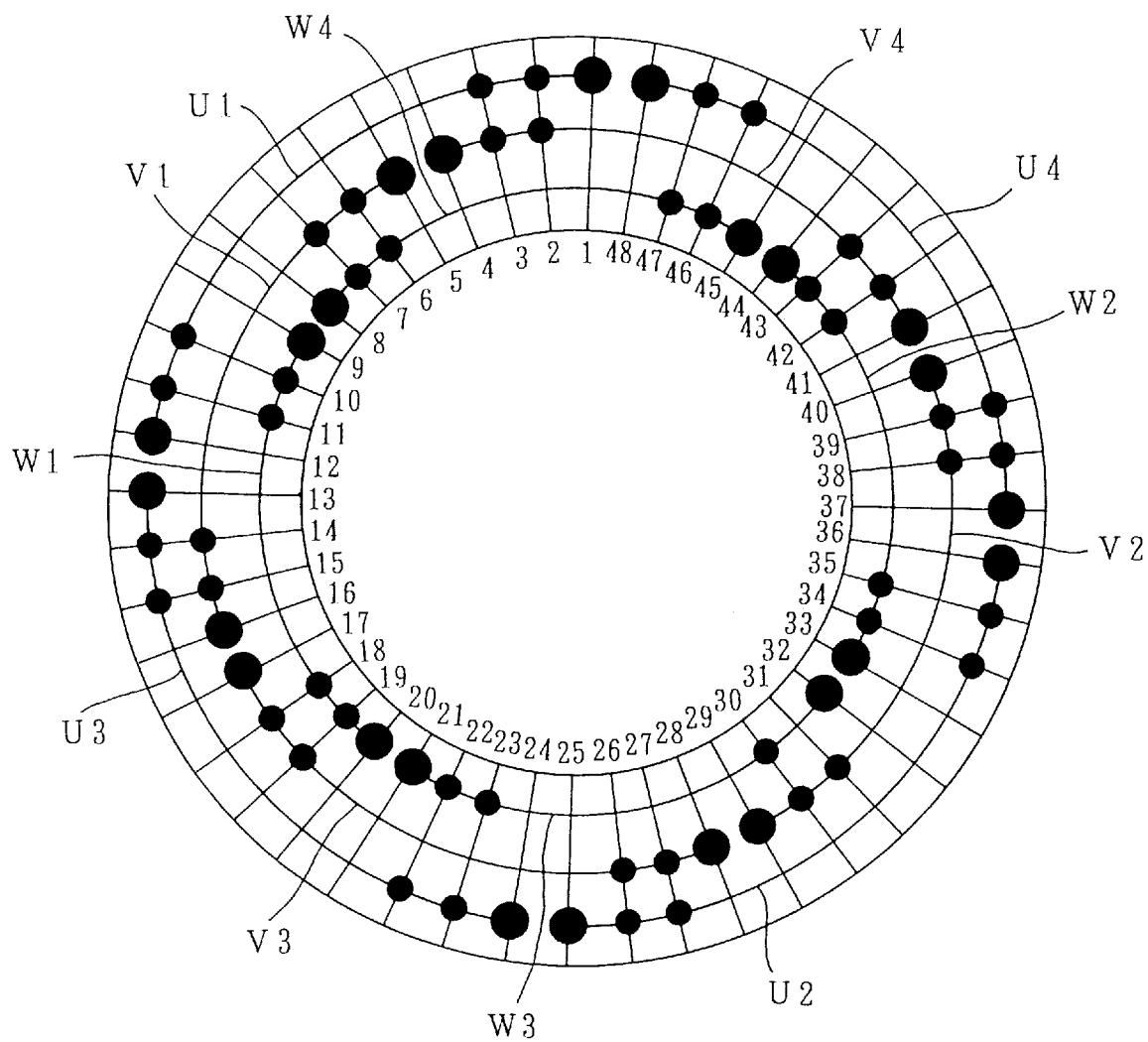
FIG. 63 illustrates a coil arrangement of the armature winding as shown in FIG. 62.
Figure 64:
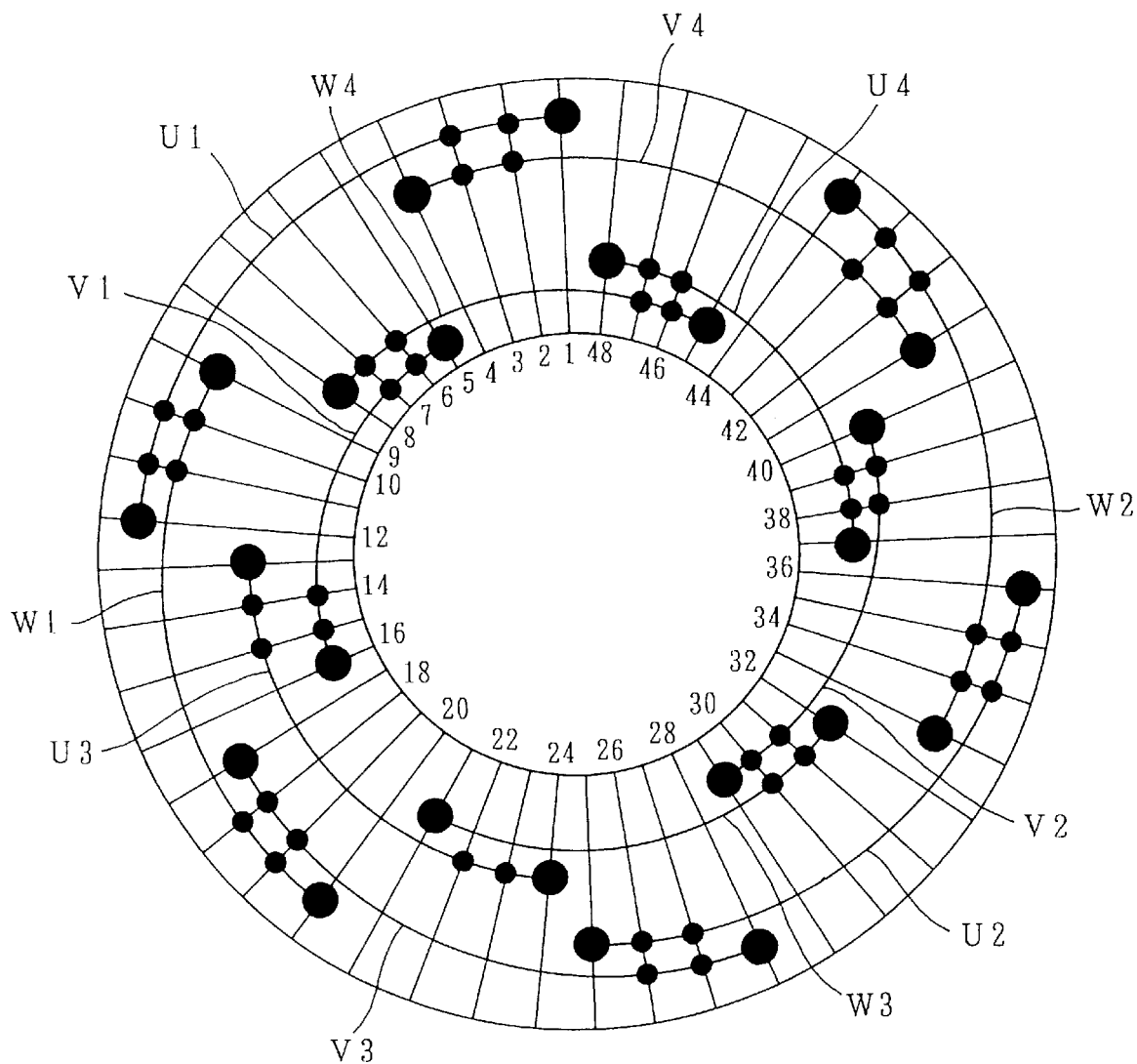
FIG. 64 illustrates a coil arrangement of a second conventional concentric-wound type armature winding.
Figure 65:
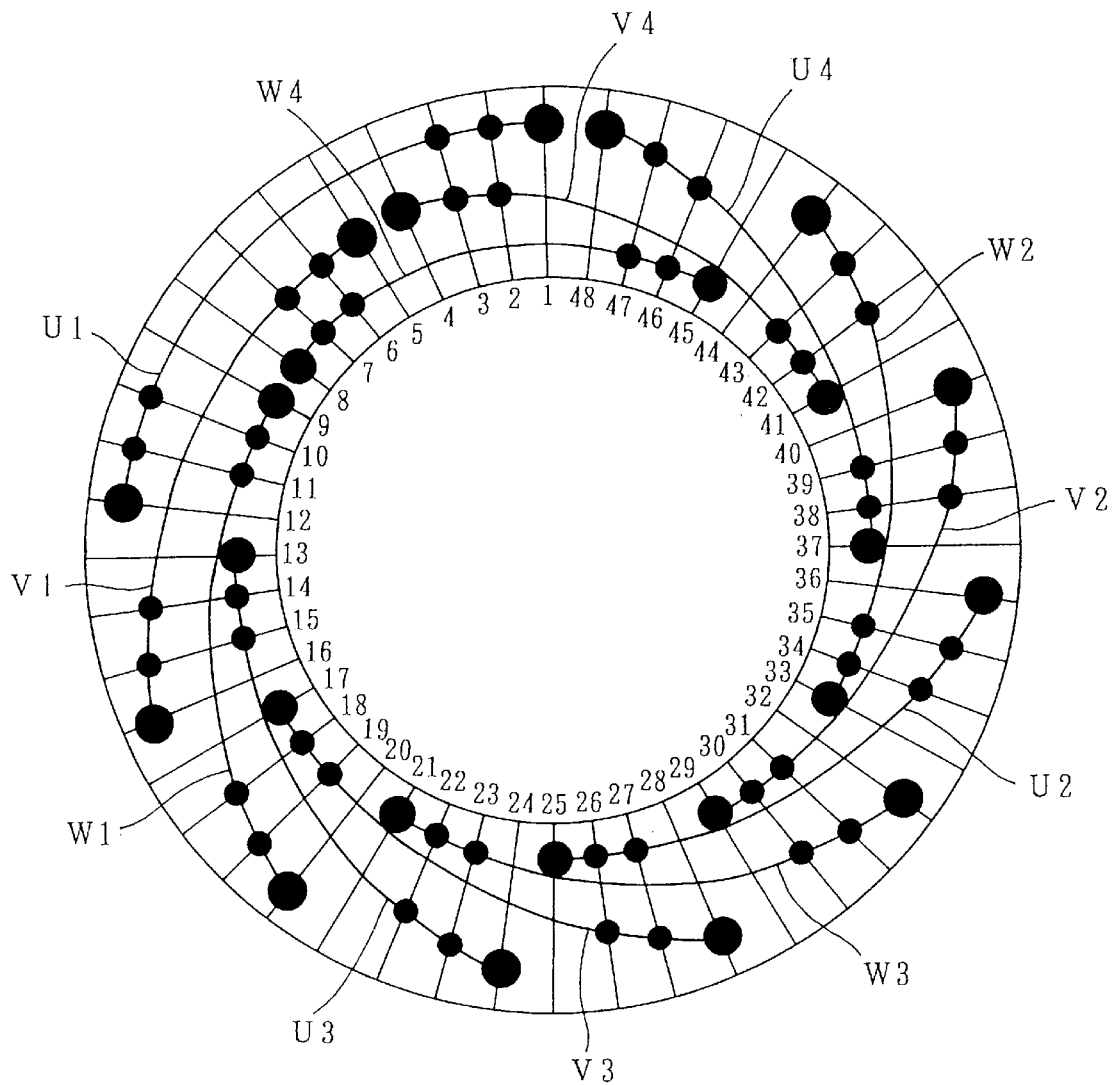
FIG. 65 illustrates a coil arrangement of a third conventional concentric-wound type armature winding.
Figure 66:
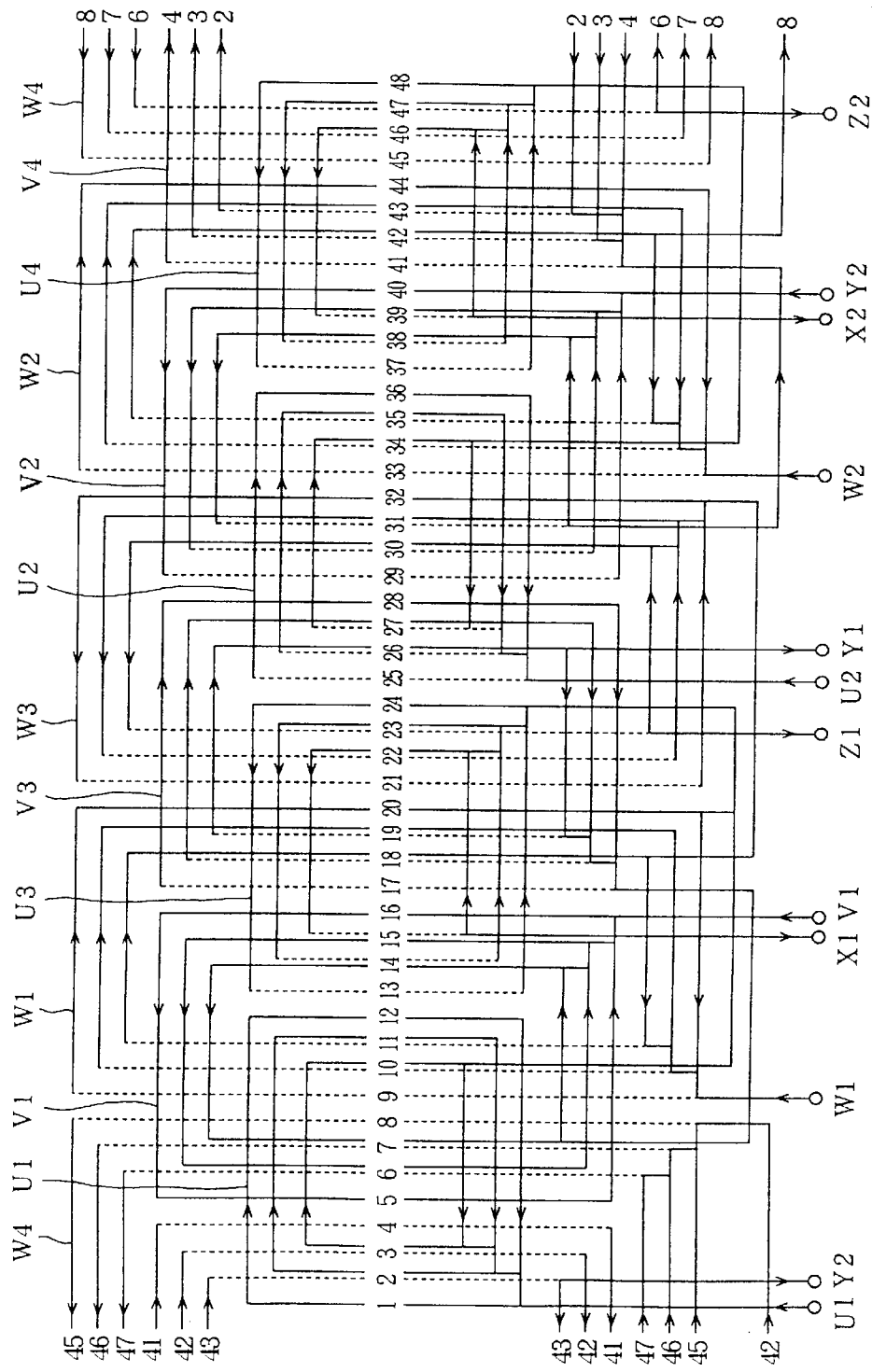
FIG. 66 is a development diagram of a third conventional concentric-wound type armature winding.

FIG. 61 illustrates a twenty-first embodiment of the present invention. In the twenty-first embodiment, the invention is applied to a three-phase, double-layer, concentric-wound armature winding, and the number of parallel electrical paths is four, the armature winding being similar to that described in the fourth embodiment with reference to FIG. 12 except for the locations of lead wires.

Coils connected to an armature winding terminal U of phase U in FIG. 12 have their beginnings of turn in slots #1, #22, #25 and #46 respectively, whereas those in FIG. 61 have their beginnings of turn in slots #3, #22, #27 and #46 respectively. On one hand, the number of turns of the coils inserted in the respective slots #1, #22, #25 and #46 in FIG. 12 is 31, and only these coils constituting the phase U are disposed in the respective slots. Regarding armature winding terminals V and W, the beginnings of turn of coils are located in slots #33, #6, #9 and #30 and slots #17, #38, #41 and #14 respectively, and the number of turns of the coils in these slots is 31. On the other hand, in FIG. 61, the beginnings of turn of coils connected to the terminal U are located in slots #3, #22, #27 and #46 respectively, as described above. The number of turns of these coils is 12, and a coil of another phase is disposed in each of these slots #3, #22, #27 and #46. Regarding terminals V and W, the beginnings of turn of coils are located in slots #35, #6, #11 and #30 and slots #19, #38, #43 and #14 respectively, and the number of turns of the coils in these slots is 12.

When the armature winding shown in FIG. 61 is connected in a wye connection, the armature winding terminals U, V and W are connected to a power source. The beginnings of turn of the coils connected to the respective terminals U, V and W are coils with the smallest number of turns, which coils are connected to other coils with a larger number of turns. Accordingly, the number of turns of the coils of different phases located nearest to the terminal to which a largest surge voltage is applied is the smallest. Consequently, the difference in voltage between the beginning and the end of turn of the coils belonging to the same phase in the same slot can be rendered smaller, whereupon the coils can be protected against the dielectric breakdown due to the surge voltage. Since an insulator is interposed between the coils belonging to the different phases, there is no problem of dielectric breakdown. Furthermore, the number of turns of the coils disposed in a subsequent slot can be rendered smaller as compared with that in the single-layer concentric-wound winding such that the difference in voltage can be rendered smaller between the beginning and the end of turn of the coils belonging to the same phase.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

We claim:

1. A method of making an armature winding for a three phase four pole dynamoelectric machine, the method comprising the steps of:

setting a number q of slots per phase per pole at or above four and setting a number of coils of one winding corresponding to one pole at or above two and less than the number q;

setting a number of turns and a coil pitch of each of the coils at different values from each other so that a magnetomotive force produced by the winding is rendered approximately sinusoidal, and setting a quantity of a minimum coil pitch between q and 2q, inclusive;

arranging the coils into an integral-slot winding having a concentric-wound winding distribution wherein the number of turns of each coil is increased or decreased sequentially from an outermost coil to an innermost coil;

winding the coil with a maximum number of turns in the concentric-wound winding into a single-layer winding and each of the other coils into a double-layer winding;

simultaneously inserting into the slots a first set of windings including three windings corresponding to first poles of three phases and three windings corresponding to fourth poles of the three phases; and simultaneously inserting into the slots a second set of windings including three windings corresponding to third poles of the three phases and three windings corresponding to second poles of the three phases, the steps being sequentially executed.

2. The method according to claim 1, wherein the coil nearest to each one of a plurality of terminals includes a lead wire constituting a coil with a smaller number of turns.

3. A method of making an armature winding for a three phase four pole dynamoelectric machine, the method comprising the steps of:

setting a number q of slots per phase per pole at or above four and setting a number of coils of one winding corresponding to one pole at or above two and less than the number q;

setting a number of turns and a coil pitch of each of the coils at different values from each other so that a magnetomotive force produced by the winding is rendered approximately sinusoidal, and setting a quantity of a minimum coil pitch between q and 2g, inclusive arranging the coils into an integral-slot winding having a concentric-wound winding distribution wherein the number of turns of each coil is increased or decreased sequentially from an outermost coil to an innermost coil;

winding the coil with a maximum number of turns in the concentric-wound winding into a single-layer winding and each of the other coils into a double-layer winding;

simultaneously inserting into slots a first set of windings including three windings corresponding to first poles of three phases and three windings corresponding to third poles of the three phases; and simultaneously inserting into slots a second set of windings including three windings corresponding to fourth poles of the three phases and three windings corresponding to second poles of the three phases, the steps being sequentially executed.

4. The method according to claim 3, wherein the coil nearest to each one of a plurality of terminals includes a lead wire constituting a coil with a smaller number of turns.

5. A method of making an armature winding for a three phase six pole dynamoelectric machine, the method comprising the steps of:

setting a number q of slots per phase per pole at or above four and setting a number of coils of one winding corresponding to one pole at or above two and less than the number q;

setting a number of turns and a coil pitch of each of the coils at different values from each other so that a magnetomotive force produced by the winding is rendered approximately sinusoidal, and setting a quantity of a minimum coil pitch between q and 2q, inclusive;

arranging the coils into an integral-slot winding having a concentric-wound winding distribution wherein the number of turns of each coil is increased or decreased sequentially from an outermost coil to an innermost coil;

winding the coil with a maximum number of turns in the concentric-wound winding into a single-layer winding and each of the other coils into a double-layer winding;

simultaneously inserting into slots a first set of windings including three windings corresponding to a first phase of three phases and having a same polarity and three windings corresponding to a third phase of the three phases and having a polarity opposed to the polarity of the windings corresponding to the first phase;

simultaneously inserting into slots a second set of windings including three windings corresponding to a second phase of the three phases and having a same polarity and three windings corresponding to the first phase of the three phases and having a polarity opposed to the polarity of the windings corresponding to second phase; and simultaneously inserting into slots a third set of windings including three windings corresponding to the third phase of the three phases and three windings corresponding to the second phase of the three phases, the steps being sequentially executed.

6. The method according to claim 5, wherein the coil nearest to each one of a plurality of terminals includes a lead wire constituting a coil with a smaller number of turns.

7. A method of making an armature winding for a three phase dynamoelectric machine, the method comprising the steps of:

setting a number q of slots per phase per pole at or above four, setting a number of coils of one winding at 2×(q−1), and setting coil pitches of the respective coils at different values from one another;

setting a minimum coil pitch in the coils of one winding between q and 2g, inclusive;

setting a number of turns of each of the coils of one winding so that the number is minimum at an outermost slot and an innermost slot and so that the number is maximum at a central slot so that a magnetomotive force produced by the winding is rendered approximately sinusoidal, and arranging the coils into a concentric winding distribution;

setting outermost coils of two windings belonging to the same phase in the concentric winding distribution so that the outermost coils are apart from each other by a pitch equal to the minimum coil pitch;

winding the coil with a maximum number of turns in the concentric-wound winding distribution into a single-layer winding and each of the other coils into a double-layer winding;

simultaneously inserting into slots a first set of windings corresponding to all pole windings of a first phase, simultaneously inserting into slots a second set of windings corresponding to all pole windings of a second phase, and simultaneously inserting into slots a third set of windings corresponding to all pole windings of a third phase, the steps being sequentially executed.

* * * * *